United States Patent [19]

Broman et al.

[11] Patent Number: 5,754,858
[45] Date of Patent: May 19, 1998

[54] CUSTOMIZABLE APPLICATION PROJECT GENERATION PROCESS AND SYSTEM

[75] Inventors: David Michael Broman; Leland Greg DeMichillie, both of Redmond, Wash.

[73] Assignee: Microsoft Corporation, Redmond, Wash.

[21] Appl. No.: 641,475

[22] Filed: May 1, 1996

[51] Int. Cl.$^6$ .......................................................... G06F 9/44
[52] U.S. Cl. ............................................ 395/701; 395/702
[58] Field of Search ...................................... 395/701, 702

[56] References Cited

U.S. PATENT DOCUMENTS

| | | | |
|---|---|---|---|
| 5,301,326 | 4/1994 | Linnett et al. | |
| 5,361,360 | 11/1994 | Ishigami et al. | 395/700 |
| 5,485,601 | 1/1996 | Ching | 395/500 |
| 5,485,615 | 1/1996 | Wennmyr | 395/700 |
| 5,564,053 | 10/1996 | Yuki et al. | 395/700 |

OTHER PUBLICATIONS

"Building Application Generators", Cleaveland J.C., IEEE Software, IEEE, vol. 5 No. 4, Jul. 1988, pp. 25–33.
"EASE–a Software Integration Tool and User Interface", Gotze C., Comp. Soft. and Appl. Conference, 1994, pp. 352–356.
Microsoft Visual C++ V.1.5; Technical Note 35: Using Multiple Resource Files and Header Files with App Studio (1993).
Microsoft Visual C++ V.1.5, Visual Workbench, Help (1993).

*Primary Examiner*—Emanuel Todd Voeltz
*Assistant Examiner*—Kakali Chaki
*Attorney, Agent, or Firm*—Klarquist Sparkman Campbell Leigh & Whinston, LLP

[57] ABSTRACT

Custom application project generators are created to generate specific types of computer application programs using an automated procedure implemented in a customizer tool. The customizer tool creates a custom generator project according to options chosen by a writer from a sequence of generator option selection steps. The custom generator project comprises source code files, templates, and dialogs which the writer can further modify using an editor. The custom generator project is compiled and linked to form a custom application project generator which implements an automated procedure for generating a specific type of application defined by the writer. The custom application project generator interfaces with a services module that provides default user interface and code generation services which can be overridden by the writer.

20 Claims, 4 Drawing Sheets

CUSTOMIZABLE APPLICATION PROJECT GENERATION PROCESS AND SYSTEM

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to automated source code generating procedures and development tools, and more particularly relates to automated tools for customizing such procedures and development tools.

BACKGROUND AND SUMMARY OF THE INVENTION

Due to the increasing complexity and sophistication of software application programs, there has been a need for tools and procedures that automate performing specialized tasks in these applications. Automation of specialized tasks that are frequently repeated (e.g., setting up a document to have a particular format such as a legal brief in a word processing application or a financial report in a spreadsheet application) is particularly important. Interface programs, known as "Wizards," which control an application program to perform specialized tasks according to user selected options are described in U.S. Pat. No. 5,301,326 to Linnett et al., and now included with many of Microsoft Corporation's application programs.

In developing computer programs, it is also helpful to automate many specialized repetitive tasks. In particular, specific types of computer programs often include a significant amount of common code and functionality (e.g., a message loop in application programs for Microsoft Corporation's Windows® operating system, etc.). It is therefore helpful to automate setting up "starter" application projects for particular varieties of applications (e.g., application programs for the Windows® operating system, Microsoft OLE ("object linking and embedding") automation servers, device drivers, etc.) which already include code implementing the functionality that is common or generic to the variety of application.

For this reason, many programming language systems now include development tools (hereafter "application project generators") to automatically generate a set of source code files, based on a user's choices from a predetermined set of application options, which then can be built into a functional application program by a compiler. These application project generators automate the process of generating a "starter" project or set of source code files that implement the common functionality of a particular variety of application program. For example, prior versions (i.e., version 3.x and earlier) of Microsoft Corporation's Visual C++® development system include such a development tool called the "AppWizard."

The AppWizard has a generally two-phase operation. In a first phase, the AppWizard presents a series of dialog boxes through which the user can navigate by actuating "NEXT," "BACK," and "FINISH" buttons at the bottom of the boxes. Each of the dialog boxes contains user interface controls, such as check boxes, radio buttons, text entry boxes, etc., for the user to choose from a set of related application options. In a second phase, the AppWizard generates C++ source files tailored to the user's needs from a set of standard source file templates based on the chosen application options. These source files can be compiled by the Visual C++® development system's compiler and linker into a functional, although "bare bones," application program. The user then edits the source files and/or adds additional source files to fully develop the user's application program.

A problem with the AppWizard and like development tools is that the variety of application projects they can generate is fixed. The AppWizard provides a fixed set of standard application options, and a fixed set of standard source file templates. This limits the AppWizard to generating only a fixed variety of standard application projects, generally the most common application types.

There is often a need, however, to be able to repetitively generate more specialized application projects. For example, many application developers have their own coding and tabbing styles for source code files. Some companies insist that their developers place specific company copyright notices in comments at the top of each source code file. Since the AppWizard could only generate certain standard varieties of application projects, developers had to manually edit the source files generated by the AppWizard to create customized source code files or write the customized source files from scratch (i.e., without use of an application project generator).

There also has been a need to automatically generate varieties of application projects other than the AppWizard's standard application projects. The AppWizard was designed specifically to create applications using the Microsoft Foundation Classes ("MFC") class library, as well as Dynamic Link Library ("DLL") type applications. Many developers, however, have created their own class libraries. There also are other types of applications, such as Windows NT kernel device drivers, that are not supported by the AppWizard. To generate these other varieties of applications, developers have created and shared sample application projects which are then modified as needed to develop full applications.

Alternatively, developers have written their own application project generators. These generators, however, also have been limited to generating a fixed variety of application projects. For example, "InstallWizard" by Jetstream Software, Inc. creates an MFC application project which is specifically designed to be an installation or setup program which uses its own class library extension of MFC. As another example, "InventorWizard," which ships with NeTPower's Open Inventor Toolkit, is an automated tool for modifying an AppWizard-generated application project for use with NeTPower's 3-D graphics class library.

In short, there has existed a need to customize application project generators like the AppWizard, so as to avoid resorting to distributing manually written sample application projects for users to modify to their own needs, writing an application project generator from scratch, or repeatedly making the same modifications to AppWizard-generated projects.

In accordance with the present invention, a system and method for customizable application project generation utilizes an automated procedure and development tool (hereafter "automated customizer tool") for generating customized application project generators. The automated customizer tool creates a base project which can be built by a compiler into a custom application project generator, and also creates source file templates and user interface resources for use by the custom application project generator. The automated customizer tool presents a set of application project generator options to its user (the user of the automated customizer tool also is hereafter referred to as the "writer" of a custom application project generator), then generates the base project, source file templates and resources for the custom application project generator according to the chosen option or options. The writer can edit or modify the base project, source file templates and user interface resources to further customize the writer's custom application project generator.

In the illustrated embodiment of the invention, the automated customizer tool includes application project generator options for a set of most often needed customizations of a standard application project generator (e.g., the Visual C++® AppWizard). These application project generator options include: (1) creating a custom application project generator that mixes application project options of the standard application project generator with custom application project options, (2) creating a custom application project generator that mixes source files generated by the standard application project generator with custom source files, (3) creating a custom application project generator that can localize the application projects it generates to different languages, (4) creating a custom application project generator that replicates an existing application project, and (5) creating a custom application project generator that generates application projects for different computing platforms.

In the illustrated embodiment, the custom application project generator (which is built from the project generated by the automated procedure and development tool) interfaces with a generator services module. The generator services module provides services for basic user interface and application project generation functionality of an application project generator. The custom application project generator and standard services module are interfaced by a framework which comprises a set of application program interfaces included in the standard services module and a set of class interfaces included in the custom application project generator. Since the custom application project generator need not contain code to re-implement this basic functionality, the task for the writer of creating a custom application project generator is simplified.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

Figure 1:
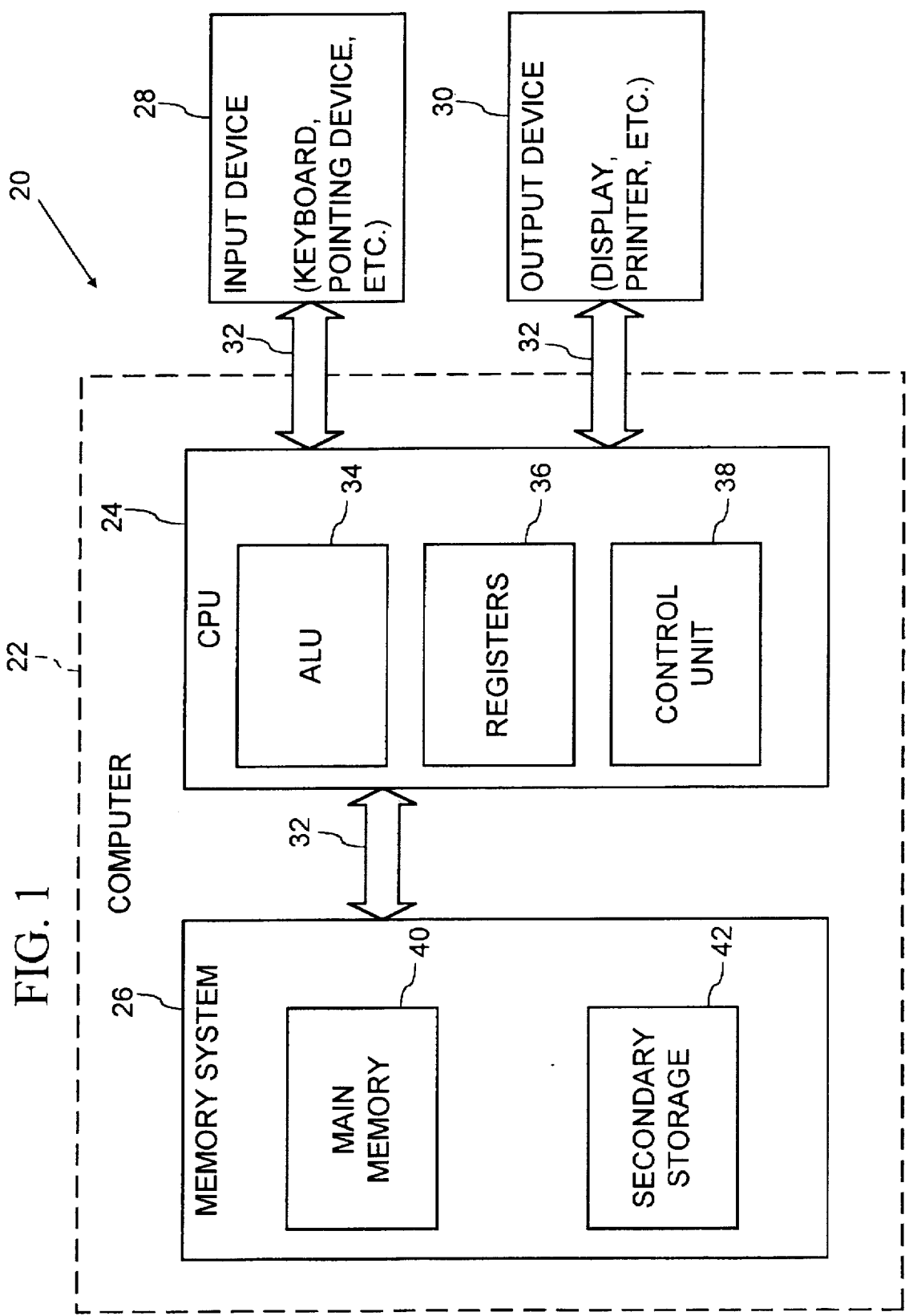
FIG. 1 is a block diagram of a computer system that may be used to implement a method and apparatus embodying the invention for customizing application project generators.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Overview of System for Custom Application Project Generation

Figure 2:
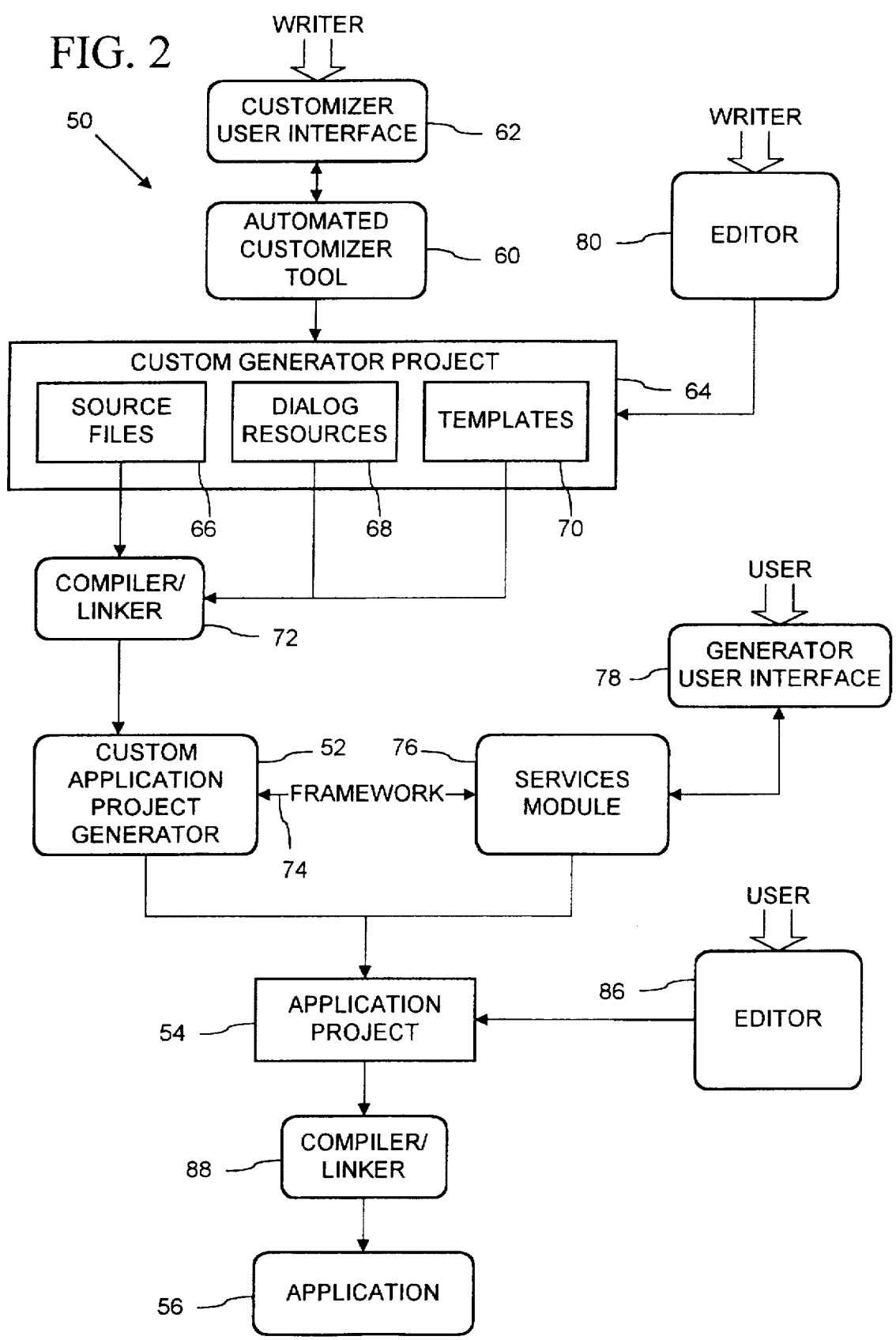
FIG. 2 is a block diagram of an automated customizer tool and procedure for creating a custom application project generator, and for using the custom application project generator to generate application projects.

Referring to FIG. 2, a system 50 according to the illustrated embodiment of the invention performs customizable automated application project generation in a generally two-phase process. In a first phase, a writer creates a custom application project generator 52 having writer defined (i.e., customized) application project options and source file templates. (The custom application project generator 52 also is referred to herein as the "Custom AppWizard.") In a second phase, a user operates the custom application project generator 52 to generate an application project 54 for an application program 56. As used herein, the term, "writer," refers to a person who creates a custom application project generator with the system 50. The term, "user," refers to a person who operates the custom application project generator to create application projects. The writer and user can be two different people or the same person.

For creating custom application project generators, the system 50 comprises an automated customizer tool 60 with a customizer user interface 62. (The customizer tool 60 also is referred to herein as thee "Custom AppWizard Generator" and the "CUSTMWZ.AWX." Through the customizer user interface 62, the automated customizer tool 60 presents a set of custom application project generator options (hereafter referred to as "custom generator options") for the writer to choose. The illustrated customizer user interface 62 presents the custom generator options in a series of one or more dialogs (i.e., a graphical box generally including textual prompts and user interface controls, such as check box, radio button, text box, and other type controls for prompting and receiving input from the writer). The custom generator options in the illustrated embodiment are detailed below. Based on the writer's choice of custom generator options, the automated customizer tool 60 generates a custom generator project 64.

The custom generator project 64 comprises a plurality of source files 66, user interface resources 68, and templates 70. The illustrated source files 66 contain source code written in the C++ programming language. As described more fully below, this code includes function calls and class declarations according to a framework 74 for interfacing with an application project generator services module 76. (The services module 76 also is referred to herein as the "Standard AppWizard" and "MFCAPWZ.DLL.") Through the framework 74, the services module 76 provides services for user interface and application project generation to the custom application project generator 52.

The user interface resources 68 are dialogs for a generator user interface 78 produced by the services module 76 to present application project options to the user. The application project options are defined by the writer's choice of custom generator options and editing of the user interface resources 68. The illustrated resources 68 are stored as ".rc" files, a standard dialog storage format in the Windows® operating system.

The templates 70 are files from which the custom application project generator 52 creates the application project 54. The templates 70 are of two types: binary and text. The binary templates can include, but are not restricted to, bitmap and formatted text files, such as ".BMP" and ".RTF" files. The text templates can contain source code for the application project 54, as well as macros and directives. The text templates include, but are not limited to, text files, such as ".H," ".CPP," ".RC," ".CLW," ".ODL," ".RTF," and ".RC2" type files. During the process of creating the application project 54, the services module 76 parses the text templates and performs the macros and directives therein to generate source-code files of the application project 54. The services module 76 copies the binary templates verbatim into the application project 54. The illustrated customizer tool 60 generates the templates 70 to be parsed into C++ programming language source code files by the generator service module 76. Alternative customizer tools can generate template files for other programming languages and development systems. Additionally, the writer can modify or add to the templates 70 so that they are parsed by the generator services module 76 for other programming languages or development systems.

With an editor 80, the writer can modify the custom generator project 64 to further customize the custom application project generator 52. In particular, the writer can directly edit the source files 66 to modify or extend the functionality of the custom application project generator 52. The writer also can edit the templates 70 to modify the source files for the application project 54, and edit the dialog resources 68 to modify the application project options and dialogs presented to the user at the generator user interface 78. Tools such as the dialog editor, the bitmap editor, the WizardBar, the ClassWizard, and the text editor in the Visual C++® development system can be used as the editor 80 to modify the custom generator project 64.

The writer builds the custom application project generator 52 from the source files 66, the dialog resources 68, and the templates 70 using a compiler and linker 72, such as the compiler and linker of the Visual C++® development system. In the illustrated system 50, the source files 66 are compiled by a C++ compiler into object code files. The dialog resources 68 and the templates 70 are compiled by a resource compiler into one or more ".RES" files. A linker then links the object code files and .RES files together into a dynamic link library ("DLL") type program. The custom application project generator 52 in the form of a .DLL file contains the compiled code from the source files, as well as the dialog resources 68 and the templates 70. Alternatively, another programming language, compiler and linker, and/or program type can be used. This completes the first phase of the customizable application project generation process.

In the second phase, the user operates the custom application project generator 52 to create the application project 54 according to the user's choice from the application project options defined by the writer. The custom application project generator 52 utilizes services provided by the services module 76 to present the dialogs defined by the writer in the resources 68 to the user at the generator user interface 78. The custom application project generator 52 then utilizes application project generation services of the generator service module 76 to generate the application project 54 by parsing the templates 70 according to the application project options chosen by the user. The resulting application project 54 is a basic application project of the specialized variety defined by the writer. The services module 76 in the illustrated system 50 also is in the form of a DLL type program.

The user completes development of the application 56 by modifying the application project 54 using an editor 86, and building the application project 54 into the application 56 using a compiler and linker 88. The editor 86 and the compiler and linker 88 can be conventionally known editing tools and compiling and linking tools of any programming language or development system. The illustrated system 50 utilizes the development tools and the compiler and linker provided in the Visual C++® development system as the editor 86 and the compiler and linker 88, respectively.

Customizer User Interface

Figure 3:
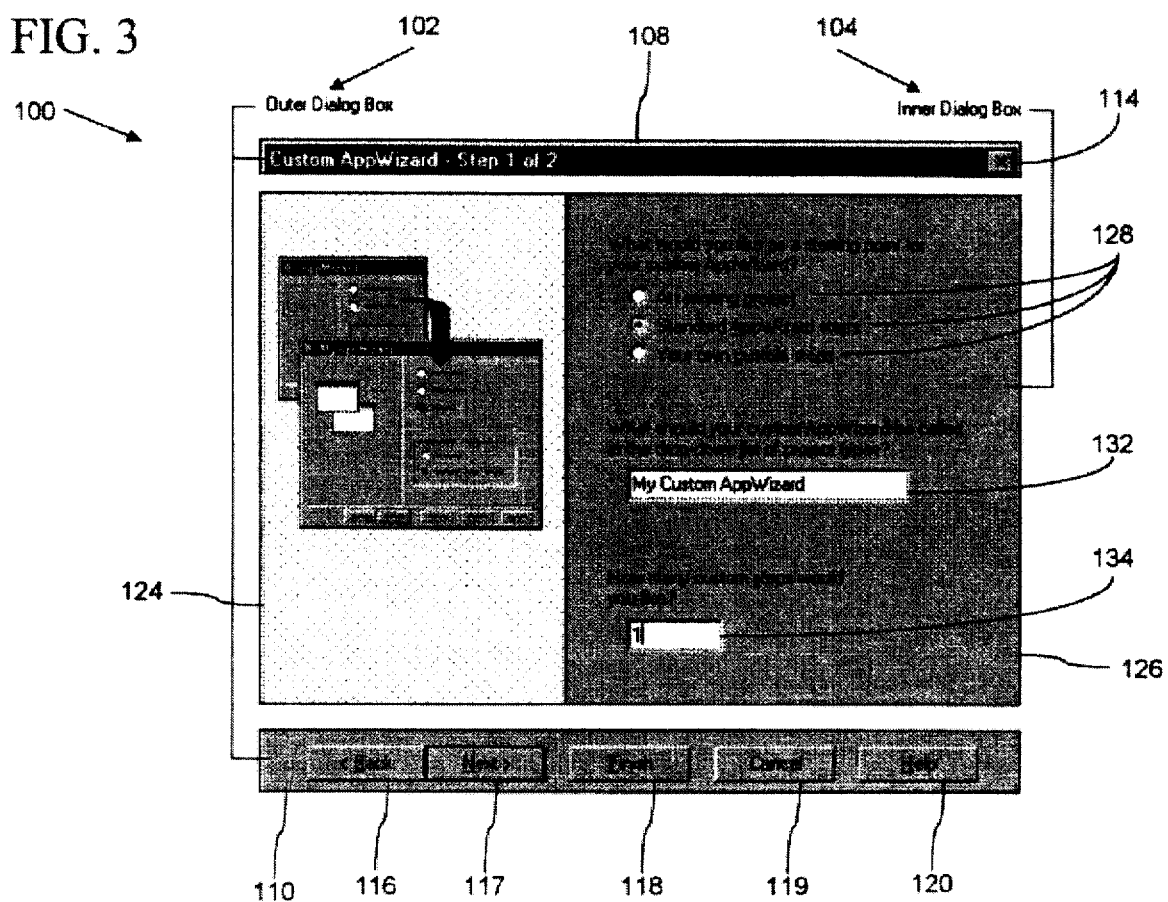
FIG. 3 is a view of a dialog box displayed by a user interface of the automated customizer tool of FIG. 2 for a custom application project generator writer to choose application project generator options.

With reference to FIG. 3, the user interface 62 of the automated customizer tool 60 (FIG. 2) presents a dialog 100 for prompting and receiving input from the writer to specify the writer's choice from a set of custom generator options. The dialog 100 is displayed as a rectangular area on a display of an output device 30 of the computer system 50.

The dialog 100 has an outer dialog 102 and an inner dialog 104. The outer dialog 102 includes a title bar 108 along a top edge of the dialog 100 and a button bar 110 along a bottom edge of the dialog 100. The inner dialog 104 is between the title bar 108 and the button bar 110 and presents the custom generator options as a sequence of one or more custom generator option selection steps.

The title bar 108 includes a title caption that states a title of the customizer tool ("Custom AppWizard" in the illustrated embodiment) and which out of the sequence of custom generator option selection steps is currently displayed in the inner dialog 104. The title bar 102 also includes a close button 114. Activating the close button 114 with an input device 28 of the computer system 20 (FIG. 1) causes the dialog 100 to close.

The button bar 110 includes buttons 116-120 labeled "back," "next," "finish," "cancel," and "help" which the writer activates with the input device 28 (FIG. 1). The writer activates the back and next buttons 116-117 to move in a backward and forward direction, respectively, through the sequence of custom generator option selection steps. The writer activates the finish button 118 when the writer has completed the custom generator option selection steps. Activating the cancel button 119 cancels the process of generating the custom generator project 64 with the automated customizer tool 60. The help button 120 opens a help dialog with instructions on use of the automated customizer tool 60.

For each of the option selection steps, the inner dialog 104 is divided into a graphic portion 124 on the left and a controls portion 126 on the right. In the graphic portion 124, the automated customizer tool 60 presents a graphic image illustrating the current custom generator option selection step. In the controls portion 126, the automated customizer tool 60 presents a set of controls which includes textual prompts, radio buttons, and text entry boxes for the writer to choose the desired custom generator options.

For the first custom generator option selection step, the inner dialog presents the writer with a choice from three primary custom generator options as a starting point of the custom application project generator 52. These primary custom generator options include, (1) creating a custom application project generator based on an existing project (hereafter referred to as the "custom generator based on existing project option"), (2) creating a custom application project generator based on standard application project option selection steps (hereafter referred to as the "custom generator based on standard steps option"), and (3) creating a custom application project generator based on only the writer's own custom application project option steps (hereafter referred to as the "custom generator based on custom steps option"). The writer chooses one of these custom generator options with three radio button controls 128 in the controls portion 126. The controls portion 126 also includes a text entry box 132 for the writer to input a name for the writer's custom application project generator 52, and a numeric value entry box 134 for the writer to input a number of custom application project option steps for the writer's custom application project generator. If the writer chooses the custom generator based on existing project option, the numeric value entry box 134 becomes inactive. (For this custom generator option, the features of the application project 54 are determined by the existing project and not by the user's choice of application project options. Thus, the writer need not provide any custom application project option steps.)

The contents of the inner dialog 104 for the second step depend on the writer's choice between the three primary custom generator options. If the custom generator based on existing project option is chosen, the controls portion 126 of the inner dialog 104 for the second step includes controls for entry of a file system location of the existing project.

If the custom generator based on standard steps option is chosen, the controls portion 126 for the second step includes a first list box for selecting the standard application project option steps of either an executable (".exe") type application or a dynamic link library (".dll") type application, and a second list box for selecting specific languages that the writer's custom application project generator will support.

If the custom generator based on custom steps option is chosen, the dialog 100 does not present a second step. Instead, the text of the title bar 108 is changed to state, "step 1 of 1."

After the writer finishes choosing from the custom generator options and activates the finish button 118, the automated customizer tool 60 generates the custom generator project 64 (FIG. 2).

Generator User Interface

Figure 4:
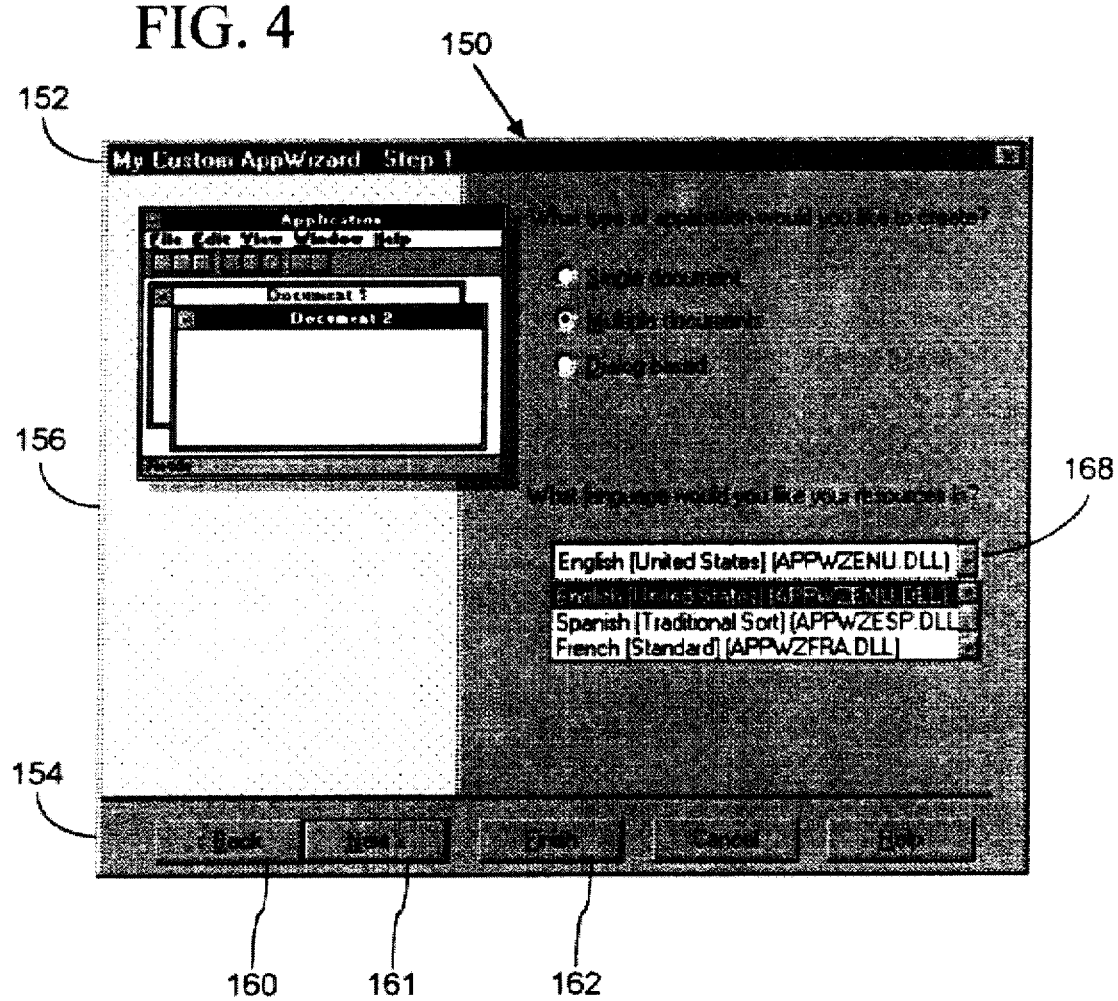
FIG. 4 is a view of a dialog box displayed by a user interface of a custom application project generator of FIG. 2 for a user to choose application project options for localizing to a chosen language.

Referring to FIG. 4, the generator user interface 78 presented by the custom application project generator 52 and the services module 76 also has the form of a dialog 150 with a title bar 152 at its top edge, a button bar 154 at its bottom edge, and an inner dialog 156 in between. The custom application project generator 52 and the services module 76 present a sequence of application project option selection steps in the inner dialog 156 which the user navigates by clicking on a back, next and finish buttons 160-162. The inner dialog 156 for each step contains a set of user interface controls for the user to choose from related application project options. The application project options and option selection steps presented in the dialog 150 are definable by the writer, and may include a mix of standard application project option steps and the writer's custom steps as described below.

Templates

As described above with reference to FIG. 2, the templates 70 are resource files from which the custom application project generator 52 and services module 76 generate the user's application project 54. The templates 70 are of two types, text templates and binary templates. The text templates are parsed by the services module 76 to create the source code files for the application project 54. The binary templates typically contain bitmap data for user interface components, such as toolbars and the like, which are copied verbatim by the services module 76 into the application project 54.

The text templates generally contain lines of source code, such as C++ code or resource-script directives (e.g., compiler directives), for the application project 54. The text templates also generally contain macros and directives that the services module 76 uses to determine the content of the source files in the application project 54. The following code-template fragment shows C++ code with embedded macros and directives.

```
// $$root$$.h : main header file for the $$ROOT$$
// application
#include "resource.h"
// main symbols
//////////////////////////////////////////////
/////////////
// $$APP_CLASS$$:
// See $$root$$.cpp for the implementation of this
// class
class $$APP_CLASS$$ : public $$APP_BASE_CLASS$$
```

-continued

```
{
public:
    $$APP_CLASS$$();
    // Overrides
    // ClassWizard generated virtual function
    // overrides
    //{{AFX_VIRTUAL($$APP_CLASS$$)
    public:
    virtual BOOL InitInstance();
    //}}AFX_VIRTUAL
// Implementation
    //{{AFX_MSG($$APP_CLASS$$)
$$IF(VERBOSE)
    // NOTE - the ClassWizard will add and
    // remove member functions here.
    // DO NOT EDIT what you see in these
    // blocks of generated code!
$$ENDIF
    //}}AFX_MSG
    DECLARE_MESSAGE_MAP ()
};
```

The macros in the text templates are strings of characters that represent values. In the text templates, the values of the macros (such as $$ROOT$$ and $$APP_CLASS$$) control the names of files and classes in the source code of the application project 54. The values of macros (such as VERBOSE) also control whether flow of control directives (such as $$IF) evaluate to true. The values represented by the macros are maintained in a macros dictionary (implemented in the illustrated embodiment as an object of the CMapStringToString class from the MFC library) named projectaw.m_Dictionary and declared in a projectAW.H file of the source files 66 (where project is the name of the custom generator project). The automated customizer tool 60 generally includes a set of standard application project generator macros in the text templates 70 and macros dictionary. The writer also can add writer-defined macros to the text templates 70 and macros dictionary when editing the custom generator project 64 with the editor 80. The services module 76 gathers the values of the macros during the process of generating the application project 54, such as from the application project options chosen by the user.

In the illustrated text templates 70, the beginning and end of macros are marked with a pair of dollar sign characters ($$) for parsing by the service module 76 when generating the application project 54, as shown in the following example template fragment:

```
//////////////////////////////////////////
// $$APP CLASS$$
BEGIN_MESSAGE_MAP($$APP_CLASS$$,
                                    $$APP_BASE_CLASS$$)
    //{{AFX_MSG_MAP($$APP_CLASS$$)
$$IF (VERBOSE)
    // NOTE - the ClassWizard will add and
    // remove mapping macros here.
    // DO NOT EDIT what you see in these
    // blocks of generated code!
$$ENDIF
    //}}AFX_MSG
    ON_COMMAND(ID_HELP, CwinApp::OnHelp)
END_MESSAGE_MAP()
```

Macros that are used as arguments to a directive (such as $$IF) do not require marking by dollar signs. If such macros are marked with dollar signs, the dollar signs are interpreted as part of the macro's name (i.e., argument macros still can be marked by dollar signs). For example, both AMACRO and $$AMACRO$$ can serve as macro names in the following two directive statements:

$$IF(AMACRO);
$$IF ($$AMACRO$$);

Directives (such as $$IF and $$ENDIF) serve to generalize the text templates so that the content of the templates can be used by the service module 76 for generating multiple types of application projects. Directives in a template guide the services module 76 as it processes a template to produce a source file in the application project 54. For example, based on the value of a macro, a sequence of $$IF, $$ELIF, $$ELSE, and $$ENDIF directives can force the services module 76 to selectively insert lines of C++ code into a header or an implementation file (.H or .CPP, respectively) used in the application project 54.

The illustrated services module 76 recognizes the following directives: $$IF, $$BEGINLOOP, $$ELIF, $$ENDLOOP, $$ELSE, $$SET_DEFAULT_LANG, $$ENDIF, $$//, and $$INCLUDE. These directives must appear at the beginning of a line with no preceding white space, and, other than any arguments and one optional comment, there can be nothing else on the line. For the service module 76 to emit "$$" literally (and not to signify that a macro or directive will follow), the character string "$$$$" is used. The service module 76 translates occurrences of "$$$$" as "$$".

In each custom generator project 64, the automated customizer tool 60 also includes copies of a confirm.inf template and a newproj.inf template. The confirm.inf template contains a human-readable description of each project component (such as the project name and the names of its primary classes). It also contains a description of each feature that the user can choose with the application project options. The following code shows how macros and flow-of-control directives are used to generalize the content of a confirm.inf template:

```
$$// confirm.inf = the text sent to the New Project
$$// Information dialog box
Application type of $$ROOT$$:
    Dialog-Based Application targeting:
        Win32
Classes to be created:
    Application: $$APP_CLASS$$ in $$RQOT$$.h and
$$ROOT$$ . cpp
    Dialog: $$DLG_CLASS$$ in $$DLG_HFILE$$.h and
$$DLG_IFILE$$.cpp
Features:
    + About box on system menu
$$IF (INDENTED_BRACES)
    + Curly braces indented from previous level
$$ELSE // !INDENTED_BRACES
    + Curly braces flush with previous level
$$ENDIF // NOT_INDENTED_BRACES
$$IF(COMPANY_LOGO)
    + A company logo
$$ENDIF //COMPANY_LOGO
$$IF(3-D)
    + 3D Controls
$$ENDIF //3-D
```

This example of the confirm.inf template contains lines of text (such as "Classes to be created:"), macros (such as "$$APP_CLASS$$" and "$$ROOT$$"), and flow-of-control directives (such as "$$IF" and "$$ENDIF").

The confirm.inf template is parsed by the services module 76 to generate the contents of a "New Project Information" dialog box for the application project 54. The services module 76 parses the confirm.inf template when the user activates the finish button of the generator user interface 78 in the application project option selection step sequence. The service module 76 parses the confirm.inf template as follows:

Each line of text is gathered into a CString object (an object of the CString class of the MFC class library), and each encountered macro is expanded.

Any line beginning with the $$// directive is a comment and is ignored.

Any line of text between an $$IF directive and an $$ENDIF directive is converted to a CString object if the associated macro, such as "INDENTED_BRACES" and "COMPANY_LOGO," exists and thus evaluates to true.

As described below, this is the same process used by the services module 76 in parsing other text templates.

The resulting CString objects reflect the custom application project generator user's choices and are written to the New Project Information dialog box. The user thus can view the features of the application project 54.

The newproj.inf template contains the instructions that the services module 76 uses to construct the application project 54. The instructions are statements, directives, and macros that work together to describe the structure of the application project 54. The following code shows how statements and macros are used to generalize the instructions of a NEWPROJ.INF file:

```
+dlgroot.rc              .\$$RCOT$$.rc
+dlgroot.clw             .\$$ROOT$$.clw
dlgrooth.h               .\$$ROOT$$.h
+dlgroot.cpp             . \$$ROOT$$.cpp
dialog.h .\$$ROOT$$dlg.h
+dialog.cpp              .\$$ROOT$$dlg.cpp
readme.txt               .\readme.txt
resource.h               .\resource.h
stdafx.h .\stdafx.h
+stdafx.cpp              .\stdafx.cpp
/RES
=root.ico                .\res\$$ROOT$$.ico
root.rc2 .\res\$$ROOT$$.rc2
```

In general, there are two kinds of statements in the newproj.inf template: those that create directories, and those that fill the directories with files. The create directory statement has the syntax:/directory, where directory specifies a name. This statement directs the services module 76 to create a subdirectory of the project directory with the specified name. In the previous example, the "/RES" statement causes the services module 76 to create a project subdirectory named RES.

The statements for filling directories have the syntax [flags] template-name tab-character destination-filename. These statements direct the services module 76 to parse the template specified by "template-name" to generate a file named by "destination-filename." The destination-file name can contain a path (i.e., in a file system structure) which must exist, but may be created by a preceding create directory statement.

The flags are any of three optional characters, =, +, and *. The "=" flag directs the services module 76 to copy the specified template verbatim to the destination file name. The services module 76 otherwise parses the specified template as a text template by default. The "+" flag specifies that the file being generated is a project file (such as a .CPP source code file or .ODL file) whose name is to be added by the services module 76 to the make file of the application project. (The make file is a conventional file used by the compiler and linker 88 which lists source code files of the application project 54 that must be compiled to build the application 56 from the application project 54.) The "*" flag directs the services module 76 to parse one of the standard template rather than a custom template (out of the templates 70) of the specified template-name if one exists.

For example, the "+dlgroot.rc .\$$ROOT$$.rc" statement in the above example newproj.inf template causes the services module 76 to look for a template named "IDLGROOT.RC," give it a name determined by the value of the $$ROOT$$ macro, and place the resulting file in the new project's root directory. The plus sign (+) is a flag that marks this template for inclusion in the project make file (.MAK).

For brevity, directives (such as $$IF, $$ELSE, and $$ENDIF) are not shown in the previous example, but they can be used as shown in the confirm.inf template example.

The automated customizer tool 60 creates the templates for the custom generator project 64 differently depending on the custom generator options chosen by the writer. When the custom generator based on existing project option is chosen, the automated customizer tool 60 converts all files of the existing project (which is specified by the writer in the second custom generator options selection step) into binary and text templates for the custom generator project 64. The source code files of the existing project are converted into text templates. Non-text files, such as bitmaps, are copied exactly into binary templates. In converting the source code files into text templates, the automated customizer tool 60 finds and replaces strings that contain remnants of the existing project's name (e.g., source code files of a project named "Foo" may include classes named "CfooView" and "CfooDoc") and replaces such string remnants with macros (e.g., the class names are changed to "C$$ROOT$$View" and "C$$ROOT$$Doc"). When the resulting text templates are later parsed by the services module 76 to generate source code files of the application project 54, the macros are expanded based on a new name (entered by the user when choosing application project options at generator user interface 78 of FIG. 2) for the application project 54, and not the original project name. In addition, the automated customizer tool 60 generates the newproj.inf template with statements based on the structure of the existing project. The confirm.inf template for the custom generator project 64 is left empty. The writer adds text, macros and directives to the confirm.inf template that, when parsed by the custom application project generator 52 and services module 76, produce descriptions, in a human-readable form, of the features that the user has chosen from the application project options. The custom application project generator 52 places these descriptions from the parsed confirm.inf template into the user's new application project 54.

When the custom generator based on standard steps is chosen, the automated customizer tool 60 copies a set of standard templates into the custom generator project 64 for use as the templates 70. The automated customizer tool 60 copies a different set of custom templates depending on the writer's choice of application project type (i.e., executable or dynamic link library) in the second custom generator option selection step. The standard templates used in the illustrated embodiment are described in detail in Appendix C and include templates from which .H, .CPP, .RC, .CLW, .ODL, and .RC2 files of the application project 54 are generated. The standard templates also include bitmaps of standard user-interface components and templates for help files. The writer can modify these standard templates or add the writer's own custom templates with the editor 80. The automated customizer tool 60 additionally includes standard confirm.inf and newproj.inf templates, which the writer can modify to reflect any custom application project option selection steps added by the writer.

When the custom generator based on custom steps is chosen, the writer provides a set of templates which the writer creates using the editor 80. The confirm.inf and newproj.inf templates are initially empty. For the custom application project option selection steps added by the writer, the writer edits the confirm.inf and newproj.inf steps to reflect the features that the user can choose in these custom steps.

Framework

As described above, the custom application project generator 52 relies on the services module 76 to provide basic or default application project generator functionality such as for the generator user interface 78 and application project 54 generation. The custom application project generator 52 interfaces with the service module 76 to access this functionality using a framework 74 which allows the writer to override the service module's default application project generator functionality as desired by the writer.

The Services Module API Functions

The framework 74 comprises a set of application programming interface ("API") functions implemented in the services module 76 which the custom application project generator 52 calls to communicate with the services module. In the illustrated embodiment, these API functions include a set custom generator class ("SetCustomAppWizClass") function, a get dialog ("GetDialog") function, a set number of steps ("SetNumberOfSteps") function, a scan for available languages ("ScanForAvailableLanguages") function, and a set supported languages ("SetSupportedLanguages") function.

With the set custom generator class function, the custom application project generator 52 passes to the services module 76 a pointer to its instance of a custom application project generator ("CCustomAppWiz") class (described below).

The get dialog function returns a pointer to a standard application project option selection step. The custom application project generator 52 calls this function when it uses one of the standard steps in its application project option selection sequence.

The custom application project generator 52 calls the set number of steps function to inform the services module 76 how many total steps are in the application project option selection sequence (for the application project options currently chosen by the user). This allows the services module 76 to update its internal state and the display of the generator user interface 78 (i.e., the caption on the title bar of the interface's dialog which states the current step out of the total number—"Custom AppWizard Step 3 of 6") when the total number of steps changes due to the user's current chosen application project options.

The scan for available languages function and the set supported languages function are used by the custom application project generator 52 in localizing the application project 54 to a particular language as described below.

The Custom Application Project Generator Class and Virtual Member Functions

The framework 74 also comprises a custom generator class ("CCustomAppWiz" described in detail in Appendix E) with virtual functions. The custom application project generator 52 includes an instance of a derivation of this class. The services module 76 calls the virtual functions of the custom generator class to communicate with the custom application project generator 52. The declaration of the custom generator class in the illustrated embodiment is as follows:

```
class CCustomAppWiz : public CObject
public:
    CMapStringToString m_Dictionary;
    virtual void GetPlatforms (CStringList&
rPlatforms) {}
    virtual CAppWizStepDlg* Next (CAppWizStepDlg*
pDlg) { return NULL; }
    virtual CAppWizStepDlg* Back (CAppWizStepDlg*
pDlg) { return NULL; }
    virtual void InitCustomAppWiz() {
m_Dictionary.RemoveAll(); }
    virtual void ExitCustomAppWiz() {}
    virtual LPCTSTR LoadTemplate (LPCTSTR
lpszTemplateName,
        DWORD& rdwSize, HINSTANCE hInstance = NULL);
    virtual void CopyTemplate(LPCTSTR lpszInput,
DWORD dwSize, OutputStream* pOutput);
    virtual void ProcessTemplate (LPCTSTR
lpszInput, DWORD dwSize, OutputStream* pOutput);
    virtual void PostProcessTemplate (LPCTSTR
szTemplate) {}
};
```

Many of these functions are implemented in the base custom generator class. Since the functions are virtual, the writer can chose to override (using conventional C++ programming techniques) some or all of the functions in the custom application project generator's derivative of the class. Then, the services module 76 will transparently call the writer's new implementation of the overridden functions in the derived class, and the original implementation of the functions that the writer chooses not to override. For example, if the writer wishes to have the custom application project generator 52 load its templates differently, the writer can override the "LoadTemplate" function (described in the attached Appendix E) in the derived class, and thereby bypass the original implementation of that function. Thereafter, when the services module 76 calls this virtual function to load a template for the custom application project generator 52, the services module 76 transparently calls into the writer's new implementation of the function in the code of the custom application project generator 52.

As described previously, the custom application project generator 52 initially passes a pointer for its instance of the custom generator class to the service module 76 when the custom application project generator calls the set custom generator class API function. The custom application project generator calls this API function when the custom application project generator 52 is first loaded (i.e., by a "LoadLibrary" API function call of the services module 76 to the operating system). The code for the set custom generator class API function call in the custom application project generator is automatically generated by the automated customizer tool 60. The implementation of the set custom generator class API function in the services module 76 sets an internal custom generator class pointer of the services module 76 to be the pointer passed by the custom application project generator 52. The services module 76 makes all of its calls into the custom generator class functions through this internal pointer. So, by setting the internal pointer to be the pointer passed by the custom application project generator 52, the services module 76 causes the code of the custom application project generator's derivation of the CCustomAppWiz class to be executed for each of the CCustomAppWiz functions.

Customizing the Application Project Option Selection Step Sequence

The system 50 (FIG. 2) allows the writer to customize the custom application project generator's sequence of application project option selection steps to include any mix of standard steps and writer-defined custom steps. The framework 74 exposes the ability for the writer to mix standard and custom steps with the GetDialog API function, along with the Next and Back virtual functions which are mentioned above and described in detail in Appendices D and E. The GetDialog, Next and Back functions allow the custom application project generator 52 and the services module 76 to operate together in presenting a customized sequence of application project option selection steps to the user at the generator user interface 78.

The custom application project generator 52 prepares in advance for displaying standard steps by calling the get dialog API function with an argument specifying a particular standard step. The custom application project generator 52 calls the get dialog API function separately for each of the standard steps that it uses at initialization of the custom application project generator. The services module 76 maintains pointers to dialogs (e.g., the step's corresponding inner dialog 156 such as shown in FIG. 4) for all of the standard steps, and responds to the call by looking-up and returning a pointer to the step specified in the call. The custom application project generator 52 stores the returned dialog pointers internally.

For example, if the custom application project generator 52 uses the standard step for selecting object linking and embedding ("OLE") application project options, the custom application project generator 52 makes the call: "GetDialog (APWZDLG_OLE)." The services module 76 responds by retrieving and returning the dialog for this step to the custom application project generator. The custom application project generator stores this pointer internally (e.g., as a pointer "pOleDlg").

Later, as the user navigates through the application project option selection steps with the next and back buttons 160–161 (FIG. 4), the services module 76 calls the Next and Back virtual functions of the custom generator class implemented in the custom application project generator 52. In response to such calls, the custom application project generator 52 returns the dialog pointer for the step (which may be a dialog pointer for a standard step obtained by the custom application project generator with the GetDialog function or a dialog pointer for a custom step) that follows or precedes, respectively, the current step of the sequence. With the returned dialog pointer, the services module 76 calls a function, "Create()," to display that step's dialog as the inner dialog 156 of the dialog 150 (FIG. 4) of the generator user interface 78 (FIG. 2).

With this structure for the framework 74, the writer can customize the application project options selection sequence by overriding the next and back functions of the derived custom generator class implemented in the custom application project generator 52 so as to return dialog pointers to a desired sequence of standard and/or custom steps. The customizer tool 60 generates the source files 66 of the custom application project generator with a default derived custom generator class including the next and back functions when the writer chooses the create custom generator based on standard steps option described above. The writer then overrides the next and back functions by editing the custom generator class in the source files 66 with the editor 80.

Customizing the Application Project Files Generated by the Custom Application Project Generator The system 50 (FIG. 2) allows the writer to customize the files of the application project 54 that the custom application project generator 52 generates. As discussed above, the writer can modify standard templates or add the writer's own custom templates to change the application project 54 files that the custom application project generator 52 generates. The framework 74 also exposes the ability for the writer to modify the way in which the custom application project generator 52 parses the templates to generate the application project 54 with the following virtual member functions of the custom generator class: a load template function ("CCustomAppWiz::LoadTemplate"), a copy template function ("CCustomAppWiz::CopyTemplate"), a process template function ("CCustomAppWiz::ProcessTemplate"), and a post process template function ("CCustomAppWiz::PostProcessTemplate").

When processing the templates 70 to generate the application project 54, the services module 76 first loads the newproj.inf template by calling the load template function of the custom generator class which has the following form:

virtual LPCTSTR LoadTemplate(LPCTSTR lpszTemplateName, DWORD& rdwSize, HINSTANCE hInstance=NULL);

The default or custom generator base-class implementation of the load template function loads the template specified by the argument LpszTemplateName in the module hInstance. The argument hInstance is a handle to an instance of a module. If hInstance is NULL, the base-class implementation of the load template function first looks in the custom application project generator's DLL for the custom resource template named by the argument lpszTemplateName. If the template is not there, the function searches among the standard templates of the services module 76. If hInstance is not NULL, the base-class implementation of LoadTemplate looks in the Win32 module hInstance. When the named template is found by LoadTemplate, it loads the resource with the following code:

HRESOURCE hrsrc=::FindResource(hInstance, lpszTemplateName, "TEMPLATE");
    dwSize=::SizeofResource(hInstance, hrsrc);
    HGLOBAL hglb=::LoadResource(hInstance, hrsrc);
    LPCTSTR lpszTemplate=(LPCTSTR) ::LockResource (hglb);

The services module 76 next parses the newproj.inf template by calling the process template function, which has the following form:

virtual void ProcessTemplate(LPCTSTR lpszinput, DWORD dwSize, Outputstream* pOutput);

The process template function operates as a simple text processor which expands the template's macros, and performs the template's directives as described above. The arguments include pointers lpszInput and pOutput to the input and output streams of the parser. For parsing the newproj.inf template, the services module 76 passes as the output stream argument a pointer to an object of the CStringList class (a conventional MFC class) rather than a file pointer. The parser's output then goes into the string list data structure. After the process template function call, the services module 76 calls the post process template function. The default implementation of the post process function does nothing, but can be overridden by the writer to perform clean-up work.

The services module 76 then iterates through a loop which read each line of the parsed newproj.inf template (as stored in the string list data structure). For each line, the services module 76 calls the process template function with pointers to the template and destination file specified in the line as the function's input and output stream arguments. After each process template function call, the services module 76 calls the post process template function call to perform clean-up work.

With this default functionality of the framework 74, the writer can customize which templates are processed into application project files by including appropriate template processing directives in the newproj.inf file as described above. The writer also can customize the manner in which the custom application project generator processes the templates by overriding the load template, copy template, process template, and post process template functions of the base custom generator class with the writer's own versions of the functions in the writer's derived custom generator class. The writer can, for example, change the manner in which the process template function expands the macros of the templates by overriding the default process template function with a modified process template function.

Customizing to Different Languages

The system 50 (FIG. 2) allows the writer to create the custom application project generator 52 with the ability to localize the application project 54 to a particular language chosen by the user. The system 50 accomplishes localization through standard templates for different languages, a naming convention for localizable templates, a set default language template directive (the "$$SET_DEFAULT_LANGUAGE" directive), and a set supported languages API function.

As discussed above, when the writer chooses the custom generator based on standard steps option, the customizer tool 60 prompts the writer to choose which languages the custom application project generator 52 is to support (the default is to select all languages supported in the standard templates) in the second custom generator options selection step. When creating the custom generator project 64, the customizer tool 60 then duplicates each of the standard templates that is localizable in the templates 70 of the custom generator project 64 to each of the chosen languages. For example, if the writer chooses for the custom application project generator 52 to support French and German, the customizer tool 60 duplicates the localizable template loc.rc in a French version (named loc_fra.rc) and in a German version (named loc_deu.rc) in the templates 70. The customizer tool 60 also duplicates all other localizable standard templates. The customizer tool 60 names the duplicated, localized templates according to a naming convention in which the language is identified by a three letter suffix appended to the template name.

For displaying a list of the languages supported by the custom application project generator 52 in the standard application project options selection step for language localization, the custom application project generator 52 calls the set supported languages API function of the services module 76 at initialization. In the argument of the function call, the custom application project generator 52 passes a string consisting of the names and translation identifiers of the languages that it supports. The translation identifiers are 32 bit integers which encode the language, sublanguage, and code page of the language used by the Microsoft Windows® operating system API. In response to the function call, the service module 76 sets up an internal list of the supported languages and their translation identifiers.

Referring again to FIG. 4, the services module 76 can then display, in the dialog of a standard application project options selection step which includes choosing the language of the application project 54, a list box control 168 with a drop down list of the languages supported by the custom application project generator 52 (for custom application project generators that include this standard step). When the user chooses one of the languages in the list with the input device 28 (FIG. 1), the services module 76 (FIG. 2) stores the name and identifier of the chosen language for use in application project generation.

Returning to FIG. 2, the custom application project generator 52 uses the set default language directive to determine which of the localized templates to parse into the source files of the application project 54. For this purpose, the set default language directive is included as a line in the newproj.inf template as follows:

$$SET_DEFAULT_LANG(LANG_SUFFIX)

When the services module 76 parses this line in the newproj.inf template, the macro "LANG_SUFFIX" is expanded to the three letter suffix of the language chosen by the user. For example, if the user chooses to generate the application project 54 in French, this macro is expanded to "FRA." This directive instructs the custom application project generator's parser to thereafter append this three letter language suffix to the name of any template that is not otherwise found in the templates 70. For example, if the newproj.inf template thereafter has the line:

=afxcore.rtf AfxCore.rtf which instructs the parser to process the afxcore.rtf template, the custom application project generator first searches for the afxcore.rtf template. If it is a localizable template, the customizer tool 60 will have duplicated the template to templates with the three letter language suffixes as explained above. The parser therefore does not find the template with the name afxcore.rtf. Accordingly, due to the preceding set default language directive in the newproj.inf template, the parser expands the template name to afxcore_fra.rtf (the french version of the template) and searches for the template with that name. Thus, the custom application project generator parses the localized templates for the language selected by the user.

Customizing to Different Platforms

The system 50 (FIG. 2) allows the writer to create the custom application project generator 52 with the ability to generate the application project 54 to a specific computing platform (specifically the operating system and hardware platform, e.g., Microsoft Corporation's Win32 operating system and IBM compatible PC; Apple Computer, Inc.'s Macintosh operating system and computer; etc.) chosen by the user. The system 50 accomplishes platform specific application project generation through a get platforms virtual function in the custom generator class ("CCustomAppWiz::GetPlatforms"), a standard application project options selection step, and a set of macros.

In the illustrated system 50, the user chooses to run the custom application project generator 52 for generating the user's application project 54 from a "create new project" dialog which is controlled by the Visual C++ development environment. The user opens the create new project dialog with a menu command in Visual C++. The create new project dialog includes user interface controls with which the user can choose to generate the user's new application project 54 with the custom application project generator 52. The create new project dialog also includes a list control in which a list of the available platforms to which the custom application project generator can target the application project 54. The user chooses from the list the platforms for which the application project 54 is to be targeted. When the user chooses to run the custom application project generator 52 from the create new project dialog, the create new project dialog is followed by the dialogs for the sequence of project option steps of the custom application project generator.

For displaying the list control of the create new project dialog, the services module 76 calls the get platforms function of the custom generator class, and passes as an argument to the function call a list (also implemented as an object of the CStringList class from the MFC class library) of names of available platforms (i.e., those currently installed in the development system). The default implementation of the get platforms function in the base custom generator class does not change the list. The get platforms function can be overridden by the writer in the derived custom generator class in the source files 66 (FIG. 2) with a function that removes the names of the platforms not supported by the custom application project generator. Thus, as a result of this call, the services module 76 has a list of only the platforms supported by the custom application project generator 52 which the services module 76 can display in the list control at the generator user interface 78 for user selection of platforms to be targeted.

After the user chooses the platform or platforms to target with the list control, the services module 76 enters a separate macro ("platform targeting macro") for each platform in the macros dictionary of the custom application project generator 52 (and removes the platform targeting macros, if any, for the platforms not chosen by the user from the macros dictionary). For example, if the user chooses to target the application project 54 for the Power Macintosh platform, the services module 76 enters the macro "TARGET__POWERMAC" in the macros dictionary.

In later generating the application project, the existence of the platform targeting macro(s) in the macros dictionary then indicates to the custom application project generator 52 which platform(s) is(are) to be targeted. (The actual value assigned to the platform targeting macro in the macros dictionary is not significant.) Specifically, directives such as the following can be included by the writer in the templates 70 to cause the services module 76 to generate platform specific code in the application project 54 for the platform or platforms chosen by the user:

$$IF(TARGET__POWERMAC)
powermac-specific code goes here . . .
$$ENDIF

Additionally, the writer can include code in the custom application project generator (such as in the process template and post process template functions of the custom generator class) to perform platform specific application project generation conditioned on the existence of the platform targeting macros in the macros dictionary.

Customizing the Custom Application Project Generator to Create Replicas of an Existing Project As discussed above, one of the generator options that can be chosen by the writer when creating the custom generator project 64 (FIG. 2) with the customizer tool 60 (FIG. 2) is the create custom generator based on existing project option. When the writer chooses this option, the customizer tool 60 generates templates 70 for the custom generator project 64 from the source files of the existing project and creates the custom application project generator 52 to use these templates for generating the application project 54 as a replica of the existing project.

As further discussed above, the customizer tool 64 generates the templates from the existing project by parsing the source files of the existing project and replacing any strings in those source files that contain remnants of the existing project's name with macros (e.g., replacing strings like "CFooView" and "CFooDoc" in an existing project named "Foo" with "C$$ROOT$$View" and "C$$ROOT$$Doc"). With this substitution, the custom application project generator 52 can generate the application project 54 from the templates by expanding the macros (e.g., $$ROOT$$) with a new project name chosen by the user. Thus, the resulting templates are capable of creating new files with strings based on the new project name chosen by the user, in place of the existing project's name.

In the illustrated embodiment, the customizer tool 60 does not make the existing project name to macro substitution for all strings in the existing project, but instead performs the substitution only for strings in the existing project that have predetermined contexts (where substitution is needed). This overcomes the problem that for some project names, substituting all occurrences of the project name with macros can have disastrous consequences to the source code. For example, if "while" (which is a reserved word in C++ and many other programming languages) is used as the name of the existing project, the source code would be rendered inoperative if all occurrences of "while" in the existing project's source code files were substituted by a macro and the macro later expanded to a new user-chosen name of the application project 54.

The contexts in which the customizer tool 60 makes the existing project name to macro substitution is controlled by a table (which is located in the zap.cpp source code file having the following form:

```
static ZapRawData zrdGeneral[] =
{
 {_T(" "), ZRD_ROOT, _T(".h"), {_T("$$root$$.h"),
_T("root.h")} },
 {_T(" "), ZRD_ROOT, _T(".cpp"),
{_T("$$root$$.cpp"), _T("root.cpp")} },
 {_T(" "), ZRD_ROOT, _T(".rc"), {_T("$$root$$.rc"),
_T("root.rc")} },
 {_T(" "), ZRD_ROOT_UPR, _R(".RC"),
{_T("$$ROOT$$.RC"), NULL} },
 . . .
}
```

The customizer tool 60 searches for strings in the source code files of the existing project that have the contexts listed in this table, and makes the project name to macro substitution only for those strings having these contexts. The contexts are selected to be safe (i.e., contexts where the substitution does not render the source code file inoperative) for source code files of projects that are generated from the standard templates. Thus, for existing projects that were originally based on the standard templates, the customizer tool 60 (and the custom application project generator 52 that it creates) makes the existing project name to macro to user chosen project name substitution in only the context where the substitution should be made to replicate the existing project's files into the application project 54.

In some embodiments of the invention, a collection or library of custom application project generators as described herein for generating various specific application project types can be formed and made available to users for developing the specific application types. Such a library can be distributed to users on a computer readable storage medium (e.g., floppy disk or CD-ROM), or alternatively made available for access over a computer network (e.g., from a server on a local client/server network, or from a forum or site on a commercial on-line service or the Internet). The library preferably provides a list of available custom application project generators from which the user can choose.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

For example, although the framework 74 (FIG. 2) for interfacing between the custom application project generator 52 and services module 76 is implemented in the illustrated embodiment using C++ virtual functions and exports, the framework 74 can alternatively be implemented using other software interfacing techniques such as Microsoft Corporation's object linking and embedding ("OLE") type objects. The advantage of implementing the framework 74 as OLE objects is that the writer will not have to update the custom application project generator 52 for each new version or update of the services module 76. With the illustrated framework 74 implemented as C++ virtual functions and exports, the custom application project generators would need to be recompiled. An alternative implementation of framework 74 as OLE objects adds a buffering layer of code between the application project generator 52 and the services module 76 which eliminates the need to recompile the custom application project generator 52 for any new version or updating of the service module 76.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An automated system for creating and customizing an application project generator to generate a specialized type of application, comprising:

a customizer user interface for interactively presenting a sequence of customizer dialogs each having one or more controls, the controls being responsive to input from a writer of the application project generator to thereby choose from a plurality of generator options; and a customizer tool being responsive to the customizer user interface for creating a generator project according to the generator options chosen by the writer, the generator project comprising:

a plurality of generator source files for building into the application project generator, a plurality of dialog resources for the application project generator to present a sequence of generator dialogs and controls that respond to input from a user of the application project generator to thereby choose from a plurality of application options, and a plurality of templates for processing by the application project generator according to the application options chosen by the user to generate an application project for building into the specialized application.

2. The system of claim 1 further comprising an editor for the writer to modify the generator source files, dialog resources, and templates of the generator project.

3. The system of claim 1 wherein the generator project is editable by the writer so that, when built into the application project generator, the sequence of dialogs includes at least one predetermined dialog and at least one writer-defined dialog.

4. The system of claim 1 wherein:

the customizer tool is responsive to the writer choosing a standard steps generator option to create the generator project such that, when built into the application project generator, the application project generator presents a set of predetermined generator dialogs to the user in a predetermined sequence;

the generator project is editable by the writer such that, when built into the application project generator, the application project generator presents a writer-defined sequence of generator dialogs including at least one of the set of predetermined generator dialogs and at least one writer-defined generator dialog.

5. The system of claim 1 wherein the generator project is editable by the writer such that the templates include at least one predetermined template and at least one writer-defined template.

6. The system of claim 1 further comprising:

a generator services module having services for presenting the sequence of generator dialogs to the user and for processing the templates to generate the application project; and a framework for the application project generator to interface with the generator services module so as to utilize the services.

7. The system of claim 6 wherein the framework comprises:

at least one function in the application project generator being called from the generator services module and editable by the writer in the generator source files to modify the presenting of the sequence of generator dialogs and the processing of the templates by the application project generator services module.

8. The system of claim 6 wherein the framework comprises:

at least one generator dialog navigation function in the application project generator being called by the generator services module and returning the generator dialogs according to the sequence for the generator services module to present in the sequence to the user, the at least one generator dialog navigation function being editable by the writer in the generator source files to thereby modify the sequence of the generator dialogs.

9. The system of claim 8 wherein the at least one generator dialog navigation function comprises a next function for returning a generator dialog that follows a current generator dialog in the sequence and a back function for returning a generator dialog that precedes the current generator dialog in the sequence.

10. The system of claim 8 wherein the framework further comprises:

a get dialog service in the generator services module being callable from the application project generator and returning one of a set of predetermined dialogs requested by the application project generator for presenting in the sequence.

11. The system of claim 6 wherein the framework comprises:

at least one template processing function in the application project generator being callable by the generator services module for processing the templates to generates the application project, the at least one template processing function being editable by the writer in the generator source files to thereby modify the generation of the application project.

12. The system of claim 6 wherein the framework comprises:

a set supported languages service in the generator services module being callable from the application project generator and returning a list of languages supported by the application project generator whereby the generator services module displays a languages option dialog to the user in the sequence of generator dialogs for choosing a target language of the application project from the languages supported by the application project generator.

13. The system of claim 1 wherein the customizer tool is responsive to the writer choosing a replicate existing project generator option to generate the templates from processing files of an existing project and substituting a macro name for a plurality of occurrences of a name of the existing project in the files whereby the application project generator replicates the existing project by expanding the macro name in the templates with a name of the application project.

14. The system of claim 1 further comprising:

a table of contexts in which to substitute the macro name for the name of the existing project; and the customizer tool substituting the macro name for only the occurrences of the name of the existing project in the contexts specified in the table.

15. The system of claim 1 wherein the templates include a project template containing instructions specifying the templates to be processed by the application project generator to generate the application project.

16. A computer executed method of customizing an application project generator to generate a specialized type of application, comprising the steps of:

presenting a sequence of generator dialogs to a writer of the application project generator at a user interface device with controls for the writer to choose from a plurality of generator options;

automatically creating a generator project by a customizer tool according to the generator options chosen by the writer, the generator project comprising a plurality of files, a first at least one of the files containing source code for building into the application project generator, a second at least one of the files containing dialog resources for presenting a sequence of application dialogs by the application project generator to a user with controls for the user to choose from a plurality of application options, a third at least one of the files containing templates with macros and directives for processing by the application project generator into an application project of the specialized type; and building the generator project into the application project generator by compiling the first at least one of the files.

17. The method of claim 16 wherein the step of automatically creating the generator project creates the generator project such that the application project generator presents a default sequence of application dialogs and processes a default set of templates, the method further comprising the steps of:

editing the generator project by the writer prior to the step of building the generator project into the application project generator to modify at least one of the default sequence of dialogs and the default set of templates.

18. An application project generator prepared by the method of claim 17.

19. The method of claim 16 wherein the step of automatically creating the generator project comprises the steps of:

when the writer chooses a first generator option for basing the application project generator on an existing project, processing the existing project by the customizer tool to produce a set of templates in the generator project, the existing project comprising at least one source code file containing a plurality of character strings, at least one of the character strings containing a remnant of a name of the existing project;

the step of processing the existing project comprising the step of substituting a macro name for each remnant of the name of the existing project occurring in any of a set of predetermined contexts in the at least one source code file of the existing project.

20. An application project generator prepared by the method of claim 16.

* * * * *

UNITED STATES PATENT AND TRADEMARK OFFICE
CERTIFICATE OF CORRECTION

PATENT NO. : 5,754,858
DATED : May 19, 1998
INVENTOR(S) : David Michael Broman, et al.

It is certified that error appears in the above-identified patent and that said Letters Patent is hereby corrected as shown below:

The following Appendix, consisting of A-F should be added to the patent, as per attached sheets.

Signed and Sealed this

Eleventh Day of July, 2000

Q. TODD DICKINSON

*Attest:*

*Attesting Officer*  *Director of Patents and Trademarks*

UNITED STATES PATENT AND TRADEMARK OFFICE
CERTIFICATE OF CORRECTION

PATENT NO.: 5,754,858

DATED : May 19, 1998

INVENTOR(S): Broman et al.

It is certified that error appears in the above-identified patent and that said Letters Patent is hereby corrected as shown below:

| Col/Line | Error Reads | Should Read |
|---|---|---|
| 5/17 | sentence is missing | Appendix F attached hereto lists the source code of the illustrated customizer tool 60.) |
| 9/35 | sentence is missing | These standard macros are described in the Appendix A attached hereto. |
| 9/49 | APP CLASS | APP_CLASS |
| 9/50 | MESSAGE.MAP | MESSAGE_MAP |
| 10/16 | sentence is missing | These directives are described in detail in the Appendix B attached hereto. |
| 10/41 | $$RQOT$$.h | $$ROOT$$.h |
| 10/42 | $$ROOT$$ . cpp | $$ROOT$$.cpp |
| 11/26 | RCOT | ROOT |
| 11/28 | dlgrooth.h | dlgroot.h |
| 11/29 | . \$$ROOT$$.cpp | .\$$ROOT$$.cpp |
| 12/1 | template rather | template (described in Appendix C) rather |
| 12/6 | "IDLGROOT.RC," | "DLGROOT.RC," |
| 13/32 | sentence is missing | These functions are described in detail in the attached Appendix D. |
| 14/5 | CObject public: | CObject { public: |
| 15/15 | sentence is missing | (The values for specifying the various standard steps in the illustrated embodiment are listed in the description of the GetDialog API function in Appendix D.) |
| 16/47 | described above. | described above and in more detail in Appendices A and B. |
| 17/4 | described above. | described above and detailed in the description of the newproj.inf template in Appendix C. |
| 17/49 | function of | function (described in detail in Appendix D) of |
| 18/48 | GetPlatforms"), | GetPlatforms " described in Appendix E), |
| 19/13 | generator. | generator (as described specifically in Appendix E). |
| 20/23 | file having | file listed in Appendix F) having |
| 20/23 | _R | _T |
| 20/45 | templates. | templates (described in appendix c). |
| 22/63 | templates to generates | templates to generate |

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

APPENDIX A
STANDARD TEMPLATE MACROS REFERENCE

Standard AppWizard Macros

This reference describes the macros that AppWizard uses to generate its custom resource templates. These macros correspond to, or are related to, controls in AppWizard's steps. You have access to these macros if your custom AppWizard uses one of the standard sequences of AppWizard steps: AppWizard Executable (exe) or AppWizard Dynamic-Link Library (dll).

The following macros are organized by the step (for MDI and SDI applications) where they are used. Some of the described macros also appear on analogous steps for dialog-based and DLL applications (for example, 3D is described with the other MDI/SDI step 4 macros, but it is also used by the dialog-based application's step 2).

New Project Workspace and Insert Project Dialog Box Options
- Step 1. Project Type Options
- Step 2. Database Options
- Step 3. OLE Options
- Step 4. Application Options
- Step 4. Advanced Options, Document Template Strings Tab
- Step 4. Advanced Options, Frame Styles Tab
- Step 4. Advanced Options, Macintosh-Specific Tab
- Step 5. Project Options
- Step 6. Class and File Names The following categories also exist:
- Miscellaneous Macros
- Language Logo Macros New Project Workspace and Insert Project Dialog Box Options

| Macro | Type | Description |
|---|---|---|
| FULL_DIR_PATH | text | The full path of the directory in which the generated project will be placed (including the new subdirectory), with a trailing backslash. |
| ROOT | text | The project name, no extension (all uppercase). |
| Root | | |
| root | text | The project name, no extension (cases as entered by user). |
| SAFE_ROOT | text | The project name, entered from the New Project Workspace dialog box or the Insert Project dialog box, stripped of any characters that are not alphanumeric characters (a-z, A-Z, and 0-9) or the underscore (_). The resulting value is safe to use in the name of a preprocessor and/or a C/C++ symbol. |
| TARGET_INTEL | BOOL | The project targets the Intel Win32 operating system. |
| TARGET_MIPS | BOOL | The project targets the MIPS Win32 operating system. |
| TARGET_ALPHA | BOOL | The project targets the ALPHA Win32 operating system. |

UNITED STATES PATENT AND TRADEMARK OFFICE
CERTIFICATE OF CORRECTION

Page 4 of 113

PATENT NO.  : 5,754,858

DATED       : May 19, 1998

INVENTOR(S) : Broman et al.

It is certified that error appears in the above-identified patent and that said Letters Patent is hereby corrected as shown below:

| Macro | Type | Description |
|---|---|---|
| CRecordView | BOOL | If and only if the view derives from CRecordView. Set if user has selected a database view with or without file support. |

Miscellaneous Macros

| Macro | Type | Description |
|---|---|---|
| DLGLOC_RC | text | This is always "DLGLOC.RC", and is used in an #INCLUDE directive in the DLGALL.RC custom resource template. |
| HLPARG_MAC | text | Help-file macro used in the MAKEHELP.BAT custom resource template. Always "1". |
| HLPARG_MACPATH | text | Help-file macro used in the MAKEHELP.BAT custom resource template. Always "2". |
| HM_FILE | text | Help-file macro used in the MAKEHELP.BAT custom resource template. Base name of the .HM file. |
| LANG_LIST_SUFFIXES | text | Comma-separated string containing a list of the three-letter abbreviations of all languages selected by the AppWizard user (for example, "ENU, FRA"). If an application supports only one language, the list is "". |
| LOC_RC | text | This is always "LOC.RC", and is used in an #INCLUDE directive in the ALL.RC custom resource template. |
| MACLOC_RC | text | This is always "MACLOC.RC", and is used in an #INCLUDE directive in the ALL.RC custom resource template. |
| mac_hpj | text | Help-file macro used in the MAKEHELP.BAT custom resource template. Base name of the Macintosh .HPJ file. |
| MFCPath | text | Path on the AppWizard user's computer where the MFC library resides. |
| YEAR | text | The current year. |

Language Loop Macros

The following macros are used in a language loop, which is a block of text delimited by the $$BEGINLOOP(NUM_LANGS) and $$ENDLOOP directives.

| Macro | Type | Description |
|---|---|---|
| LANGUAGE | text | Name of language (for example, "U.S. English"). |
| LANG_SUFFIX | text | Three-letter abbreviation of language (for example, "ENU"). |
| HLP_DIR_LOC | text | Name of directory to be created in the generated project, which will contain the localized elements of the application's context-sensitive help (for example, "HLP\ENU"; in an application with only one language, this is always "HLP"). |
| RES_DIR_LOC | text | Name of directory to be created in the generated project, which will contain those files included by the application's .RC file that are localized (for example, "RES\ENU"; in an application with only one language, this is always "RES"). |

UNITED STATES PATENT AND TRADEMARK OFFICE
CERTIFICATE OF CORRECTION

PATENT NO.    : 5,754,858

DATED         : May 19, 1998

INVENTOR(S)   : Broman et al.

It is certified that error appears in the above-identified patent and that said Letters Patent is hereby corrected as shown below:

| Macro | Type | Description |
|---|---|---|
| TARGET_MAC | BOOL | The project targets the Macintosh (set if either 680x0 Macintosh or Power Macintosh is chosen). |
| TARGET_68KMAC | BOOL | The project targets the 680x0 Macintosh. |
| TARGET_POWERMAC | BOOL | The project targets the Power Macintosh. |

Step 1. Project Type Options

Only one of the Project Type macros can be in the dictionary.

| Macro | Type | Description |
|---|---|---|
| PROJTYPE_MDI | BOOL | Whether the AppWizard user or custom AppWizard user has selected a multiple document interface. |
| PROJTYPE_SDI | BOOL | Whether the AppWizard user or custom AppWizard user has selected a single document interface. |
| PROJTYPE_DLG | BOOL | Whether the AppWizard user or custom AppWizard user has selected a dialog-based application. |
| PROJTYPE_DLL | BOOL | Whether the AppWizard user or custom AppWizard user has specified that the project be a DLL. If this macro is set, the 680x0 Macintosh platform is not listed in the New Project Workspace or the Insert Project's Platforms checklist, and the project makefile builds a DLL rather than an executable file. |
| PROJTYPE_CUSTOMAW | BOOL | Whether the AppWizard user or custom AppWizard user has selected a Custom AppWizard project type. Note that this macro will rarely be used in a custom AppWizard. It is only used when CUSTMWZ.AWX is launched. |

Step 2. Database Options

One or more database macros may be defined.

| Macro | Type | Description |
|---|---|---|
| DAO | BOOL | Whether the selected data source is DAO; otherwise, it is ODBC. |
| DB | BOOL | Whether the AppWizard user or custom AppWizard user has selected, at least, minimal database support. In other words, a radio button other than None is chosen by the user. |
| DB_NO_DETECT | BOOL | Whether MFC should automatically detect when columns have been modified. TRUE means do not auto detect. |
| DB_TABLE_TYPE | text | Type of recordset class being created. For DAO, DB_TABLE_TYPE can be one of the following: |

- dbOpenDynaset
- dbOpenSnapshot
- dbOpenTable

For ODBC, DB_TABLE_TYPE can be one of the following:

- Snapshot
- Dynaset

UNITED STATES PATENT AND TRADEMARK OFFICE
CERTIFICATE OF CORRECTION

PATENT NO.    : 5,754,858

DATED         : May 19, 1998

INVENTOR(S)   : Broman et al.

It is certified that error appears in the above-identified patent and that said Letters Patent is hereby corrected as shown below:

| Name | Type | Description |
|---|---|---|
| RES_DIR_LOC_DBLSLASH | text | Same as RES_DIR_LOC, except any backslashes are doubled (for example, "RES\ENU"; again, this is always "RES" in an application with only one language). |
| MFC_DIR_LOC | text | Name of directory that contains the localizable resources the application will include from MFC. All backslashes are doubled. (For example, "L.FRA\\"; all English resources from MFC are in the main include directory. This macro expands to "" in the case of English.) |
| LANG_PREAMBLE | text | Code that is inserted in the application's .RC file, which precedes a localized resource. For example: #if !defined(AFX_RESOURCE_DLL) \|\| defined(AFX_TARG_ENU) #ifdef _WIN32 LANGUAGE 9, 1 #pragma code_page(1252) #endif (In an application with only one language, this is "".) |
| LANG_PREAMBLE_INQUOTES | text | Same as LANG_PREAMBLE, except each line is tabbed and enclosed in quotes. For example: "#if !defined(AFX_RESOURCE_DLL) \|\| defined(AFX_TARG_ENU)" "#ifdef _WIN32"   "LANGUAGE 9, 1" "#pragma code_page(1252)"   "#endif" |
| LANG_POSTAMBLE | text | Code that's inserted in the application's .RC file, which follows a localized resource. For example: #endif (In an application with only one language, this is "".) |
| LANG_POSTAMBLE_INQUOTES | text | Same as LANG_POSTAMBLE, except each line is tabbed and enclosed in quotes. For example: "#endif" (In an application with only one language, this is "".) |
| NUM_LANGS | text | The number of languages the user has chosen. (Commonly used as the argument to $$BEGINLOOP.) |
| MULTIPLE_LANGS | BOOL | Whether the user chose more than one language. Currently, never defined. Reserved for future use. |

UNITED STATES PATENT AND TRADEMARK OFFICE
CERTIFICATE OF CORRECTION

Page 7 of 113

PATENT NO. : 5,754,858

DATED : May 19, 1998

INVENTOR(S) : Broman et al.

It is certified that error appears in the above-identified patent and that said Letters Patent is hereby corrected as shown below:

APPENDIX B

STANDARD TEMPLATE DIRECTIVES REFERENCE $IF, $$ELIF, $$ELSE, and $$ENDIF

```
$$IF(macro-list)
    textA
$$ELIF(macro-list)
    textB
$$ELSE
    textC
$$ENDIF
```

Parameters

*macro-list* One or more macro names.

A macro name can be preceded by the logical NOT operator (!). Multiple macro names are separated by the logical OR (||) operator. A macro name can be one of the standard AppWizard macros or one that you create by adding it to the dictionary.

Remarks

The $$IF directive, with the $$ELIF, $$ELSE, and $$ENDIF directives, controls the flow of control that the ProcessTemplate function follows while parsing a custom resource template.

When the parser encounters an $$IF directive, it searches the dictionary for each macro name it finds in *macro-list*, in sequential order. The parser checks only for a macro name's existence in the dictionary, not its value. Once a macro name is found in the dictionary, the parser stops checking the other macro names, the $$IF evaluates to TRUE, and textA is parsed. If the parser finds none of the macro names in the dictionary, the $$IF evaluates to FALSE and the parser processes any subsequent $$ELIF directive's *macro-list* as it did the $$IF *macro-list*. If an $$ELIF evaluates to TRUE, textB is parsed. If no $$ELIF directive evaluates to TRUE, the $$ELSE body (textC) is parsed. The $$ENDIF directive marks the end of the $$IF construct, and normal parsing resumes with the next line.

In the $$IF and $$ELIF arguments, any macro name can be preceded by the logical NOT operator (!) to force the parser to check for non-existence in the dictionary. For example, the following code fragment evaluates to true if MACRO1 is not in the dictionary:

$$IF(!MACRO1)

Each $$IF directive in a custom resource template must be matched by a closing $$ENDIF directive. Multiple $$ELIF directives can appear between the $$IF and $$ENDIF directives, but at most one $$ELSE directive is allowed. That $$ELSE directive, if present, must follow all the $$ELIFs (if any) in that $$IF-$$ENDIF block. If a custom resource template contains an $$IF, any following $$ELIF and/or $$ELSE is optional. An ending $$ENDIF is mandatory. $$IF constructs can be nested up to five levels deep.

UNITED STATES PATENT AND TRADEMARK OFFICE
CERTIFICATE OF CORRECTION

PATENT NO.  : 5,754,858

DATED  : May 19, 1998

INVENTOR(S)  : Broman et al.

It is certified that error appears in the above-identified patent and that said Letters Patent is hereby corrected as shown below:

There is no logical AND (&&) operator. If you wish to have text parsed only when MACRO1 and MACRO2 are defined, you can accomplish this as follows:

```
##IF(MACRO1)
##IF(MACRO2)
text
##ENDIF //MACRO2
##ENDIF //MACRO1
```

INCLUDE

INCLUDE( template-name-macro );

Parameters

*template-name-macro*  A macro name with a value that must be the name of a custom resource template. A macro name can be one of the standard AppWizard macros or one that you create by adding it to the dictionary.

Remarks

The parser searches for an ##INCLUDE directive's *template-name-macro* in the dictionary. If *template-name-macro* is in the dictionary, the associated custom resource template is loaded and parsed. Once the associated template is parsed, parsing of the original template resumes.

Note  The template associated with *template-name-macro* must be a text template and must be parsed using ProcessTemplate. The base-class version of ProcessTemplate will not parse binary templates.

If *template-name-macro* is not in the dictionary, MFCAPWZ.DLL displays an error message and stops the file generation process. If the template associated with *filename-macro* is not found, again a message is displayed and an exception is thrown.

You can nest ##INCLUDE directives arbitrarily deep. That is, if one template includes a second template via ##INCLUDE, that second template may include a third via ##INCLUDE, and so on. However, templates cannot be recursively included. That is, if template A includes template B, which includes template C, and so on, then template A cannot be included in the include chain. MFCAPWZ.DLL detects recursive includes, prints an error message, and stops the file generation process.

BEGINLOOP and ##ENDLOOP

BEGINLOOP( macro-name );

text

ENDLOOP;

Parameters

UNITED STATES PATENT AND TRADEMARK OFFICE
CERTIFICATE OF CORRECTION

Page 9 of 113

PATENT NO.    : 5,754,858

DATED         : May 19, 1998

INVENTOR(S)   : Broman et al.

It is certified that error appears in the above-identified patent and that said Letters Patent is hereby corrected as shown below:

*macro-name*  A macro name that you have added to the dictionary with a value that must be a numeric string in decimal format (for example, "12"). The *macro-name* argument must be the name of a macro, not a constant value.

*text*  One or more lines of text that may include C++ code, resource script statements, macros, directives, or whatever you parsed.

Remarks

Custom resource templates can use a $$BEGINLOOP and $$ENDLOOP construct to force the CCustomAppWiz::ProcessTemplate function's parser to process *text* the number of times specified by the value of *macro-name*.

The parser treats every macro that it encounters between a $$BEGINLOOP and an $$ENDLOOP, including *macro-name*, in the following manner:

1. If, for example, the parser encounters a macro named VAR, it looks in the dictionary for a macro named VAR_*n*, where *n* is an integer that corresponds to the number of times that the parser has iterated through *text*. The iterations are numbered 0, 1, ..., *n*-1, so that the parser looks for macros named VAR_0, VAR_1, and so on.

2. If the parser does not find VAR_*n* in the dictionary, it looks just for VAR.

Loops cannot be nested. A second $$BEGINLOOP before the first $$ENDLOOP is illegal.

$$SET_DEFAULT_LANG

$$SET_DEFAULT_LANG( *macro-name* );

Parameters

*macro-name*  A macro name you add to the dictionary. The value of *macro-name* must be a three-letter string that corresponds to a language previously selected by an AppWizard or custom AppWizard user. Table 24.5 provides a partial list of possible values for *macro-name*.

Table 24.5  Language Identifiers

| Value | Language |
|-------|----------|
| DEU   | German   |
| ENU   | English  |
| ESP   | Spanish  |
| FRA   | French   |
| ITA   | Italian  |
| SVE   | Swedish  |

UNITED STATES PATENT AND TRADEMARK OFFICE
CERTIFICATE OF CORRECTION

Page 10 of 113.

PATENT NO. : 5,754,858

DATED : May 19, 1998

INVENTOR(S) : Broman et al.

It is certified that error appears in the above-identified patent and that said Letters Patent is hereby corrected as shown below:

Remarks

You use the ##SET_DEFAULT_LANG directive to specify a language-identifier for the CCustomAppWz::LoadTemplate function to use when it searches for a custom resource template to load for use by CCustomAppWz::CopyTemplate or CCustomAppWz::ProcessTemplate.

Note Code to perform the following procedure is automatically generated if your custom AppWizard uses the existing set of AppWizard steps for generating an executable file and if you select more than one language from the Custom AppWizard project type's language list.

If you use the ##SET_DEFAULT_LANG directive in a loop defined by the ##BEGINLOOP and ##ENDLOOP directives, you can use ##BEGINLOOP and ##ENDLOOP to modify macros to write code that finds, extracts, and processes multiple language versions of a language-specific template. For information on how ##BEGINLOOP and ##ENDLOOP modify macros, see ##BEGINLOOP and ##ENDLOOP.

The language identifier, which is the value of *macro-name*, also specifies the search order that LoadTemplate uses to search for a DLL.

Say that ##SET_DEFAULT_LANG is called with a *macro-name* that expands to "DEU". LoadTemplate will go through the following algorithm to locate a template named TEMPLATE.RC:

1. Try locating TEMPLATE_DEU.RC in the custom AppWizard's resources.

2. If not there, try locating TEMPLATE.RC in the custom AppWizard's resources.

3. If not there, try locating TEMPLATE.RC in MFCAPWZ.DLL.

4. If not there, try locating TEMPLATE.RC in APPWZDEU.DLL.

5. If not there, try locating TEMPLATE.RC in all the other APPWZ*.DLLs selected by the custom AppWizard user.

6. If not there, display an error and stop file generation.

Notice that in step 1, LoadTemplate looks for the template under the localized name (TEMPLATE_DEU.RC). If it can't find a template named TEMPLATE_DEU.RC in the custom AppWizard's resources, it reverts back to searching for the actual name (TEMPLATE.RC).

Note If AppWizard itself is being run rather than a custom AppWizard, MFCAPWZ.DLL starts the search process at step 3, and thus never tries to locate the template under the localized name.

Example

Imagine that a user of your custom AppWizard generates a project that will generate an application for use by English-, French-, and Japanese-speaking people. To create the user's project, your custom AppWizard must find the templates containing strings translated into these languages. It must search in DLLs that include, at least, your custom AppWizard's DLL, MFCAPWZ.DLL, and possibly

UNITED STATES PATENT AND TRADEMARK OFFICE
CERTIFICATE OF CORRECTION

Page 11 of 113

PATENT NO. : 5,754,858

DATED : May 19, 1998

INVENTOR(S) : Broman et al.

It is certified that error appears in the above-identified patent and that said Letters Patent is hereby corrected as shown below:

APPWZENU.DLL, APPWZFRA.DLL, and APPWZJPN.DLL. For simplicity, we will examine finding and loading one template, FILE.TXT.

Because FILE.TXT is a text file, it will probably be translated into English, French, and Japanese. Your custom AppWizard's DLL must contain three versions of this file named FILE_ENU.TXT, FILE_FRA.TXT, and FILE_JPN.TXT. Also, your custom AppWizard must make the following addition to the dictionary:

myprojectaw.m_Dictionary["FILE"] = "FILE.TXT";

To track the three languages specified by the user, you add macros to the dictionary as follows:

myprojectaw.m_Dictionary["LANG_SUFFIX_0"] = "ENU";
myprojectaw.m_Dictionary["LANG_SUFFIX_1"] = "FRA";
myprojectaw.m_Dictionary["LANG_SUFFIX_2"] = "JPN";

Then, when your customAppWizard must find and load language-specific templates, it does so in a loop as follows:

```
$$BEGINLOOP(NUM_LANGS)
$$SET_DEFAULT_LANG(LANG_SUFFIX)
$$// include text from the
$$// properly localized template:
$$INCLUDE(FILE)
$$ENDLOOP
```

If NUM_LANGS has the value of "3", then this loop will iterate three times. During each iteration, MFCAPWZ.DLL will modify its lookup procedure for the LANG_SUFFIX macro and CCustomAppwiz::LoadTemplate will modify its template-loading procedure as follows:

- First iteration: LANG_SUFFIX first becomes LANG_SUFFIX_0. The value of FILE is extracted from the dictionary and, when $$INCLUDE causes LoadTemplate to be called, the value of FILE is combined with the value of LANG_SUFFIX_0 to produce FILE_ENU.TXT.

- Second iteration: LANG_SUFFIX first becomes LANG_SUFFIX_1. The value of FILE is extracted from the dictionary and, when $$INCLUDE causes LoadTemplate to be called, the value of FILE is combined with the value of LANG_SUFFIX_1 to produce FILE_FRA.TXT.

- Third iteration: LANG_SUFFIX first becomes LANG_SUFFIX_2. The value of FILE is extracted from the dictionary and, when $$INCLUDE causes LoadTemplate to be called, the value of FILE is combined with the value of LANG_SUFFIX_2 to produce FILE_JPN.TXT.

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

Thus, the value of LANG_SUFFIX is transformed to "ENU", "FRA", and "JPN" and LoadTemplate will know to first load APWZENU.DLL, then APWZFRA.DLL, and finally APWZJPN.DLL if any of the templates it seeks are not in the custom AppWizard's DLL. For more information on the transformation of macro names, see ##BEGINLOOP and ##ENDLOOP.

Note   The argument to the ##SET_DEFAULT_LANG directive must correspond to an APPWZ*.DLL already chosen by the AppWizard or custom AppWizard user. Otherwise, MFCAPWZ.DLL will display an error message and stop file generation immediately after parsing the ##SET_DEFAULT_LANG directive.
//
Remarks
The ProcessTemplate function's parser treats a line beginning with ##// as a comment. A comment can be preceded by just // when it appears after a directive on the same line. The following line is a comment:
// This line is a comment The following line begins with an ##ENDIF directive and ends with a comment:
ENDIF //MACRO1

UNITED STATES PATENT AND TRADEMARK OFFICE
CERTIFICATE OF CORRECTION

Page 13 of 113

PATENT NO.   : 5,754,858

DATED        : May 19, 1998

INVENTOR(S)  : Broman et al.

It is certified that error appears in the above-identified patent and that said Letters Patent is hereby corrected as shown below:

APPENDIX C
STANDARD TEMPLATES REFERENCE

Standard Custom Resource Templates

AppWizard uses a standard set of custom resource templates to build the projects it generates. It also copies some subset of these templates to custom AppWizard projects that are based on the standard AppWizard steps. These templates allow custom AppWizards to generate projects just as AppWizard does.

These standard templates provide a common look and feel to applications created from AppWizard projects and include templates from which .H, .CPP, .RC, .CLW, .ODL, and .RC2 files are built. They also include bitmaps of standard user-interface components and templates that simplify generating help files.

Localization of Standard Templates

The standard templates are separated into two main categories: localized and nonlocalized. Localized templates contain strings that have been translated into languages other than English. These strings are stored in the language DLLs—DLLs with names described by APPWZ*.DLL, where * is a language code such as ENU or JPN. The nonlocalized templates are stored in MFCAPWZ.DLL. When a localized template is generated for a custom AppWizard project, the template's filename will contain an embedded language code. Thus, for a custom AppWizard that supports Japanese, the templates named DLGLOC.RC and ROOT.HPJ will be renamed as DLGLOC_JPN.RC and ROOT_JPN.HPJ. The names of nonlocalized templates remain the same.

AppWizard provides a set of templates that are common to all project types and some that are unique to each major project type. Major project types are dynamic-link library, dialog-based, single document interface (SDI), and multiple document interface (MDI). In addition, AppWizard provides resource templates for help files, as well as database, OLE, and Macintosh applications. The following sections provide details about the individual templates:

All AppWizard Projects
Dialog-Based Applications
Dynamic-Link Libraries
MDI and SDI Applications
OLE Applications
Help File Support
Custom AppWizard Help File Support
Database Applications
Macintosh Applications

All AppWizard Projects

AppWizard copies the following resource templates into every AppWizard project:

README.TXT  Two of these templates are generated: one in a custom AppWizard project's root directory and one in the custom AppWizard project's TEMPLATE directory. The first describes the files that AppWizard generated for your custom AppWizard project. The second is a template that the custom AppWizard writer uses to create a README.TXT file for the custom AppWizard user. This file is one of the templates provided by MFCAPWZ.DLL.

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

ROOT.RC2  This secondary resource script file is copied to your custom AppWizard project's TEMPLATE directory. Its purpose is to contain those resources that are not edited in Microsoft Developer Studio. Resources that are edited in Microsoft Developer Studio are kept in the main .RC file. This file is one of the templates provided by MFCAPWZ.DLL.

STDAFX.CPP  This implementation file is copied to your custom AppWizard project's TEMPLATE directory. It is used to build a precompiled header (.PCH) file and a precompiled types file named STDAFX.OBJ. This file is one of the templates provided by MFCAPWZ.DLL.

STDAFX.H  This header file is copied to your custom AppWizard project's TEMPLATE directory. It is used to build a .PCH file and a precompiled types file named STDAFX.OBJ. This file is one of the templates provided by MFCAPWZ.DLL.

Dialog-Based Applications

DIALOG.CPP  The primary implementation file for the project's main dialog box and About dialog box. This file is one of the templates provided by MFCAPWZ.DLL.

DIALOG.H  The primary header file for the project's main dialog box and About dialog box. This file is one of the templates provided by MFCAPWZ.DLL.

DLGALL.RC  The primary resource script file that contains all resources that are not localized (translated into languages such as French or Japanese). DLGALL.RC includes (via #INCLUDE directives) a resource script file, DLGLOC.RC, that contains all of the localized templates. DLGALL.RC is one of the templates provided by MFCAPWZ.DLL.

DLGLOC.RC  The localized resource script file. A localized version of this template resides in each of the localized-resource DLLs, those with names described by APPWZ*.DLL, such as APPWZDEU.DLL. This template is also used for DLL projects. There is no Macintosh version of DLGLOC.RC because dialog-based applications and DLL projects have no need for separate Macintosh resources.

DLGRES.H  The primary header file for resources. This template is also used for dynamic-link libraries. This file is one of the templates provided by MFCAPWZ.DLL.

DLGROOT.CLW  ClassWizard information file for dialog-based applications generated by AppWizard. This file is one of the templates provided by MFCAPWZ.DLL.

DLGROOT.CPP  The primary implementation file, project.CPP, where project is the project name entered by the end user of the custom AppWizard. This file is one of the templates provided by MFCAPWZ.DLL.

DLGROOT.H  The primary header file, project.H, where project is the project name entered by the end user of the custom AppWizard. This file is one of the templates provided by MFCAPWZ.DLL.

UNITED STATES PATENT AND TRADEMARK OFFICE
CERTIFICATE OF CORRECTION

Page 15 of 113

PATENT NO. : 5,754,858

DATED : May 19, 1998

INVENTOR(S) : Broman et al.

It is certified that error appears in the above-identified patent and that said Letters Patent is hereby corrected as shown below:

ROOT.ICO  The application icon. This template is also used by MDI and SDI applications. It is one of the templates provided by MFCAPWZ.DLL.

Dynamic-Link Libraries

DLGRES.H  The primary header file for resources. This template is also used for dialog-based applications. It is one of the templates provided by MFCAPWZ.DLL.

DLLROOT.CLW  The ClassWizard information file for DLLs generated by AppWizard. This file is one of the templates provided by MFCAPWZ.DLL.

DLLROOT.CPP  The primary implementation file, project.CPP, where project is the project name entered by the end user of the custom AppWizard. This file is one of the templates provided by MFCAPWZ.DLL.

DLLROOT.H  The primary header file, project.H, where project is the project name entered by the end user of the custom AppWizard. This file is one of the templates provided by MFCAPWZ.DLL.

ROOT.DEF  The module-definition file, project.H, where project is the project name entered by the end user of the custom AppWizard. The module-definition file contains the list of functions to be exported from the end user's DLL. This file is one of the templates provided by MFCAPWZ.DLL.

MDI and SDI Applications

AFXCORE.RTF  A rich-text file for generating a help (.HLP) file. This file is one of the resource templates provided by the localized language DLLs, such as APPWZJPN.DLL.

ALL.RC  The primary resource script file that resides in MFCAPWZ.DLL and contains all resources that are not localized (translated into languages such as French or Japanese). ALL.RC includes, via ##INCLUDE directives, two localized templates that contain all of the localized resources: LOC.RC and MACLOC.RC. Localized versions of these templates reside in each of the localized-resource DLLs, those with names described by APPWZ*.DLL, such as APPWZDEU.DLL.

CHILDFRM.CPP  The child-frame implementation file. This file is one of the templates provided by MFCAPWZ.DLL.

CHILDFRM.H  The child-frame header file. This file is one of the templates provided by MFCAPWZ.DLL.

DOC.CPP  The document implementation file. This file is one of the templates provided by MFCAPWZ.DLL.

DOC.H  The document header file. This file is one of the templates provided by MFCAPWZ.DLL.

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

DOC.ICO  The document icon. This file is one of the resource templates provided by the localized language DLLs, such as APPWZJPN.DLL.

FRAME.CPP  The main-frame implementation file. This file is one of the templates provided by MFCAPWZ.DLL.

FRAME.H  The main-frame header file. This file is one of the templates provided by MFCAPWZ.DLL.

LOC.RC  The localized resource script file that contains all the localizable lines of the .RC file except for the Macintosh menus and accelerators. This file is one of the resource templates provided by the localized language DLLs, such as APPWZJPN.DLL.

RESOURCE.H  The primary header file for resources. It is one of the templates provided by MFCAPWZ.DLL.

ROOT.CPP  The primary implementation file, project.CPP, where project is the project name entered by the end user of the custom AppWizard. This file is one of the templates provided by MFCAPWZ.DLL.

ROOT.H  The primary header file, project.H, where project is the project name entered by the end user of the custom AppWizard. This file is one of the templates provided by MFCAPWZ.DLL.

ROOT.CLW  The ClassWizard information file for SDI and MDI applications generated by AppWizard. This file is one of the templates provided by MFCAPWZ.DLL.

ROOT.ICO  The application icon. This template is also used by dialog-based applications. It is one of the templates provided by MFCAPWZ.DLL.

VIEW.CPP  The view implementation file. This file is one of the templates provided by MFCAPWZ.DLL.

VIEW.H  The view header file. This file is one of the templates provided by MFCAPWZ.DLL.

APPEXIT.BMP  A bitmap, for use in help files, that creates the user interface for closing the application. This file is one of the resource templates provided by the localized language DLLs, such as APPWZJPN.DLL.

BULLET.BMP  A bitmap, for use in help files, that creates a bullet for items in a bulleted list. This file is one of the resource templates provided by MFCAPWZ.DLL.

CURARW2.BMP  A bitmap, for use in help files, that creates the horizontal-sizing cursor. This file is one of the resource templates provided by MFCAPWZ.DLL.

CURARW4.BMP  A bitmap, for use in help files, that creates the move cursor. This file is one of the resource templates provided by MFCAPWZ.DLL.

UNITED STATES PATENT AND TRADEMARK OFFICE
CERTIFICATE OF CORRECTION

Page 17 of 113

PATENT NO.    : 5,754,858

DATED         : May 19, 1998

INVENTOR(S)   : Broman et al.

It is certified that error appears in the above-identified patent and that said Letters Patent is hereby corrected as shown below:

CURHELP.BMP  A bitmap, for use in help files, that creates the toolbar button for SHIFT+F1 help. This file is one of the resource templates provided by MFCAPWZ.DLL.

EDITCOPY.BMP  A bitmap, for use in help files, that creates the toolbar button for the Edit menu's Copy command. This file is one of the resource templates provided by MFCAPWZ.DLL.

EDITCUT.BMP  A bitmap, for use in help files, that creates the toolbar button for the Edit menu's Cut command. This file is one of the resource templates provided by MFCAPWZ.DLL.

EDITPAST.BMP  A bitmap, for use in help files, that creates the toolbar button for the Edit menu's Paste command. This file is one of the resource templates provided by MFCAPWZ.DLL.

EDITUNDO.BMP  A bitmap, for use in help files, that creates the toolbar button for the Edit menu's Undo command. This file is one of the resource templates provided by MFCAPWZ.DLL.

FILENEW.BMP  A bitmap, for use in help files, that creates the toolbar button for the File menu's New command. This file is one of the resource templates provided by MFCAPWZ.DLL.

FILEOPEN.BMP  A bitmap, for use in help files, that creates the toolbar button for the File menu's Open command. This file is one of the resource templates provided by MFCAPWZ.DLL.

FILEPRNT.BMP  A bitmap, for use in help files, that creates the toolbar button for the File menu's Print command. This file is one of the resource templates provided by MFCAPWZ.DLL.

FILESAVE.BMP  A bitmap, for use in help files, that creates the toolbar button for the File menu's Save command. This file is one of the resource templates provided by MFCAPWZ.DLL.

HLPSBAR.BMP  A bitmap, for use in help files, that creates the status bar. This file is one of the resource templates provided by the localized language DLLs, such as APPWZJPN.DLL.

HLPTBAR.BMP  A bitmap, for use in help files, that creates a cutaway view of the toolbar. This file is one of the resource templates provided by MFCAPWZ.DLL.

RECFIRST.BMP  A bitmap, for use in help files, that creates the toolbar button for the Record menu's First command. This file is one of the resource templates provided by MFCAPWZ.DLL.

RECLAST.BMP  A bitmap, for use in help files, that creates the toolbar button for the Record menu's Last command. This file is one of the resource templates provided by MFCAPWZ.DLL.

RECNEXT.BMP  A bitmap, for use in help files, that creates the toolbar button for the Record menu's Next command. This file is one of the resource templates provided by MFCAPWZ.DLL.

RECPREV.BMP  A bitmap, for use in help files, that creates the toolbar button for the Record menu's Previous command. This file is one of the resource templates provided by MFCAPWZ.DLL.

SCMAX.BMP  A bitmap, for use in help files, that creates the frame's maximize button. This file is one of the resource templates provided by MFCAPWZ.DLL.

UNITED STATES PATENT AND TRADEMARK OFFICE
CERTIFICATE OF CORRECTION

Page 18 of 113

PATENT NO. : 5,754,858

DATED : May 19, 1998

INVENTOR(S) : Broman et al.

It is certified that error appears in the above-identified patent and that said Letters Patent is hereby corrected as shown below:

SCMENU.BMP  A bitmap, for use in help files, that creates a cutaway view of the System and File menus. This file is one of the resource templates provided by the localized language DLLs, such as APPWZJPN.DLL.

SCMIN.BMP  A bitmap, for use in help files, that creates the frame's minimize button. This file is one of the resource templates provided by MFCAPWZ.DLL.

TBA___.BMP  A bitmap that creates the default toolbar. The toolbar does not include a Help button. This file is one of the resource templates provided by MFCAPWZ.DLL.

TBAH__.BMP  A bitmap that creates the default toolbar and includes a Help button. This file is one of the resource templates provided by MFCAPWZ.DLL.

TBD__.BMP  A bitmap that creates the default toolbar and includes a database view without file support. The toolbar does not include a Help button. This file is one of the resource templates provided by MFCAPWZ.DLL.

TBDH_.BMP  A bitmap that creates the default toolbar and includes a database view with no file support. The toolbar includes a Help button. This file is one of the resource templates provided by MFCAPWZ.DLL.

TBR__.BMP  A bitmap that creates the default toolbar and includes a database view and file support. The toolbar does not include Help button. This file is one of the resource templates provided by MFCAPWZ.DLL.

TBRH_.BMP  A bitmap that creates the default toolbar and includes a database view and file support. The toolbar includes a Help button. This file is one of the resource templates provided by MFCAPWZ.DLL.

OLE Applications

AFXOLECL.RTF  A rich-text file for generating a help (.HLP) file containing information on MDI and SDI OLE containers. This file is one of the resource templates provided by the localized language DLLs, such as APPWZJPN.DLL.

AFXOLESV.RTF  A rich-text file for generating an MDI and SDI OLE server application's help file. This file is one of the resource templates provided by the localized language DLLs, such as APPWZJPN.DLL.

CNTRITEM.CPP  The container-item implementation file for MDI and SDI OLE container applications.

CNTRITEM.H  The container-item header file for MDI and SDI OLE container applications.

IPFRAME.CPP  The in-place frame implementation file for MDI and SDI OLE server applications.

UNITED STATES PATENT AND TRADEMARK OFFICE
CERTIFICATE OF CORRECTION

PATENT NO.    : 5,754,858

DATED         : May 19, 1998

INVENTOR(S)   : Broman et al.

It is certified that error appears in the above-identified patent and that said Letters Patent is hereby corrected as shown below:

IPFRAME.H  The in-place frame header file for MDI and SDI OLE server applications.

ROOT.REG  The registry information file to contain the globally unique identifier (GUID) that an application must expose to the registry, along with all other information needed to register the generated application as an OLE server or the default editor of a particular document type. All references to a GUID in this file are through AppWizard macros whose values are set when the end user chooses OLE server or OLE automation from the OLE Options dialog box.

ROOT.ODL  The Object Description Language file to contain a GUID for each OLE object that an application must expose through OLE automation. All references to a GUID in this file are through AppWizard macros whose values are set when the end user chooses OLE automation from the OLE Options dialog box.

SRVRITEM.CPP  The server-item implementation file for MDI and SDI OLE server applications.

SRVRITEM.H  The server-item header file for MDI and SDI OLE server applications.

TBA_I.BMP  A bitmap file that creates an in-place frame toolbar for default OLE server and mini-server applications. The toolbar does not include a Help button. An OLE server application displays TBA_I.BMP, rather than TBA__.BMP, upon activation as an in-place server from within an OLE container application. Mini-servers only use the in-place toolbar because mini-servers can't be launched as stand-alone applications. This file is one of the resource templates provided by MFCAPWZ.DLL.

TBAHI.BMP  A bitmap file that creates an in-place frame toolbar for default OLE server and mini-server applications. The toolbar includes a Help button. An OLE server application displays TBAHI.BMP, rather than TBAH_.BMP, upon activation as an in-place server from within an OLE container application. Mini-servers only use the in-place toolbar because mini-servers can't be launched as stand-alone applications. This file is one of the resource templates provided by MFCAPWZ.DLL.

TBRHI.BMP  A bitmap file that creates a floating, dockable toolbar for the in-place frame toolbar, which includes database view and file support. The toolbar includes a Help button. An OLE server application with a database view displays TBRHI.BMP, rather than TBRH_.BMP, upon activation as an in-place server from within an OLE container application. Mini-servers only use the in-place toolbar because mini-servers can't be launched as stand-alone applications. This file is one of the resource templates provided by MFCAPWZ.DLL.

TBR_I.BMP  A bitmap file that creates a floating, dockable toolbar for the in-place frame toolbar, which includes database view and file support. The toolbar does not include a Help button. An OLE server application with a database view displays TBR_I.BMP, rather than TBR__.BMP, upon activation as an in-place server from within an OLE container application. Mini-servers only use the in-place toolbar because mini-servers can't be launched as stand-alone applications. This file is one of the resource templates provided by MFCAPWZ.DLL.

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

Help File Support

AFXDLG.RTF   This rich-text file is copied to your custom AppWizard project's TEMPLATE directory. It is used to generate a help (.HLP) file for dialog-based applications. This file is one of the resource templates provided by the localized language DLLs, such as APPWZJPN.DLL.

AFXPRINT.RTF   This rich-text file is copied to your custom AppWizard project's TEMPLATE directory. It contains only print and print preview topics and is used to generate a help file for MDI and SDI applications that use printing and print preview. This file is one of the resource templates provided by the localized language DLLs, such as APPWZJPN.DLL.

DLGROOT.CNT   Windows 95 WinHelp contents file for dialog-based applications. This text file creates the hierarchy of help topics that is displayed on the Contents tab of your custom AppWizard's help file. The nodes of the hierarchy are links into the actual help file. This file is one of the templates provided by MFCAPWZ.DLL.

ROOT.CNT   Windows 95 WinHelp contents file for SDI and MDI applications. This text file creates the hierarchy of help topics that is displayed on the Contents tab of your custom AppWizard's help file. The nodes of the hierarchy are links into the actual help file. This file is one of the templates provided by MFCAPWZ.DLL.

ROOT.HPJ   This help project file is copied to your custom AppWizard project's TEMPLATE directory. It is used to generate Win32 application help files and lists all of the .RTF files that MAKEHELP.BAT must process to produce an .HLP file. This file is one of the resource templates provided by the localized language DLLs, such as APPWZJPN.DLL.

Custom AppWizard Help File Support

AppWizard gives you the tools you need to create context-sensitive help for the custom steps in your custom AppWizard:

- A starter file in rich-text format (.RTF) that contains a topic for each custom step AppWizard generates. You need only use an .RTF editor (such as Microsoft Word) to supply the text for the ready-made topics.

- A MAKEHELP.BAT that generates a header map (.HM) file and compiles the custom AppWizard's help (.HLP) file. The .HM file defines (if defined) the help IDs of your custom AppWizard steps to numeric values that are readable by the help compiler (HC30.EXE and HC31.EXE). It also invokes the help compiler to generate the help file.

- A help project (.HPJ) file that controls compiling the .RTF file into an .HLP file.

Your custom AppWizard file, which has an extension of .AWX, and its help file must use the same base filename, and both must reside in MSDEV\TEMPLATE. When the custom AppWizard user clicks a custom step's Help button, MFCAPWZ.DLL invokes WinHelp and passes it the current step's help ID and the name of your custom AppWizard's help file.

UNITED STATES PATENT AND TRADEMARK OFFICE
CERTIFICATE OF CORRECTION

Page 21 of 113

PATENT NO.    : 5,754,858

DATED         : May 19, 1998

INVENTOR(S)   : Broman et al.

It is certified that error appears in the above-identified patent and that said Letters Patent is hereby corrected as shown below:

Note You cannot integrate your custom AppWizard's help with the Microsoft Developer Studio help system. However, if you build a custom AppWizard that uses an existing sequence of AppWizard steps, your custom AppWizard will automatically use the Microsoft Developer Studio help file that was created for the standard AppWizard steps. Your custom AppWizard will use your own WinHelp help file for the custom steps. The effect is seamless to the user.

Database Applications

The following resources support the database features that AppWizard offers.

AFXDB.RTF Rich text file, for generating a database-application help (.HLP) file. This file is one of the resource templates provided by the localized language DLLs, such as APPWZJPN.DLL.

RECSET.CPP Recordset implementation file for MDI and SDI applications. This file is one of the templates provided by MFCAPWZ.DLL.

RECSET.H Recordset header file for MDI and SDI applications. This file is one of the templates provided by MFCAPWZ.DLL.

TBDM_.BMP Bitmap file that creates a toolbar for database view applications without file support. This file is one of the resource templates provided by MFCAPWZ.DLL.

Macintosh Applications

AFXCRMAC.RTF This rich-text file is copied to your custom AppWizard project's TEMPLATE directory. It is used to generate a Macintosh help file for MDI and SDI applications. This file is one of the resource templates provided by the localized language DLLs, such as APPWZJPN.DLL.

AFXPTMAC.RTF This rich-text file is copied to your custom AppWizard project's TEMPLATE directory. It contains only print and print preview topics and is used to generate a help (.HLP) file for Macintosh MDI and SDI applications that use printing and print preview. This file is one of the resource templates provided by the localized language DLLs, such as APPWZJPN.DLL.

MACCMD.BMP A bitmap, for use in help files, that creates the Macintosh command-key symbol. This file is one of the resource templates provided by MFCAPWZ.DLL.

MACLOC.RC A localized resource script file that contains all of the Macintosh menus and accelerators. This file is one of the resource templates provided by the localized language DLLs, such as APPWZJPN.DLL.

MACROOT.HPJ This help project file is copied to your custom AppWizard project's TEMPLATE directory. It is used to generate a Macintosh help file and lists all of the .RTF files that MAKEHELP.BAT must process to produce an .HLP file. This file is one of the resource templates provided by the localized language DLLs, such as APPWZJPN.DLL.

ROOT.R Resource script containing all of the Macintosh-specific resources. This file is one of the resource templates provided by MFCAPWZ.DLL.

UNITED STATES PATENT AND TRADEMARK OFFICE
CERTIFICATE OF CORRECTION

PATENT NO.    : 5,754,858

DATED         : May 19, 1998

INVENTOR(S)   : Broman et al.

It is certified that error appears in the above-identified patent and that said Letters Patent is hereby corrected as shown below:

APPENDIX D

SERVICES MODULE API REFERENCE

GetDialog

CAppWizStepDlg* GetDialog( AppWizDlgID nID );

*Return Value* A pointer to the standard AppWizard step specified in the *nID* argument.

*Parameters* *nID* The enumerated value of a standard AppWizard step.

*Remarks*

CUSTMWZ.AWX generates calls to GetDialog in the CCustomAppWiz::InitCustomAppWiz function of every custom AppWizard that uses one of the two standard sequences of AppWizard steps—one call for each of the standard AppWizard steps that a custom AppWizard needs. The returned pointers are automatically stored by the custom AppWizard and are returned in response to an MFCAPWZ.DLL call to CCustomAppWiz::Next or CCustomAppWiz::Back.

The actual calls to GetDialog and storage of the returned pointers occurs in the constructor of a CUSTMWZ.AWX-generated class named CDialogChooser. The pointers are stored, sequentially, in an order determined by the original order of the standard AppWizard steps. Pointers to any custom steps you specify are automatically added to the end of the sequence of pointers returned by the calls to GetDialog.

You will probably not add your own call to GetDialog or modify the existing calls to GetDialog unless you want to change the default order in which your custom AppWizard presents steps to its users.

The standard AppWizard offers two different sequences of steps to the AppWizard user: AppWizard Executable and AppWizard Dynamic Link Library. Each step in each sequence is represented by an enumerated value, as shown in Table 24.4.

Table 24.4  Enumerated Values of Standard AppWizard Steps

Value         Description

APWZDLG_APPTYPE    Step 1, MFC AppWizard (exe)Allows the user to choose a type of application (single document (SDI), multiple documents (MDI), or dialog based) and the languages into which their application's resource strings will be translated.

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

APWZDLG_DATABASE    Step 2, MFC AppWizard (exe)Allows the user to specify the type of database support for SDI and MDI applications. Possible choices are None, Header files only, Database view without file support, or Database view with file support.

APWZDLG_DLGAPPOPTIONS    Step 2, MFC AppWizard (exe)Allows the user to choose standard application features for dialog-based applications (About box, Context-sensitive help, and 3D controls) and to name the application's dialog box. Also allows the user to choose Windows sockets.

APWZDLG_OLE    Step 3, MFC AppWizard (exe)Allows the user to specify the level of OLE compound document support for SDI and MDI applications (None, Container, Mini-server, Full-server, Both container and server). Also allows the user to choose support for OLE compound files and OLE automation.

APWZDLG_DOCAPPOPTIONS    Step 4, MFC AppWizard (exe)Allows the user to choose standard application features for MDI and SDI applications (Dockable toolbar, Initial status bar, Printing and print preview, Context-sensitive help, and 3D controls). Allows the user to choose MAPI (Messaging API) and Windows sockets and to specify the number of files remembered in their application's most recently used list.

APWZDLG_PROJOPTIONS    Step 5, MFC AppWizard (exe)Allows the user to choose whether AppWizard generates commented or uncommented MFC code in their project and whether they want their project linked with the static MFC library or the shared MFC DLL.

APWZDLG_CLASSES    Step 6, MFC AppWizard (exe)Allows the user to modify the default class and file names that AppWizard will generate.

APWZDLG_DLLPROJOPTIONS    Step 1, MFC AppWizard (dll)Allows the user to choose whether AppWizard generates commented or uncommented MFC code in their project and whether they want their project linked with the static MFC library or the shared MFC DLL. Also allows the user to choose OLE automation and Windows sockets support.

SetCustomAppWzClass void SetCustomAppWzClass( CCustomAppWz *pAW );

Parameters

*pAW*    Points to your CCustomAppWz class.

Remarks

Called in the DLLMain function of your custom AppWizard to provide MFCAPWZ.DLL with a pointer to your custom AppWizard's CCustomAppWz class. The communication services between MFCAPWZ.DLL and your custom AppWizard that are provided by the CCustomAppWz member functions occur through pAW. The code that calls SetCustomAppWzClass is automatically generated when you use the Custom AppWizard project type to generate your custom AppWizard.

SetNumberOfSteps void SetNumberOfSteps( int nSteps );

Parameters

*nSteps*    The total number of steps that your custom AppWizard presents to its users. Set nSteps to -1 to communicate to MFCAPWZ.DLL that you want your custom AppWizard's title bar to display only the current step number (for example, "Step 1" rather than "Step 1 of 6"). Set nSteps to 0 to communicate to MFCAPWZ.DLL that your custom AppWizard has no steps and only wants to use the New Project Workspace or the Insert Project dialog boxes (for example, when your custom AppWizard is based on an existing project, and there are no options for the custom AppWizard user to select.)

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

Remarks

Your custom AppWizard calls SetNumberOfSteps in CCustomAppWiz::InitCustomAppWiz to communicate the total number of steps to MFCAPWZ.DLL. The resulting information allows MFCAPWZ.DLL to accurately number the steps in your custom AppWizard's title bar and to correctly activate or gray the Next button.

Although the initial call to SetNumberOfSteps in InitCustomAppWiz is generated for you, you should also call it when an end user's choice will change the number of steps the user will see.

ScanForAvailableLanguages

BOOL ScanForAvailableLanguages( CStringList& rLanguages );

Return Value

TRUE if one or more localized resource DLLs are found in the MSDEV\BIN\IDE directory, otherwise FALSE.

Parameters rLanguages   Stores strings describing each localized resource DLL—those with names described by APPWZ*.DLL—found in the MSVDEV\BIN\IDE directory.

Remarks

The ScanForAvailableLanguages function requests that MFCAPWZ.DLL scan the MSVDEV\BIN\IDE directory and store, in rLanguages, a descriptive string for each localized resource DLL found. Each entry in the list takes the following form:

"language-name (APPWZ*.DLL-name):translation-identifier"

For example:

"U.S. English (appwzenu.dll):0x040904e4"

The translation-identifier is identical to the value of the block header of the "StringFileInfo" block in a Version resource. It's a DWORD represented in hexadecimal format, with a high word representing the language and a low word representing the character set (code page).

If ScanForAvailableLanguages returns FALSE, MFCAPWZ.DLL displays an error message in a message box. Retry and Cancel buttons allow flexible recovery from this error.

UNITED STATES PATENT AND TRADEMARK OFFICE
CERTIFICATE OF CORRECTION

Page 25 of 113

PATENT NO. : 5,754,858

DATED : May 19, 1998

INVENTOR(S) : Broman et al.

It is certified that error appears in the above-identified patent and that said Letters Patent is hereby corrected as shown below:

Your custom AppWizard will probably never call ScanForAvailableLanguages. CUSTMWZ.AWX does call ScanForAvailableLanguages to determine which languages AppWizard currently supports. CUSTMWZ.AWX uses the result to fill the language list for step 2.

SetSupportedLanguages

SetSupportedLanguages( LPCTSTR szSupportedLangs );

Parameters szSupportedLangs  Stores a string of the form:

"language-name#1 {APPWZ*.DLL-name#1};translation-identifier#1\n language-name#2 {APPWZ*.DLL-name#2};translation-identifier#2\n...

...language-name#l {APPWZ*.DLL-name#l};translation-identifier#l\n"

The string is a series of substrings, each separated by the newline character [\n]. Each substring has the same format as each entry in the CStringList parameter in ScanForAvailableLanguages.

Remarks

The SetSupportedLanguages function reports to MFCAPWZ.DLL the languages that are supported by your custom AppWizard. This function is only used if your custom AppWizard uses the AppWizard Executable standard sequences of AppWizard steps and is called in CCustomAppWiz::InitCustomAppWiz to fill the languages checklist in AppWizard's Step 1. The code that calls SetSupportedLanguages is automatically generated when you use the Custom AppWizard project type to generate your custom AppWizard.

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

APPENDIX E

CUSTOM APPLICATION PROJECT

GENERATOR CLASS REFERENCE

CCustomAppWiz

The CCustomAppWiz class provides communication services between MFCAPWZ.DLL and your custom AppWizard. MFCAPWZ.DLL calls these member functions. The base-class implementations of the CCustomAppWiz member functions reside in MFCAPWZ.DLL, but your custom AppWizard can override them.

include <customaw.h>

CCustomAppWiz Class Members

Data Members m_Dictionary — Provides a dictionary of macros. Some of the macros are supplied by MFCAPWZ.DLL and some by you. ProcessTemplate uses the dictionary to map macros that are embedded in custom resource templates to their actual values.

Overridables

Back — Moves to the previous step. Called whenever a custom AppWizard user chooses the Back button.

CopyTemplate — Called by MFCAPWZ.DLL to copy verbatim a binary template into the custom AppWizard user's project.

ExitCustomAppWiz — Called by MFCAPWZ.DLL just before it unloads the custom AppWizard. ExitCustomAppWiz is a convenient place to perform any cleanup required by the custom AppWizard.

GetPlatforms — Called by MFCAPWZ.DLL immediately after it loads and initializes the custom AppWizard. Override to obtain the list of platforms currently installed for Visual C++ and choose those that your custom AppWizard will support.

InitCustomAppWiz — Called by MFCAPWZ.DLL immediately after it loads the custom AppWizard. InitCustomAppWiz is a convenient place to perform initialization required by the custom AppWizard.

LoadTemplate — Called by MFCAPWZ.DLL to load custom resource templates, such as NEWPROJ.INF and CONFIRM.INF, for further processing.

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

Next Moves to the next step. Called whenever a custom AppWizard user chooses the Next button.

PostProcessTemplate Called by MFCAPWZ.DLL after it finishes parsing a template. PostProcessTemplate is a convenient place for you to deallocate memory that you allocated for a custom resource template. Typically you will not need to override this function.

ProcessTemplate Called by MFCAPWZ.DLL to process a custom resource template returned by LoadTemplate. ProcessTemplate expands embedded macros, obeys embedded directives, and directs the output to an output stream.

CCustomAppWiz::Back virtual CAppWizStepDlg* Back( CAppWizStepDlg* pDlg );

Return Value

A pointer to the previous step. If pDlg points to the first step, Back returns NULL to indicate that MFCAPWZ.DLL should next display the New Project Workspace dialog box or the Insert Project dialog box. For more information on steps, see the class CAppWizStepDlg.

Parameters

*pDlg* Pointer to the current step.

Remarks

Back moves to the previous step. AppWizard (MFCAPWZ.DLL) calls this function whenever a user chooses the Back button. The Back button is located on the main, outer dialog box that MFCAPWZ.DLL displays. For more information on steps and a description of the two-dialog-box structure of AppWizard and custom AppWizards, see CAppWizStepDlg.

Before Back is called, MFCAPWZ.DLL calls the CAppWizStepDlg::OnDismiss member function of the currently displayed step. You override CAppWizStepDlg::OnDismiss to transfer data from the step's controls to the appropriate variables and to update the appropriate dictionary values. If your custom AppWizard returns FALSE from the call to the overridden CAppWizStepDlg::OnDismiss, then the current step remains active, and Back is not called.

CCustomAppWiz::CopyTemplate virtual void CopyTemplate( LPCTSTR lpszInput, DWORD dwSize, OutputStream* pOutput );

Parameters

*lpszInput* A pointer, returned by CCustomAppWiz::LoadTemplate, to a custom resource template.

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

*dwSize* The size of the custom resource template. Provided by the LoadTemplate function's *rdwSize* argument.

*pOutput* A pointer to the stream that represents the destination of the output from CCustomAppWiz::CopyTemplate.

Remarks

CopyTemplate copies a binary template (a type of custom resource template) verbatim into the end user's project. For more information on binary templates, see Understanding Binary Templates.

CCustomAppWiz::ExitCustomAppWiz virtual void ExitCustomAppWiz( );

Remarks

AppWizard (MFCAPWZ.DLL) calls ExitCustomAppWiz just before it unloads your custom AppWizard from memory. Use ExitCustomAppWiz to perform any cleanup necessary, such as deallocating instances of each of your custom AppWizard's CAppWizStepDlg-derived steps. The base-class version of ExitCustomAppWiz does nothing.

CCustomAppWiz::GetPlatforms virtual void GetPlatforms( CStringList& rPlatforms );

Parameters

*rPlatforms* A reference to a CStringList of each platform currently installed on Microsoft Visual C++. Platform names that rPlatforms can contain are shown in the following table.

| Platform name | Comes with |
|---|---|
| Win32 (x86) | Visual C++ |
| Win32 (MIPS) | Visual C++ RISC edition |
| Win32 (ALPHA) | Visual C++ RISC edition |
| Win32 (PowerPC) | Visual C++ RISC edition |
| Macintosh | Visual C++ Cross Development edition for Macintosh |
| Power Macintosh | Visual C++ Cross Development edition for Macintosh |

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

Remarks

The GetPlatforms member function allows you to specify which operating-system and hardware platforms your custom AppWizard will support. MFCAPWZ.DLL calls this function with a list containing an entry for each platform currently installed on Microsoft Visual C++. You override GetPlatforms to parse and modify this list. Typically, you will remove those platform names from the list that your custom AppWizard does not support.

AppWizard calls GetPlatforms after loading and initializing a custom AppWizard. It uses the platform names in rPlatforms, which are always in English, to determine which platform names will appear in your custom AppWizard's Platforms checklist. For each English name in rPlatforms, AppWizard places a locale-specific platform name into your custom AppWizard's Platforms checklist.

For each platform selected by the custom AppWizard user, MFCAPWZ.DLL sets a corresponding target macro in the dictionary and removes those for the nonselected platforms.

The following example shows how to traverse a platforms list and remove all strings that don't start with "Win32", thus keeping the Intel® Win32, MIPS® Win32, and ALPHA™ Win32 as target platforms and removing the Macintosh® target platforms.

```
// This custom AppWizard only targets Win32 platforms.
void CSampleAppWiz::GetPlatforms(CStringList& rPlatforms)
{
    POSITION pos = rPlatforms->GetHeadPosition();
    while (pos != NULL)
    {
        POSITION posCurr = pos;
        CString strPlatform = rPlatforms->GetNext(pos);
        if (strPlatform.Left(5) != _T("Win32"))
            rPlatforms->RemoveAt(posCurr);
    }
}
```

If you do not override GetPlatforms, MFCAPWZ.DLL will display the names of all of the currently loaded platforms in the Platforms checklist.

Unlike the Win32 or Power Macintosh™ platforms, the 680x0 Macintosh does not support DLLs. Even if rPlatforms contains "Macintosh", this platform name will not show up in the Platforms checklist when a custom AppWizard creates a DLL.

A custom AppWizard creates an executable file by default. If your custom AppWizard creates a DLL, set the standard AppWizard macro "PROJTYPE_DLL" in the InitCustomAppWiz function as follows:

UNITED STATES PATENT AND TRADEMARK OFFICE
CERTIFICATE OF CORRECTION

Page 30 of 113

PATENT NO. : 5,754,858

DATED : May 19, 1998

INVENTOR(S) : Broman et al.

It is certified that error appears in the above-identified patent and that said Letters Patent is hereby corrected as shown below:

YourProjectName.w.m_Dictionary["PROJTYPE_DLL"] = "1";

This code informs MFCAPWZ.DLL to not display the 680x0 Macintosh platform name in the Platforms checklist, and to create a project makefile that builds a DLL rather than an executable file. AppWizard (MFCAPWZ.DLL) automatically generates this code if you create a custom AppWizard based on the standard AppWizard steps for creating a DLL. Note that MFCAPWZ.DLL only checks that "PROJTYPE_DLL" exists and has a value—the actual macro value is not important unless your custom AppWizard requires that it have meaning.

CCustomAppWiz::InitCustomAppWiz virtual void InitCustomAppWiz( );

Remarks

AppWizard (MFCAPWZ.DLL) calls the InitCustomAppWiz member function just after loading a custom AppWizard. This occurs immediately after a custom AppWizard user has selected your custom AppWizard in the Type list in either the New Project Workspace or the Insert Project dialog boxes.

This function provides a place for you to perform any initialization required by the custom AppWizard, such as setting internal structures to default values and allocating an instance of each CAppWizStepDlg class. These instances will later be returned to AppWizard when it calls your custom AppWizard's Next and Back functions.

You can also override default AppWizard settings in InitCustomAppWiz by modifying the contents of the dictionary. For example, if your company or customer requires that context-sensitive help be a default feature, you can add "HELP" to the dictionary, from within InitCustomAppWiz, and cause AppWizard's Context-Sensitive Help check box to be selected by default. This example, of course, assumes that your custom AppWizard uses the relevant standard AppWizard step and associated templates.

The base-class version of InitCustomAppWiz does nothing.

CCustomAppWiz::LoadTemplate virtual LPCTSTR LoadTemplate( LPCTSTR *pszTemplateName*, DWORD& *rdwSize*, HINSTANCE *hInstance* = NULL );

Return Value

A pointer to the loaded custom resource template for use by CCustomAppWiz::CopyTemplate or CCustomAppWiz::ProcessTemplate.

Parameters

*pszTemplateName* A pointer to a string that contains the name (such as "NEWPROJ.INF" or "RESOURCE.H") of a custom resource template. The custom resource has a type of "TEMPLATE".

*rdwSize* The size of the custom resource template is returned in this parameter. LoadTemplate provides this value for use by CCustomAppWiz::CopyTemplate and CCustomAppWiz::ProcessTemplate.

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

*hInstance* A pointer that can either be NULL or be the handle of a Win32 module (a DLL or executable file) that you specify. In either case, *hInstance* informs LoadTemplate where it can find the custom resource template named by *lpszTemplateName*.

Remarks

After the user chooses the OK button in the custom AppWizard's New Project Information dialog box, LoadTemplate finds, locks, and loads into memory the custom resource of type "TEMPLATE" that is named by *lpszTemplateName*.

If *hInstance* is NULL, the base-class implementation of LoadTemplate first looks in your custom AppWizard's DLL for the custom resource template named by *lpszTemplateName*, and then, if the template is not there, among AppWizard's custom resource templates. If *hInstance* is not NULL, the base-class implementation of LoadTemplate looks in the Win32 module *hInstance*.

You can override LoadTemplate to load templates from sources other than your custom AppWizard's DLL or the AppWizard DLLs. For more information on this process, see the implementation of LoadTemplate in the sample code for CUSTMWZ.AWX in the MSDEV\SAMPLES\APPWIZ\CUSTOMWZ directory.

CCustomAppWiz::Next virtual CAppWizStepDlg* Next( CAppWizStepDlg* *pDlg* );

Return Value

A pointer to the next step.

If *pDlg* is NULL, your custom AppWizard should return a pointer to Step 1. This default action, provided by CUSTMWZ.AWX, occurs when the user chooses the Create button from either the New Project Workspace dialog box or the Insert Project dialog box.

If *pDlg* is the last step, your custom AppWizard should return NULL. This default action, provided by CUSTMWZ.AWX, occurs if SetNumberOfSteps is called incorrectly or if your project is based on an existing project. In the first case, MFCAPWZ.DLL assumes that there are no more steps and displays the New Project Information dialog box. In the second case, no steps are required, and the code provided by CUSTMWZ.AWX for Next adds project- and class-name macros to the dictionary.

For more information on steps, see CAppWizStepDlg.

Parameters

*pDlg* Pointer to the current step, or NULL if the custom AppWizard user has chosen the Create button from either the New Project Workspace or Insert Project dialog box.

Remarks

Next moves to the next step. AppWizard (MFCAPWZ.DLL) calls this function whenever a user chooses either the Next button or the Create button. The Next button is located on the main, outer

UNITED STATES PATENT AND TRADEMARK OFFICE
CERTIFICATE OF CORRECTION

Page 32 of 113

PATENT NO. : 5,754,858

DATED : May 19, 1998

INVENTOR(S) : Broman et al.

It is certified that error appears in the above-identified patent and that said Letters Patent is hereby corrected as shown below:

dialog box that MFCAPWZ.DLL displays. The Create button is located on both the New Project Workspace and the Insert Project dialog boxes. If there is no next step, the Next button is inactive. For more information on steps and a description of the two-dialog-box structure of AppWizard and custom AppWizards, see CAppWizStepDlg.

Before Next is called, MFCAPWZ.DLL calls the CAppWizStepDlg::OnDismiss member function of the currently displayed step. You override OnDismiss to transfer data from the step's controls to the appropriate variables and to update the appropriate dictionary values. If your custom AppWizard's call to OnDismiss returns FALSE, then the step remains active, and Next is not called.

CCustomAppWiz::PostProcessTemplate virtual void PostProcessTemplate( LPCTSTR szTemplate );

Parameters

*szTemplate* A pointer to a template.

Remarks

If you override CCustomAppWiz::LoadTemplate to load a custom resource template into memory (one that isn't stored in AppWizard's DLLs or your custom AppWizard's DLL), PostProcessTemplate provides a convenient place for you to deallocate the custom resource template's memory. MFCAPWZ.DLL calls PostProcessTemplate after it finishes parsing a custom resource template.

CCustomAppWiz::ProcessTemplate virtual void ProcessTemplate( LPCTSTR lpszInput, DWORD dwSize, OutputStream* pOutput );

Parameters

*lpszInput* A pointer, returned by CCustomAppWiz::LoadTemplate, to a custom resource template.

*dwSize* The size of the custom resource template. Provided by the LoadTemplate function's *rdwSize* argument.

*pOutput* A pointer to the stream that represents the destination of the output from ProcessTemplate.

Remarks

ProcessTemplate accepts a string, which is a custom resource template returned by LoadTemplate, parses the string, and passes the string back to MFCAPWZ.DLL through an output stream (*pOutput*).

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

When ProcessTemplate parses the string, it expands macros and obeys AppWizard directives. The result is usually a source file (such as an .H, .CPP, or .RC file) that can be placed directly into the structure of a new project or is a CONFIRM.INF file or a NEWPROJ.INF file. For more information on template parsing, see NEWPROJ.INF Statements.

The default, base-class version of ProcessTemplate uses the dictionary to expand macros.

You can implement new directives by overriding the default behavior of ProcessTemplate to parse them. For information on the standard AppWizard directives, see Standard AppWizard Directives.

CCustomAppWiz::m_Dictionary projectaw.m_Dictionary("macroname") = "value";

projectaw.m_Dictionary.RemoveKey("macroname");

Parameters

*project* The name of your project as specified in the New Project Workspace dialog box or the Insert Project dialog box.

*"macroname"* Pointer to the current step. The quotations marks are required.

*"value"* Any value that makes sense for your application. The macro exists if it has a value assigned to it. The quotations marks are required.

Remarks

Use the m_Dictionary data member (the dictionary), which is of the type CMapStringToString, to create macros, remove macros, or update the value of macros. Some macros are supplied by MFCAPWZ.DLL and some by you. The CCustomAppWiz::ProcessTemplate member function uses the dictionary to map macros that it encounters while parsing custom resource templates to their

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

actual values. For more information on the macros supplied by MFCAPWZ.DLL, see Standard AppWizard Macros.

Typically, you will call the dictionary's member functions (which are provided by CMapStringToString) in a custom step's OnDismiss function as follows:

Each of your custom AppWizard's custom steps is a dialog box that is represented by a class. Each step's class has an OnDismiss member function that is called whenever the user of a custom AppWizard chooses the Back, Next, or Finish button. After you use the dialog resource editor to add controls to your custom steps, use ClassWizard to add variables to each step's class. In this way, you can take advantage of the dialog data exchange (DDX) code that ClassWizard adds to your class.

Typically, you will add code in each OnDismiss function that defines, provides values for, or removes macros as follows:

```
BOOL CStep1Dlg::OnDismiss()
{
    if (!UpdateData(TRUE))
        return FALSE;
    else
    {
        if (!m_Indented)
        {
            myaw.m_Dictionary["INDENTED_BRACES"] = "";
            myaw.m_Dictionary["NOT_INDENTED_BRACES"] = "";
        }
        else
        {
            myaw.m_Dictionary["INDENTED_BRACES"] = "\t";
            myaw.m_Dictionary.RemoveKey("NOT_INDENTED_BRACES");
        }
        if (!m_CompanyLogo)
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
        myaw.m_Dictionary["COMPANY_LOGO"] = "Yes";
    else
        myaw.m_Dictionary.RemoveKey("COMPANY_LOGO");
    if (m_3DControls)
        myaw.m_Dictionary["3-D"] = "Yes";
    else
        myaw.m_Dictionary.RemoveKey("3-D");
    return TRUE;   // return FALSE if the dialog
                   // shouldn't be dismissed
    }
}
```

OutputStream

The OutputStream class wraps two member functions that are used by CCustomAppWiz::CopyTemplate and CCustomAppWiz::ProcessTemplate when they process custom resource templates. You will only need to override the OutputStream member functions if you override CopyTemplate and/or ProcessTemplate.

include <customaw.h>

Class Members

Overridables

WriteLine    Called in CCustomAppWiz::ProcessTemplate to write lines from a custom resource template to an output stream.

WriteBlock   Called in CCustomAppWiz::CopyTemplate to write a custom resource template, usually a bitmap, to an output stream.

**UNITED STATES PATENT AND TRADEMARK OFFICE
CERTIFICATE OF CORRECTION**

PATENT NO. : 5,754,858

DATED : May 19, 1998

INVENTOR(S) : Broman et al.

It is certified that error appears in the above-identified patent and that said Letters Patent is hereby corrected as shown below:

OutputStream::WriteBlock

WriteBlock( LPCTSTR pBlock, DWORD dwSize );

Parameters

*pBlock* Points to a block of memory that usually contains a custom resource template.

*dwSize* Size of the block of memory. This must be smaller than or equal to the *dwSize* returned through the CCustomAppWiz::LoadTemplate argument list.

Remarks

Writes a block of memory to an output stream—usually an open file. The base-class implementation of the CopyTemplate function calls WriteBlock to write a binary template to the output stream specified in the argument list of CopyTemplate.

OutputStream::WriteLine

WriteLine( LPCTSTR psz );

Parameters

*psz* Points to a null-terminated string that is a custom resource template.

Remarks

Writes the text pointed to by *psz*, up to and including the first newline character [\n], to an output stream—usually an open file or, in the case of CONFIRM.INF, the display window of the New Project Information dialog box.

CCustomAppWiz::ProcessTemplate parses custom resource templates line by line and calls WriteLine to write each processed line (which can appear as text, source code, or resource script statements) to the output stream specified in the argument list of ProcessTemplate.

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

APPENDIX F

CUSTOMIZER TOOL SOURCE CODE

CHOOSER.H

```
// chooser.h :   declaration of the CDialogChooser class
//
//              This class keeps track of what dialogs to pop up when,
//              and remembers the current custom AppWizard "type" we're
//              creating (see typedlg.(h,cpp))
//
//              Copyright (c) 1995-1995, Microsoft Corporation. All rights reserved.
// ifndef __CHOOSER_H__
define __CHOOSER_H__

// List of the steps we can pop up
enum
{
        DLG_CUSTOMTYPE = 1,
        DLG_ZAP,
        DLG_SEQUENCE,
};

define NUM_DLGS 3 class CAppWizStepDlg;
class CDialogChooser
{
```

UNITED STATES PATENT AND TRADEMARK OFFICE
CERTIFICATE OF CORRECTION

Page 38 of 113

PATENT NO. : 5,754,858

DATED : May 19, 1998

INVENTOR(S) : Broman et al.

It is certified that error appears in the above-identified patent and that said Letters Patent is hereby corrected as shown below:

```
public:
    CDialogChooser();
    ~CDialogChooser();

// All calls by mfcapwz.dll to CCustomWizAppWiz::Next &
    // CCustomWizAppWiz::Back are delegated to these member
    // functions, which keep track of what dialog is up
    // now, and what to pop up next.
    CAppWizStepDlg* Next(CAppWizStepDlg* pDlg);
    CAppWizStepDlg* Back(CAppWizStepDlg* pDlg);

// This class keeps track of the current custom AppWizard type
    // we plan to create. This is determined by the
    // user at step 1 (typedlg.h.cpp)]
    void SetCustomType(int nCustomType)
        { m_nCustomType = nCustomType; }
    int GetCustomType()
        { return m_nCustomType; } protected:
    int m_nCurrDlg;
        //    Current step's DLG_ enum from above, or 0 for
        //    the initial "New Project" dialog.
    CAppWizStepDlg* m_pDlgs[NUM_DLGS+1];
        //    Instances of the dialog classes of our steps
    int m_nCustomType;
        //    Current custom AppWizard type (enum from typedlg.h)
    void UpdateTitleIfNecessary();
};
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
#endif //_CHOOSER_H_

CHOOSER.CPP

//         chooser.cpp : implementation of the CDialogChooser class
//
//         Copyright (c) 1985-1996, Microsoft Corporation. All rights reserved.
// include "stdafx.h"
include "customwz.h"
#include "sampleaw.h"
#include "chooser.h"
#include "typedlg.h"
#include "zapdlg.h"
#include "seqdlg.h"

#ifdef _PSEUDO_DEBUG
#undef THIS_FILE
static char THIS_FILE[] = __FILE__;
endif //         On construction, create instances of each step we can pop up.
CDialogChooser::CDialogChooser()
{
         m_pDlgs[0] = NULL;

m_pDlgs[IDLG_CUSTOMTYPE] = new CCustomTypeDlg;
         m_pDlgs[IDLG_ZAP] = new CZapDlg;
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
            m_pDlgs[DLG_SEQUENCE] = new CSequenceDlg;

m_nCurrDlg = 0;
                    // We start with the New Project dialog
            m_nCustomType = CUSTOMTYPE_ZAP;
    // Default custom appwiz type is base
    }

//      On deconstruction, destroy instances of each step.
    CDialogChooser::~CDialogChooser()
    {
            for (int i = 1; i <= NUM_DLGS; i++)
            {
                    ASSERT(m_pDlgs[i] != NULL);
                    delete m_pDlgs[i];
            }
    } void CDialogChooser::UpdateTitleIfNecessary()
    {
            static CString strPreviousRoot;
            CString strCurrentRoot;
            sampleaw.m_Dictionary.Lookup(_T("Root"), strCurrentRoot);
            if (strCurrentRoot != strPreviousRoot)
            {
                    //      The project name has changed, so update the
                    //      default value of the custom AppWizard's title
                    ((CCustomTypeDlg*)
    m_pDlgs[DLG_CUSTOMTYPE])->UpdateTitle(strCurrentRoot);
                    strPreviousRoot = strCurrentRoot;
```

UNITED STATES PATENT AND TRADEMARK OFFICE
CERTIFICATE OF CORRECTION

Page 41 ofe 113

PATENT NO.    : 5,754,858

DATED         : May 19, 1998

INVENTOR(S)   : Broman et al.

It is certified that error appears in the above-identified patent and that said Letters Patent is hereby corrected as shown below:

```
            )
        )

//      On Next, use the custom AppWizard type we're generating to determine what
    //      dialog to pop up.
CAppWizStepDlg* CDialogChooser::Next(CAppWizStepDlg* pDlg)
{
        ASSERT(pDlg == m_pDlgs[m_nCurrDlg]);
        ASSERT(0 == m_nCurrDlg || m_nCurrDlg == DLG_CUSTOMTYPE);

if (pDlg == NULL)
    //      i.e., if the New Project Dialog is present,
        {
                m_nCurrDlg = DLG_CUSTOMTYPE;
    //      Then pop up our first step
                UpdateTitleIfNecessary();
    //      and update title's default
        }
        else if (m_nCustomType == CUSTOMTYPE_ZAP)
        {
                m_nCurrDlg = DLG_ZAP;
                //      Pop up the zap step
        }
        else    //      m_nCustomType == CUSTOMTYPE_SEQUENCE
        {
                m_nCurrDlg = DLG_SEQUENCE;
    //      Pop up the appwiz sequence step
        }
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
                        return m_pDlgs[m_nCurrDlg];
        }

//      On Back, determine whether we should go back to the New Project
        //      dialog, or back to step 1.
        CAppWizStepDlg* CDialogChooser::Back(CAppWizStepDlg* pDlg)
        {
                ASSERT(pDlg == m_pDlgs[m_nCurrDlg]);
                ASSERT(0 < m_nCurrDlg && m_nCurrDlg <= NUM_DLGS);

if (m_nCurrDlg == DLG_CUSTOMTYPE)
                        m_nCurrDlg = 0;
        //      If we're on step 1, go to New Project dialog
                else
                        m_nCurrDlg = DLG_CUSTOMTYPE;
        //      Otherwise, go to step 1 return m_pDlgs[m_nCurrDlg];
        }
                                        CUSTOMWZ.H //      customwz.h : Declares the initialization routines for the DLL.
        //
        //      Copyright (c) 1985-1995, Microsoft Corporation. All rights reserved.
        // ifndef __CUSTOMWZ_H__
        #define __CUSTOMWZ_H__
```

UNITED STATES PATENT AND TRADEMARK OFFICE
CERTIFICATE OF CORRECTION

Page 43 of 113

PATENT NO. : 5,754,858

DATED : May 19, 1998

INVENTOR(S) : Broman et al.

It is certified that error appears in the above-identified patent and that said Letters Patent is hereby corrected as shown below:

```
#include "resource.h"

#define APWZ_EXPORT    __declspec(dllexport)

#define NUM_APWZ_EXE_STEPS              7
#define NUM_APWZ_EXE_DOC_STEPS          6
#define NUM_APWZ_EXE_DLG_STEPS          4
#define NUM_APWZ_DLL_STEPS              1

//////////////////////////////////////////////////
// Miscellaneous utility functions void DefineMacro(LPCTSTR pszKey, LPCTSTR pszValue);
void UndefMacro(LPCTSTR pszKey);

void DefineIntMacro(LPCTSTR pszKey, int iValue);
void DefineIntMacro(LPCTSTR pszKey, int iItem, int iValue);
void DefineBoolMacro(LPCTSTR pszKey, BOOL bValue);
void DefineBoolMacro(LPCTSTR pszKey, int iItem, BOOL bValue);
void DefineStringMacro(LPCTSTR pszKey, LPCTSTR pszValue);
void DefineStringMacro(LPCTSTR pszKey, int iItem, LPCTSTR pszValue);

void ReportError(UINT nID, LPCTSTR szArg);
void ReportAndThrow(UINT nID, LPCTSTR szArg);

#endif //__CUSTOMWZ_H__
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

CUSTOMWZ.CPP

```
//      customwz.cpp : Defines the initialization routines for the DLL.
//
//      Copyright (c) 1995-1995, Microsoft Corporation. All rights reserved.
// include "stdafx.h"
include <afxdllx.h>
#include "customwz.h"
#include "chooser.h"
#include "sampleaw.h"

#ifdef _PSEUDO_DEBUG
#undef THIS_FILE
static char THIS_FILE[] = __FILE__;
endif static AFX_EXTENSION_MODULE customwzDLL = { NULL, NULL };

extern "C" int APIENTRY
DllMain(HINSTANCE hInstance, DWORD dwReason, LPVOID lpReserved)
{
        if (dwReason == DLL_PROCESS_ATTACH)
        {
                TRACE0("CUSTMWZ.AWX Initializing!\n");

// Extension DLL one-time initialization
                AfxInitExtensionModule(customwzDLL, hInstance);
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
            //      Insert this DLL into the resource chain
            new CDynLinkLibrary(customwzDLL);

//      Register this custom AppWizard with MFCAPWZ.DLL
            SetCustomAppWizClass(&sampleawi);
    }
    else if (dwReason == DLL_PROCESS_DETACH)
    {
            TRACE0("CUSTMWZ.AWX Terminating!\n");
    }
    return 1;   // ok
}

//////////////////////////////////////////////////
// Miscellaneous utility functions //      You may find the macro-setting functions useful in your own custom
//      AppWizard.  Simply copy them to your own code, and replace references
//      to "sampleaw" to your own CCustomAppWiz-derived class.

//      These are generic macro-setting functions.  They set macros or remove
//      them from the dictionary.

void DefineMacro(LPCTSTR lpszKey, LPCTSTR lpszValue)
{
            sampleaw.m_Dictionary[lpszKey] = lpszValue;
} void UndefMacro(LPCTSTR lpszKey)
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
{
        samplesw.m_Dictionary.RemoveKey(pszKey);
}

//      These are more specific macro-setting functions.  They set macros
//      depending on the "type", and work correctly in #BEGINLOOP/#ENDLOOP
//      blocks.

static void MakeKey(CString& strKey, int iItem)
{
        CString strOriginal = strKey;
        strKey.Format(_T("%s_%d"), (LPCTSTR) strKey, iItem);
} void DefineIntMacro(LPCTSTR pszKey, int iValue)
{
        CString strValue;
        strValue.Format(_T("%d"), iValue);
        DefineMacro(pszKey, strValue);
} void DefineIntMacro(LPCTSTR pszKey, int iItem, int iValue)
{
        CString strKey(pszKey);
        MakeKey(strKey, iItem);
        DefineIntMacro(strKey, iValue);
} void DefineBoolMacro(LPCTSTR pszKey, BOOL bValue)
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
{
        if (bValue)
                DefineMacro(pszKey, _T("1"));
        else
                UndefMacro(pszKey);
} void DefineBoolMacro(LPCTSTR pszKey, int iItem, BOOL bValue)
{
        CString strKey(pszKey);
        MakeKey(strKey, iItem);
        DefineBoolMacro(strKey, bValue);
} void DefineStringMacro(LPCTSTR pszKey, LPCTSTR pszValue)
{
        DefineMacro(pszKey, pszValue);
} void DefineStringMacro(LPCTSTR pszKey, int iItem, LPCTSTR pszValue)
{
        CString strKey(pszKey);
        MakeKey(strKey, iItem);
        DefineStringMacro(strKey, pszValue);
}

//      Report an error
void ReportError(UINT nID, LPCTSTR szArg)
{
```

UNITED STATES PATENT AND TRADEMARK OFFICE
CERTIFICATE OF CORRECTION

Page 48 of 113

PATENT NO. : 5,754,858

DATED : May 19, 1998

INVENTOR(S) : Broman et al.

It is certified that error appears in the above-identified patent and that said Letters Patent is hereby corrected as shown below:

```
                CString strPrompt;
                AfxFormatString1(strPrompt, nIDP, szArg);
                AfxMessageBox(strPrompt);
        }

//      Report an error and throw a user exception
        void ReportAndThrow(UINT nIDP, LPCTSTR szArg)
        {
                ReportError(nIDP, szArg);
                AfxThrowUserException();
        }

OPTIONS.H

//      options.h : declaration of COptions class. This class keeps track of
        //      options which effect each other (number of "new" steps
        //      requested-- that is, steps other than those automatically
        //      included from the standard AppWizard sequences; which, if
        //      any, AppWizard sequence of steps to include; and the type
        //      of the custom AppWizard).
        //
        //      Copyright (c) 1985-1995, Microsoft Corporation. All rights reserved.
        // class COptions
        {
        public:
                COptions::COptions();
                void DefineDlgMacros();
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
        int m_nCustomType;
        UINT m_nCustomSteps;
        int m_nApwzSeq;
};

extern COptions g_options;

OPTIONS.CPP

//      options.cpp : implementation of COptions class
//
//      Copyright (c) 1985-1996, Microsoft Corporation. All rights reserved.
// include "stdafx.h"
include "customwz.h"
#include "samplewz.h"
#include "options.h"
#include "typedlg.h"
#include "seqdlg.h"

#ifdef _PSEUDO_DEBUG
#undef THIS_FILE
static char THIS_FILE[] = __FILE__;
endif //      On construction, set the default values of user-selectable options
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
COptions::COptions()
{
        m_nCustomType = CUSTOMTYPE_ZAP;
        m_nCustomSteps = 1;
        m_nApwzSeq = APWZSEQ_EXE;
} define FIRST_DLG_RSC 129
        //      for entries in generated custom appwiz's resource.h //      These must be in the same order as the corresponding enum & radio buttons
static LPCTSTR lpszApwzSeqMacros[] =
{
        _T("APWZSEQ_EXE"),
        _T("APWZSEQ_DLL"),
};

//      Defines step-related template macros, which depend on which
//      options were selected.
void COptions::DefineDlgMacros()
{
        for (UINT i=0; i < APWZSEQ_MAX; i++)
                DefineBoolMacro(lpszApwzSeqMacros[i], FALSE);

//      Determine the number of standard AppWizard steps in the generated
        //      custom AppWizard
        int nApwzSteps = 0;
        if (m_nCustomType == CUSTOMTYPE_SEQUENCE)
```

UNITED STATES PATENT AND TRADEMARK OFFICE
CERTIFICATE OF CORRECTION

Page 51 of 113

PATENT NO. : 5,754,858

DATED : May 19, 1998

INVENTOR(S) : Broman et al.

It is certified that error appears in the above-identified patent and that said Letters Patent is hereby corrected as shown below:

```
{
    nApwzSteps = (m_nApwzSeq == APWZSEQ_EXE) ?
        NUM_APWZ_EXE_STEPS : NUM_APWZ_DLL_STEPS;

//   Set macro corresponding to the AppWizard sequence (exe or dll)
    //   off of which
    //   we're basing this custom AppWizard (reset the others).
    ASSERT(m_nApwzSeq == 0 || m_nApwzSeq == 1);
    DefineBoolMacro(IpszApwzSeqMacros[m_nApwzSeq], TRUE);
}

//   Set custom-dialog-dependent macros as appropriate

DefineBoolMacro(_T("HAS_NEW_STEPS"), m_nCustomSteps != 0);

ASSERT(m_nCustomSteps < 10);

DefineIntMacro(_T("NUM_NEW_STEPS"), m_nCustomSteps);
DefineIntMacro(_T("MPDLGS_INDEX_LAST"), m_nCustomSteps + nApwzSteps);
DefineIntMacro(_T("LAST_DOCTRACK_INDEX"), m_nCustomSteps +
    NUM_APWZ_EXE_DOC_STEPS);
DefineIntMacro(_T("LAST_DLGTRACK_INDEX"), m_nCustomSteps +
    NUM_APWZ_EXE_DLG_STEPS);

CString strCustomIndices;
for (i = 0; i < m_nCustomSteps; i++)
{
    DefineIntMacro(_T("ITERATOR"), i + 1);
    DefineIntMacro(_T("DLGID_VALUE"), i + FIRST_DLG_RSC);
    DefineIntMacro(_T("MPDLGS_INDEX"), i, nApwzSteps + i + 1);
```

UNITED STATES PATENT AND TRADEMARK OFFICE
CERTIFICATE OF CORRECTION

Page 52 of 113

PATENT NO. : 5,754,858

DATED : May 19, 1998

INVENTOR(S) : Broman et al.

It is certified that error appears in the above-identified patent and that said Letters Patent is hereby corrected as shown below:

```
        CString strCustomIndex;
        strCustomIndex.Format(_T(", %d"), nApwzSteps + i + 1);
        strCustomIndices += strCustomIndex;
    }
    DefineStringMacro(_T("CUSTOM_INDICES"), strCustomIndices);
}

//      Create one global instance of this class anyone can see.
COptions g_options;

PAINT.H

//      paint.h: declare helper functions used when drawing bitmaps on the dialogs
//
//      Copyright (c) 1985-1995, Microsoft Corporation. All rights reserved.
// void PaintBackground(CPaintDC* pdc, CDialog* pDlg);
void PaintBitmap(UINT nBmp, int x, int y, int nWidth, int nHeight,
        CPaintDC* pdc, CDC* pdcMem);

PAINT.CPP

//      paint.cpp: helper functions used when drawing bitmaps on the dialogs
//
//      Copyright (c) 1985-1995, Microsoft Corporation. All rights reserved.
// include "stdafx.h"
```

UNITED STATES PATENT AND TRADEMARK OFFICE
CERTIFICATE OF CORRECTION

PATENT NO.    : 5,754,858

DATED         : May 19, 1998

INVENTOR(S)   : Broman et al.

It is certified that error appears in the above-identified patent and that said Letters Patent is hereby corrected as shown below:

```
#include "customwz.h"

#ifdef _PSEUDO_DEBUG
#undef THIS_FILE
static char THIS_FILE[] = __FILE__;
endif //      Coordinates for yellow rectangle in dialog-box units
define RIGHT_YELLOW_DLGU    124
#define BOTTOM_YELLOW_DLGU   197

//      Draws a background of yellow on the left side of the dialog
void PaintBackground(CPaintDC* pdc, CDialog* pDlg)
{
        //      Get the yellow brush
        CBitmap pattern;
        pattern.LoadBitmap(IDB_YELLOW_PATTERN);
        CBrush brush(&pattern);

//      Draw the yellow background
        CRect rect(0, 0, RIGHT_YELLOW_DLGU + 1, BOTTOM_YELLOW_DLGU + 1);
        pDlg->MapDialogRect(&rect);
        pdc->DPtoLP(&rect);
        pdc->FillRect(&rect, &brush);
}

//      Draw the specified bitmap at the specified location
void PaintBitmap(UINT nBmp, int x, int y, int nWidth, int nHeight,
```

UNITED STATES PATENT AND TRADEMARK OFFICE
CERTIFICATE OF CORRECTION

PATENT NO.    : 5,754,858

DATED         : May 19, 1998

INVENTOR(S)   : Broman et al.

It is certified that error appears in the above-identified patent and that said Letters Patent is hereby corrected as shown below:

```
CPaintDC* pdc, CDC* pdcMem)
{
    CBitmap picture;

//   Load & select the bitmap into the device-context
    picture.LoadBitmap(nBmp);
    BITMAP bitmap;
    picture.GetObject(sizeof (BITMAP), &bitmap);
    CBitmap* pOldBitmap = pdcMem->SelectObject(&picture);

ASSERT(nWidth == bitmap.bmWidth);
    ASSERT(nHeight == bitmap.bmHeight);

//   Draw the bitmap
    pdc->BitBlt(x, y, nWidth, nHeight, pdcMem, 0, 0, SRCCOPY);

//   Reselect the previous bitmap object
    pdcMem->SelectObject(pOldBitmap);
}

RESOURCE.H

//{{NO_DEPENDENCIES}}
//      Microsoft Developer Studio generated include file.
//      Used by customwz.rc
//
#define IDP_BAD_PROJDIR              1
#define IDP_ZAP_CANT_OPEN_FILE       2
#define IDP_ZAP_CANT_GET_SIZE        3
```

UNITED STATES PATENT AND TRADEMARK OFFICE
CERTIFICATE OF CORRECTION

Page 55 of 113

PATENT NO. : 5,754,858

DATED : May 19, 1998

INVENTOR(S) : Broman et al.

It is certified that error appears in the above-identified patent and that said Letters Patent is hereby corrected as shown below:

```
            return CCustomAppWiz::LoadTemplate(lpszTemplateName, rdwSize, hInstance);
    }

//      We override ProcessTemplate as part of implementing the project
    // zapper.
    void CSampleAppWiz::ProcessTemplate(LPCTSTR lpszInput, DWORD dwSize, OutputStream* pOutput)
    {
            //      If we set m_bOverrideProcessing in LoadTemplate, then we're about
            //      zap this file.
            if (m_bOverrideProcessing)
            {
                    // Zap the file into a template
                    m_Zap.ZapFile(lpszInput, dwSize, pOutput);
                    return;
            }

// We're not zapping this file, so defer to the base class
            // implementation of ProcessTemplate
            CCustomAppWiz::ProcessTemplate(lpszInput, dwSize, pOutput);
    }

// We override PostProcessTemplate as part of implementing the project
    // zapper.
    void CSampleAppWiz::PostProcessTemplate(LPCTSTR szTemplate)
    {
            // If we set m_bOverrideProcessing in LoadTemplate, then we've just
            // zapped this file. Unload it.
            if (m_bOverrideProcessing)
            {
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
//       If the end-user clicks back, let the dialog chooser decide
//       what to pop up.
CAppWizStepDlg* CSampleAppWiz::Back(CAppWizStepDlg* pDlg)
{
         return m_pChooser->Back(pDlg);
}

//       We override LoadTemplate as part of implementing the project
//       zapper.
LPCTSTR CSampleAppWiz::LoadTemplate(LPCTSTR lpszTemplateName,
         DWORD& rdwSize, HINSTANCE hInstance)
{
         //       If the resource we're loading contains a backslash in it...
         if (_tcschr(lpszTemplateName, _T('\\')))
         {
                  //       ... then it's a file we're about to zap (see CZap).
                  m_bOverrideProcessing = TRUE;
                  //       Remember we're overriding parsing
                  return m_Zap.LoadFile(lpszTemplateName, rdwSize);
                  //       Prepare the zapper for this file
         }

//       Otherwise, defer to the base class implementation of LoadTemplate
         m_bOverrideProcessing = FALSE;

//       But first, be sure to define GENERATED_NEWPROJ_INF_FILES if it's time
         if (!_tcsicmp(lpszTemplateName, _T("newnwprj.inf")))
                  m_Zap.DefineGeneratedNewprojInfMacro();
```

UNITED STATES PATENT AND TRADEMARK OFFICE
CERTIFICATE OF CORRECTION

PATENT NO. : 5,754,858

DATED : May 19, 1998

INVENTOR(S) : Broman et al

It is certified that error appears in the above-identified patent and that said Letters Patent is hereby corrected as shown below:

```
        {
                POSITION posCurr = pos;
                CString strPlatform = Platforms.GetNext(pos);
                if (strPlatform.Left(5) != _T("Win32"))
                        Platforms.RemoveAt(posCurr);
        }
}

//      Set options & macros derived from project name entered by end-user.
void SetRootOptions()
{
        //      Set "FILEBASE" macro
        CString strFileBase;
        samplesw.m_Dictionary.Lookup(_T("Root"), strFileBase);
        DefineStringMacro(_T("filebase"), strFileBase);
}

//      If the end-user clicks next, let the dialog chooser decide
//      what to pop up next.
CAppWizStepDlg* CSampleAppWiz::Next(CAppWizStepDlg* pDlg)
{
        //      If the end-user is dismissing the New Project dialog,
        //      call DefineRootMacros
        if (pDlg == NULL)
                SetRootOptions();

return m_pChooser->Next(pDlg);
}
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
///////////////////////////////////////////////
//      The CSampleAppWiz class. Here we override many member functions of
//      CCustomAppWiz.

//      Initialize state of this custom AppWizard.
void CSampleAppWiz::InitCustomAppWiz()
{
        m_pChooser = new CDialogChooser;
        m_bOverrideProcessing = FALSE;
        SetNumberOfSteps(2);                            // Initially two steps
        //      Set the macro corresponding to the Custom AppWizard target type.
        //      This is used in mfcapwz.dll when it creates the target.
        DefineBoolMacro(_T("PROJTYPE_CUSTOMAW"), TRUE);

}

//      Before exiting, deallocate memory used for the dialog chooser
void CSampleAppWiz::ExitCustomAppWiz()
{
        ASSERT(m_pChooser != NULL);
        delete m_pChooser;
        m_pChooser = NULL;

}

//      This custom AppWizard only targets Win32 platform, so don't display
//      any others.
void CSampleAppWiz::GetPlatforms(CStringList& Platforms)
{
        POSITION pos = Platforms.GetHeadPosition();
        while (pos != NULL)
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
        int GetCustomType();

CZap m_Zap;

protected:
        CDialogChooser* m_pChooser;
        BOOL m_bOverrideProcessing;
};

extern CSampleAppWiz sampleaw;

SAMPLEAW.CPP

//      sampleaw.cpp: Implementation of CSampleAppWiz class.
//
//      Copyright (c) 1995-1995, Microsoft Corporation. All rights reserved.
// include "stdafx.h"
include "customwz.h"
#include "sampleaw.h"
#include "chooser.h"
#include "zap.h"
#include "options.h"

#ifdef _PSEUDO_DEBUG
#undef THIS_FILE
static char THIS_FILE[] = __FILE__;
endif
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
                            SAMPLEAW.CPP

//      sampleaw.cpp: implementation of CSampleAppWiz class.  This is where we
        //      override many of CCustomAppWiz's member functions.
        //
        //      Copyright (c) 1985-1995, Microsoft Corporation. All rights reserved.
        //
        #include "zap.h"

class CDialogChooser;

class CSampleAppWiz : public CCustomAppWiz
        {
        public:
                virtual void GetPlatforms(CStringList& pPlatforms);

virtual CAppWizStepDlg* Next(CAppWizStepDlg* pDlg);
                virtual CAppWizStepDlg* Back(CAppWizStepDlg* pDlg);

virtual void InitCustomAppWiz();
                virtual void ExitCustomAppWiz();

virtual LPCTSTR LoadTemplate(LPCTSTR lpszTemplateName,
                        DWORD& rdwSize, HINSTANCE hInstance = NULL);

virtual void ProcessTemplate(LPCTSTR lpszInput, DWORD dwSize, OutputStream*
        pOutput);
                virtual void PostProcessTemplate(LPCTSTR szTemplate);

void SetCustomType(int nCustomType);
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
#define IDC_CHECK5            1012
#define IDC_CHECK6            1013
#define IDC_CHECK7            1014
#define IDC_PROJ_NAME         1015
#define IDC_RADIO3            1016
#define IDC_SEQUENCE          1016
#define IDC_EDIT1             1019
#define IDC_STEPS             1019
#define IDC_CUSTOM            1022
#define IDC_ZAP               1023
#define IDC_STC_STEPS         1024
#define IDC_LANGS             1025
#define IDC_LIST1             1025
#define IDC_TITLE             1027
#define IDC_LANGS_STATIC      1028

//       Next default values for new objects
//
#ifdef APSTUDIO_INVOKED
#ifndef APSTUDIO_READONLY_SYMBOLS
#define _APS_3D_CONTROLS             1
#define _APS_NEXT_RESOURCE_VALUE     184
#define _APS_NEXT_COMMAND_VALUE      32771
#define _APS_NEXT_CONTROL_VALUE      1029
#define _APS_NEXT_SYMED_VALUE        102
#endif
#endif
```

UNITED STATES PATENT AND TRADEMARK OFFICE
CERTIFICATE OF CORRECTION

PATENT NO.     : 5,754,858

DATED          : May 19, 1998

INVENTOR(S)    : Broman et al.

It is certified that error appears in the above-identified patent and that said Letters Patent is hereby corrected as shown below:

```
#define IDP_TOO_MANY_LANGS      4
#define IDP_NO_LANGS_SELECTED   5
#define IDS_BROWSE_TITLE        5
#define IDI_CUSTOMWZ            128
#define IDD_ZAP                 129
#define IDD_CUSTOMAW_TYPE       130
#define IDD_APWZ_SEQUENCE       148
#define IDB_YELLOW_PATTERN      164
#define IDB_STEP1C              178
#define IDB_STEP1B              179
#define IDB_STEP1A              180
#define IDB_STEP2B              181
#define IDB_STEP2A              182
#define IDB_STEP2               183
#define IDC_BUTTON1             1000
#define IDC_BROWSE              1000
#define IDC_YELLOW              1000
#define IDC_BUTTON2             1001
#define IDC_BUTTON3             1002
#define IDC_BUTTON4             1003
#define IDC_SCROLLBAR1          1004
#define IDC_RADIO1              1005
#define IDC_APWZ_SEQ            1005
#define IDC_RADIO2              1006
#define IDC_APWZ_SEQ2           1006
#define IDC_SCROLLBAR2          1007
#define IDC_CHECK2              1009
#define IDC_CHECK3              1010
#define IDC_CHECK4              1011
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
                m_Zap.UnloadFile();
                m_bOverrideProcessing = FALSE;
        }
}

// The dialog chooser keeps track of which type of custom AppWizard we're
// creating (based on project, based on appwiz sequence, or base) so it
// knows what dialog to pop up next. Any request to set or get the
// custom AppWizard type goes through the chooser.

void CSampleAppWiz::SetCustomType(int nCustomType)
{
        m_pChooser->SetCustomType(nCustomType);
} int CSampleAppWiz::GetCustomType()
{
        return m_pChooser->GetCustomType();
}

// Create one global instance of this class anyone can see.
CSampleAppWiz sampleaw;

SEQDLG.H

// seqdlg.h : header file. This dialog contains options for being a
//      custom AppWizard off of a standard AppWizard sequence
//
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
// Copyright (c) 1985-1995, Microsoft Corporation. All rights reserved.
//

// These must match the order of the corresponding radio buttons
enum
{
        APWZSEQ_EXE,
        APWZSEQ_DLL,
        APWZSEQ_MAX,
};

/////////////////////////////////////////////////////////////
// CSequenceDlg dialog class CSequenceDlg : public CAppWizStepDlg
{
// Construction
public:
        CSequenceDlg();  // standard constructor
        virtual BOOL OnDismiss();

// Dialog Data
        //{{AFX_DATA(CSequenceDlg)
        enum { IDD = IDD_APWZ_SEQUENCE };
        int             m_nApwzSeq;
        //}}AFX_DATA // Overrides
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
// ClassWizard generated virtual function overrides
//{{AFX_VIRTUAL(CSequenceDlg)
protected:
virtual void DoDataExchange(CDataExchange* pDX);   // DDX/DDV support
//}}AFX_VIRTUAL // Implementation
protected:
    void SetSeqBitmap();        // Sets m_nSeqBitmap according to options
    UINT m_nSeqBitmap;          // IDB_ of bitmap to show
    void DefineDefaultLangMacros();
    BOOL DefineLangMacros();
    void InitLangList();
    void EnableLangListbox(BOOL bEnable);
    CStringList m_strLanguages;

// Generated message map functions
    //{{AFX_MSG(CSequenceDlg)
    afx_msg BOOL OnClickedRadio(UINT nID);
    afx_msg void OnPaint();
    virtual BOOL OnInitDialog();
    //}}AFX_MSG
    DECLARE_MESSAGE_MAP()
};
                        SEQDLG.CPP // seqdlg.cpp : implementation file
//
// Copyright (c) 1985-1995, Microsoft Corporation. All rights reserved.
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
// include "stdafx.h"
include "customwz.h"
#include "seqdlg.h"
#include "sampleew.h"
#include "typedlg.h"
#include "options.h"
#include "paint.h"

#ifdef _PSEUDO_DEBUG
#undef THIS_FILE
static char THIS_FILE[] = __FILE__;
endif // Retrieve language suffix ("enu" or "fra", etc.)
void GetLangSuffix(CString& strLang)
{
    int nLeftParen = strLang.Find(_T('('));
    ASSERT(nLeftParen != -1);
    strLang = strLang.Mid(nLeftParen + 1);   // Now, strLang starts at the DLL name
    strLang.MakeLower();
    int nPeriod = strLang.Find(_T('.'));
    ASSERT(nPeriod != -1);
    ASSERT(strLang.Left(5) == _T("appwz"));
    strLang = strLang.Mid(5, nPeriod-5);
}
```

UNITED STATES PATENT AND TRADEMARK OFFICE
CERTIFICATE OF CORRECTION

Page 67 of 113

PATENT NO. : 5,754,858

DATED : May 19, 1998

INVENTOR(S) : Broman et al.

It is certified that error appears in the above-identified patent and that said Letters Patent is hereby corrected as shown below:

```
///////////////////////////////////////////////
// CSequenceDlg dialog

CSequenceDlg::CSequenceDlg()
        : CAppWizStepDlg(CSequenceDlg::IDD)
{
        //{{AFX_DATA_INIT(CSequenceDlg)
        m_nApwzSeq = APWZSEQ_EXE;
        //}}AFX_DATA_INIT
        SetSeqBitmap();
        DefineDefaultLangMacros();
} void CSequenceDlg::DoDataExchange(CDataExchange* pDX)
{
        CAppWizStepDlg::DoDataExchange(pDX);
        //{{AFX_DATA_MAP(CSequenceDlg)
        DDX_Radio(pDX, IDC_APWZ_SEQ, m_nApwzSeq);
        //}}AFX_DATA_MAP
}

BEGIN_MESSAGE_MAP(CSequenceDlg, CAppWizStepDlg)
        //{{AFX_MSG_MAP(CSequenceDlg)
        ON_COMMAND_EX(IDC_APWZ_SEQ, OnClickedRadio)
        ON_WM_PAINT()
        ON_COMMAND_EX(IDC_APWZ_SEQ2, OnClickedRadio)
        //}}AFX_MSG_MAP
```

UNITED STATES PATENT AND TRADEMARK OFFICE
CERTIFICATE OF CORRECTION

Page 68 of 113

PATENT NO. : 5,754,858

DATED : May 19, 1998

INVENTOR(S) : Broman et al.

It is certified that error appears in the above-identified patent and that said Letters Patent is hereby corrected as shown below:

```
END_MESSAGE_MAP()

//////////////////////////////////////////////////
// CSequenceDlg message handlers define STEP2AB_LEFT        8
define STEP2AB_TOP         40
#define STEP2AB_WIDTH       179
#define STEP2AB_HEIGHT      180

// Override OnPaint to draw pictures on the left side
void CSequenceDlg::OnPaint()
{
        CPaintDC dc(this); // device context for painting PaintBackground(&dc, this);

CDC dcMem;

if (!dcMem.CreateCompatibleDC(&dc))

return;

// picture
        PaintBitmap(m_nSeqBitmap, STEP2AB_LEFT, STEP2AB_TOP, STEP2AB_WIDTH,
STEP2AB_HEIGHT, &dc, &dcMem);
}

// Set member variable to the bitmap ID corresponding to the currently
// selected AppWizard sequence
void CSequenceDlg::SetSeqBitmap()
{
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
        static UINT nBmps[] = {IDB_STEP2A, IDB_STEP2B};
        ASSERT (m_nApwzSeq == 0 || m_nApwzSeq == 1);
        m_nSeqBitmap = nBmps[m_nApwzSeq];
}

// This handler allows us to dynamically change the bitmap as soon
// as a new AppWizard sequence is selected.
BOOL CSequenceDlg::OnClickedRadio(UINT nID)
{
        UpdateData(TRUE);
        SetSeqBitmap();

// Invalidate the portion of this dialog on which we draw the picture
        CRect rect(STEP2AB_LEFT, STEP2AB_TOP, STEP2AB_LEFT + STEP2AB_WIDTH,
STEP2AB_TOP + STEP2AB_HEIGHT);
        RedrawWindow(&rect, NULL, RDW_INVALIDATE | RDW_UPDATENOW);

EnableLangListbox(m_nApwzSeq == APWZSEQ_EXE);

return TRUE;
} void CSequenceDlg::DefineDefaultLangMacros()
{
        ScanForAvailableLanguages(m_strLanguages);

// m_strLanguages is now a stringlist whose entries are of the form:
        // "U.S. English (appwzenu.dll):0x0409D4e4" For the purposes of the
        // listbox, we want to strip out the translation identifiers
        // (0x0409D4e4). However, we retain the POSITION in m_strLanguages
```

UNITED STATES PATENT AND TRADEMARK OFFICE
CERTIFICATE OF CORRECTION

PATENT NO.    : 5,754,858

DATED         : May 19, 1998

INVENTOR(S)   : Broman et al.

It is certified that error appears in the above-identified patent and that said Letters Patent is hereby corrected as shown below:

```
// for each entry, so that when we generate the custom AppWizard, its
// code will correctly call SetSupportedLanguages with the original
// entries that AppWizard gave us here, complete with the translation
// identifiers (see InitLangList() below).

POSITION pos = m_strLanguages.GetHeadPosition();
int nLanguageCount = 0;
CString strSupportedLangs;
while (pos != NULL)
{
        CString strLang = m_strLanguages.GetNext(pos);
        strSupportedLangs += _T("\n") + strLang;
        GetLangSuffix(strLang);
        DefineStringMacro(_T("CUSTOM_LANG_SUFFIX"), nLanguageCount++,
strLang);
}

ASSERT(!strSupportedLangs.IsEmpty());
strSupportedLangs = strSupportedLangs.Mid(2);     // Chop off leading "\n"
DefineStringMacro(_T("SUPPORTED_LANGS"), strSupportedLangs);
DefineIntMacro(_T("NUM_CUSTOM_LANGS"), nLanguageCount);
}

// Set macros corresponding to the languages selected
#define MAX_SELECTED_LANGS 32
BOOL CSequenceDlg::DefineLangMacros()
{
        CString strSupportedLangs;
        int pnSelectedLangs[MAX_SELECTED_LANGS];
        CListBox* pList = (CListBox*) GetDlgItem(IDC_LANGS);
```

UNITED STATES PATENT AND TRADEMARK OFFICE
CERTIFICATE OF CORRECTION

Page 71 of 112

PATENT NO. : 5,754,858

DATED : May 19, 1998

INVENTOR(S) : Broman et al.

It is certified that error appears in the above-identified patent and that said Letters Patent is hereby corrected as shown below:

```
int nSelCount = pList->GetSelCount();

if (nSelCount > MAX_SELECTED_LANGS)
{
    // We use a stack-allocated, static-size array for storing the
    // listbox selections, since it's cheaper than using the heap.
    // Print error in the unlikely event there are over 32 languages
    // installed & selected.
    CString strPrompt;
    strPrompt.LoadString(IDP_TOO_MANY_LANGS);
    strPrompt.Format(strPrompt, MAX_SELECTED_LANGS);
    AfxMessageBox(strPrompt);
    return FALSE;
}

// Make sure at least one language is selected
if (nSelCount == 0)
{
    AfxMessageBox(IDP_NO_LANGS_SELECTED);
    return FALSE;
}

// Go through listbox and make a string of the names of the selected
// languages. The string will be of the form:
// "U.S. English (appwzenu.dll)\nFrench (appwzfra.dll)"
pList->GetSelItems(MAX_SELECTED_LANGS, pnSelectedLangs);

for (int i=0; i < nSelCount; i++)
{
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
            POSITION pos = (POSITION) pList->GetItemData(pnSelectedLangs[i]);
            CString strLang = m_strLanguages.GetAt(pos);
            strSupportedLangs += _T("\n") + strLang;

// Retrieve language suffix ("enu" or "fra", etc.)
            GetLangSuffix(strLang);
            DefineStringMacro(_T("CUSTOM_LANG_SUFFIX"), i, strLang);
        }

ASSERT(!strSupportedLangs.IsEmpty());
        strSupportedLangs = strSupportedLangs.Mid(2);    // Chop off leading "\n"
        DefineStringMacro(_T("SUPPORTED_LANGS"), strSupportedLangs);
        DefineIntMacro(_T("NUM_CUSTOM_LANGS"), nSelCount);

return TRUE;
    }

// Set step-related template macros before dismissing
BOOL CSequenceDlg::OnDismiss()
{
        if (!UpdateData(TRUE))
                return FALSE;

if (m_nApwzSeq == APWZSEQ_EXE && !DefineLangMacros())
                return FALSE;

g_options.m_nApwzSeq = m_nApwzSeq;
        g_options.DefineDlgMacros();
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
                return TRUE;
        } void CSequenceDlg::EnableLangListbox(BOOL bEnable)
{
        GetDlgItem(IDC_LANGS)->EnableWindow(bEnable);
        GetDlgItem(IDC_LANGS_STATIC)->EnableWindow(bEnable);
} void CSequenceDlg::InitLangList()
{
        CListBox* pList = (CListBox*) GetDlgItem(IDC_LANGS);

int i;
        POSITION pos = m_strLanguages.GetHeadPosition();
        while (pos != NULL)
        {
                POSITION posCurrent = pos;
                CString strLang = m_strLanguages.GetNext(pos);
                int nSemicolon = strLang.Find(_T(';'));
                ASSERT(nSemicolon != -1);

// Add the entry minus the translation ID to the listbox
                i = pList->AddString(strLang.Left(nSemicolon));

// Retain original POSITION for use when generating the wizard
                pList->SetItemData(i, (DWORD) posCurrent);
        }
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
// By default, the custom AppWizard will support the languages AppWizard
// supports. Thus, we start off the listbox by selecting all languages.
if (li == 0)
        pList->SetSel(0, TRUE);
else
        pList->SelItemRange(TRUE, 0, li);

EnableLangListbox(m_nApwzSeq == APWZSEQ_EXE);
}

BOOL CSequenceDlg::OnInitDialog()
{
        CAppWizStepDlg::OnInitDialog();
        InitLangList();

return TRUE;
}
                                STDAFX.H

// stdafx.h : include file for standard system include files,
// or project specific include files that are used frequently, but
// are changed infrequently
//
// Copyright (c) 1985-1995, Microsoft Corporation. All rights reserved.
// include <afxwin.h>     // MFC core and standard components
include <afxext.h>     // MFC extensions
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
#include <afxtempl.h>
#include <customw.h>
                            STDAFX.CPP // stdafx.cpp : source file that includes just the standard includes
// again.pch will be the pre-compiled header
// stdafx.obj will contain the pre-compiled type information
//
// Copyright (c) 1985-1995, Microsoft Corporation. All rights reserved.
// include "stdafx.h"

TYPEDLG.H

// typedlg.h : header file. This dialog is step 1 and is used to select
// the type of custom AppWizard to create
//
// Copyright (c) 1985-1995, Microsoft Corporation. All rights reserved.
//

// These enumerate the different types of custom AppWizards we can create.
// These must be in the same order as the corresponding radio buttons
enum
{
    CUSTOMTYPE_ZAP,
    CUSTOMTYPE_SEQUENCE,
    CUSTOMTYPE_BASE,
    CUSTOMTYPE_MAX,
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
};

class CCustomTypeDlg : public CAppWizStepDlg
{
// Construction
public:
    CCustomTypeDlg();   // standard constructor
    virtual BOOL OnDismiss();
    void UpdateTitle(const CString& strRoot);

// Dialog Data
    //{{AFX_DATA(CCustomTypeDlg)
    enum { IDD = IDD_CUSTOMAW_TYPE };
    int     m_nCustomType;
    UINT    m_nCustomSteps;
    CString m_strTitle;
    //}}AFX_DATA // Overrides
    // ClassWizard generated virtual function overrides
    //{{AFX_VIRTUAL(CCustomTypeDlg)
    protected:
    virtual void DoDataExchange(CDataExchange* pDX);    // DDX/DDV support
    //}}AFX_VIRTUAL // Implementation
protected:
    void EnableCustomSteps();
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
void SetBitmap();
UINT m_nBitmap;
CString m_strLastCustomSteps;    // Remembers #custom steps, before it's reset to 0 void SetCustomTypeMacros();
void DefineTitleMacro();

// Generated message map functions
//{{AFX_MSG(CCustomTypeDlg)
afx_msg BOOL OnClickedRadio(UINT nID);
afx_msg void OnPaint();
//}}AFX_MSG
DECLARE_MESSAGE_MAP()
};
                              TYPEDLG.CPP // typedlg.cpp : implementation file
//
// Copyright (c) 1985-1996, Microsoft Corporation. All rights reserved.
// include "stdafx.h"
include "customwz.h"
#include "samplesw.h"
#include "typedlg.h"
#include "options.h"
#include "paint.h"

#ifdef _PSEUDO_DEBUG
```

UNITED STATES PATENT AND TRADEMARK OFFICE
CERTIFICATE OF CORRECTION

PATENT NO.    : 5,754,858

DATED         : May 19, 1998

INVENTOR(S)   : Broman et al.

It is certified that error appears in the above-identified patent and that said Letters Patent is hereby corrected as shown below:

```
#undef THIS_FILE
static char THIS_FILE[] = __FILE__;
endif

//////////////////////////////////////////////
// CCustomTypeDlg dialog

CCustomTypeDlg::CCustomTypeDlg()
    : CAppWizStepDlg(CCustomTypeDlg::IDD)
{
    //{{AFX_DATA_INIT(CCustomTypeDlg)
    m_nCustomType = CUSTOMTYPE_ZAP;
    m_nCustomSteps = 1;
    m_strTitle = _T("");
    //}}AFX_DATA_INIT
    m_strLastCustomSteps = _T("1");
    SetBitmap();
} void CCustomTypeDlg::DoDataExchange(CDataExchange* pDX)
{
    CAppWizStepDlg::DoDataExchange(pDX);
    //{{AFX_DATA_MAP(CCustomTypeDlg)
    DDX_Radio(pDX, IDC_ZAP, m_nCustomType);
    DDX_Text(pDX, IDC_STEPS, m_nCustomSteps);
    DDV_MinMaxUInt(pDX, m_nCustomSteps, 0, 9);
    DDX_Text(pDX, IDC_TITLE, m_strTitle);
    //}}AFX_DATA_MAP
    EnableCustomSteps();
```

UNITED STATES PATENT AND TRADEMARK OFFICE
CERTIFICATE OF CORRECTION

PATENT NO.   : 5,754,858

DATED        : May 19, 1998

INVENTOR(S)  : Broman et al.

It is certified that error appears in the above-identified patent and that said Letters Patent is hereby corrected as shown below:

```
}

//  Base default title of custom AppWizard off of project name. This is called
//  by CDialogChooser when the New Project dialog is dismissed with a
//  new project name.
void CCustomTypeDlg::UpdateTitle(const CString& strRoot)
{
    m_strTitle = strRoot + _T(" AppWizard");
}

BEGIN_MESSAGE_MAP(CCustomTypeDlg, CAppWizStepDlg)
    //{{AFX_MSG_MAP(CCustomTypeDlg)
    ON_COMMAND_EX(IDC_ZAP, OnClickedRadio)
    ON_COMMAND_EX(IDC_SEQUENCE, OnClickedRadio)
    ON_COMMAND_EX(IDC_CUSTOM, OnClickedRadio)
    ON_WM_PAINT()
    //}}AFX_MSG_MAP
END_MESSAGE_MAP()

///////////////////////////////////////////////////////
//  CCustomTypeDlg message handlers define STEP1_LEFT      8
define STEP1_TOP       40
#define STEP1_WIDTH     179
#define STEP1_HEIGHT    180

//  Override OnPaint to draw pictures on the left side
void CCustomTypeDlg::OnPaint()
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
{
    CPaintDC dc(this); // device context for painting

PaintBackground(&dc, this);

CDC dcMem;
    if (!dcMem.CreateCompatibleDC(&dc))
        return;

// Picture
    PaintBitmap(m_nBitmap, STEP1_LEFT, STEP1_TOP, STEP1_WIDTH, STEP1_HEIGHT, &dc, &dcMem);
}

// Set member variable to the bitmap ID corresponding to the currently
// selected custom AppWizard type
void CCustomTypeDlg::SetBitmap()
{
    static UINT nBmps[] = {IDB_STEP1A, IDB_STEP1B, IDB_STEP1C};
    ASSERT (m_nCustomType >= 0 && m_nCustomType < 3);
    m_nBitmap = nBmps[m_nCustomType];
}

// This handler allows us to dynamically change the bitmap as soon
// as a new custom AppWizard type is selected. We also change the number
// of steps accordingly, since two of the options add an extra
// step after this one.
BOOL CCustomTypeDlg::OnClickedRadio(UINT nID)
{
```

UNITED STATES PATENT AND TRADEMARK OFFICE
CERTIFICATE OF CORRECTION

Page 81 of 113

PATENT NO. : 5,754,858

DATED : May 19, 1998

INVENTOR(S) : Broman et al.

It is certified that error appears in the above-identified patent and that said Letters Patent is hereby corrected as shown below:

```
{
    case IDC_ZAP:
        m_nCustomType = CUSTOMTYPE_ZAP;
        SetNumberOfSteps(2);
        break;
    case IDC_CUSTOM:
        m_nCustomType = CUSTOMTYPE_BASE;
        SetNumberOfSteps(1);
        break;
    case IDC_SEQUENCE:
        m_nCustomType = CUSTOMTYPE_SEQUENCE;
        SetNumberOfSteps(2);
        break;
    default:
        ASSERT(FALSE);
}
SetBitmap();
samplesw.SetCustomType(m_nCustomType);
EnableCustomSteps();

// Invalidate the portion of this dialog on which we draw the picture
CRect rect(STEP1_LEFT, STEP1_TOP, STEP1_LEFT + STEP1_WIDTH, STEP1_TOP + STEP1_HEIGHT);
RedrawWindow(&rect, NULL, RDW_INVALIDATE | RDW_UPDATENOW);

return TRUE;
}

// If we're basing a custom AppWizard off of a project, that custom AppWizard
// must have 0 steps. Thus, we must disable the "How many custom steps?"
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
//   control when appropriate.
void CCustomTypeDlg::EnableCustomSteps()
{
    BOOL bEnable = (m_nCustomType == CUSTOMTYPE_BASE || m_nCustomType == CUSTOMTYPE_SEQUENCE);

GetDlgItem(IDC_STC_STEPS)->EnableWindow(bEnable);

if (!GetDlgItem(IDC_STEPS)->EnableWindow(bEnable))

// Remember number of custom steps if it was previously enabled
        GetDlgItem(IDC_STEPS)->GetWindowText(m_strLastCustomSteps);

if (bEnable == TRUE)
        GetDlgItem(IDC_STEPS)->SetWindowText(m_strLastCustomSteps);
    else
        GetDlgItem(IDC_STEPS)->SetWindowText(_T("0"));
}

//   These must be in the same order as the corresponding radio buttons &
//   CUSTOMTYPE enum
static LPCTSTR lpszCustomTypeMacros[] =
{
    _T("CUSTOMTYPE_ZAP"),
    _T("CUSTOMTYPE_SEQUENCE"),
    _T("CUSTOMTYPE_BASE"),
};

//   Sets the macro corresponding to the custom AppWizard type (resets the others)
void CCustomTypeDlg::SetCustomTypeMacros()
{
    for (UINT i=0; i < CUSTOMTYPE_MAX; i++)
        DefineBoolMacro(lpszCustomTypeMacros[i], FALSE);
```

UNITED STATES PATENT AND TRADEMARK OFFICE
CERTIFICATE OF CORRECTION

Page 83 of 113

PATENT NO. : 5,754,858

DATED : May 19, 1998

INVENTOR(S) : Broman et al.

It is certified that error appears in the above-identified patent and that said Letters Patent is hereby corrected as shown below:

```
        ASSERT(m_nCustomType >= 0 && m_nCustomType <= 2);
        DefineBoolMacro(lpszCustomTypeMacros[m_nCustomType], TRUE);
}

//  Sets the macro for the custom AppWizard's title
void CCustomTypeDlg::DefineTitleMacro()
{
        DefineStringMacro(_T("AW_TITLE"), m_strTitle);
}

//  Set step-related template macros before dismissing
BOOL CCustomTypeDlg::OnDismiss()
{
        ASSERT (0 <= m_nCustomType && m_nCustomType < CUSTOMTYPE_MAX);

if (!UpdateData(TRUE))
                return FALSE;

g_options.m_nCustomType = m_nCustomType;
        g_options.m_nCustomSteps = m_nCustomSteps;
        g_options.DefineDlgMacros();
        SetCustomTypeMacros();
        DefineTitleMacro();
        return TRUE;
}
                                ZAP.H //  zap.h : declaration of the CZap class. This class handles zapping the files
//  of a project off of which we're basing the generated custom
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
// AppWizard The files are zapped into templates used by the generated
// custom AppWizard. Class and file names from the original project
// are "macroized" so that the generated custom AppWizard will create
// new projects with class and file names derived from the new
// projects' names, rather than from the original project's name.
//
// Copyright (c) 1985-1995, Microsoft Corporation. All rights reserved.
// ifndef __ZAP_H__
define __ZAP_H__

// Each ZRDRootType represents a string derived from the original project
// name.
#define NUM_ROOT_TYPES 10
enum ZRDRootType
{
    ZRD_ROOT,
    ZRD_ROOT_UPR,
    ZRD_SAFE_ROOT,
    ZRD_CLASS,
    ZRD_FILEBASE,
    ZRD_DOC,
    ZRD_DOC_UPR,
    ZRD_MAC_TYPE,
    ZRD_R_FILE,
    ZRD_R_FILE_UPR,
};
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
// Each instance of this structure contains a recipe for matching one
// string in the original project, and replacing it with a string
// to be put in the generated custom AppWizard's templates.
struct ZapRowData
{
    // Strings composing item to match
    LPCTSTR lpszPre;
    ZRDRootType nRootType;
    LPCTSTR lpszPost;

// Strings to replace it with
    LPCTSTR lpszReplace[2];
};

class OutputStream;

// There is only one CZap instantiated at a time. It corresponds to the
// project off of which we're basing the custom AppWizard. It's capable of
// macroizing ("zapping") individual filenames (ZapFileName) and
// template-izing ("zapping") entire files (ZapFile).
class CZap
{
public:
    CZap()
        { m_hFile = NULL; m_hMapping = NULL; m_pStrMatches = NULL; m_bBinary = FALSE;
m_posTplName = NULL; }
    ~CZap();

void DefineGeneratedNewprojInfMacro()
        { DefineStringMacro(_T("GENERATED_NEWPROJ_INF_FILES"), m_strGeneratedNewProjInfo); }
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
                                            // macro to.

CString* m_pStrMatches;          // Array of strings to search for when zapping a
                                             // file. The entries correspond 1-to-1 with
                                             // entries of the rrdGeneral[] array defined
                                             // in zap.cpp
    };

#endif //_ZAP_H_

ZAP.CPP

//  zap.cpp : implementation of the CZap class
//
//  Copyright (c) 1985-1995, Microsoft Corporation. All rights reserved.
// include "stdafx.h"
include "customwz.h"
#include "sampleew.h"
#include "zap.h"

#ifdef _PSEUDO_DEBUG
#undef THIS_FILE
static char THIS_FILE[] = __FILE__;
endif // This helper (used in CZap::LoadFile) determines whether we should zap
// a file into a "binary" template— that is, a template to be copied using
// CopyTemplate, rather than parsed via ProcessTemplate.
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
if (m_hFile == INVALID_HANDLE_VALUE)
{
    m_hFile = NULL;
    ReportAndThrow(IDP_ZAP_CANT_OPEN_FILE, lpszResource);
}

//   Get the file's size
dwSize = GetFileSize(m_hFile, NULL);
if (dwSize == 0xffffffff)
{
    m_hFile = NULL;
    ReportAndThrow(IDP_ZAP_CANT_GET_SIZE, lpszResource);
}

// Create a mapping object from the file
m_hMapping = CreateFileMapping(
    m_hFile,         // Handle we got from CreateFile
    NULL,            // No security attributes
    PAGE_READONLY,   // read-only
    0, 0,            // Max size = current size of file
    NULL);           // Don't name the mapping object // Map the file to memory
m_lpszFile = (LPCTSTR) MapViewOfFile(
    m_hMapping,      // Handle we got from CreateFileMapping
    FILE_MAP_READ,   // read-only (didn't I mention that before?)
    0, 0,            // Offset into file = beginning of file
    0);              // Map entire file
```

UNITED STATES PATENT AND TRADEMARK OFFICE
CERTIFICATE OF CORRECTION

PATENT NO.    : 5,754,858

DATED         : May 19, 1998

INVENTOR(S)   : Broman et al.

It is certified that error appears in the above-identified patent and that said Letters Patent is hereby corrected as shown below:

```
    _splitpath(lpszResource, NULL, m_strSubdir.GetBuffer(_MAX_DIR),
    m_strBaseFileName.GetBuffer(_MAX_FNAME),
        m_strFileExt.GetBuffer(_MAX_EXT));

m_strSubdir.ReleaseBuffer();
    m_strSubdir.MakeLower();
    m_strBaseFileName.ReleaseBuffer();
    m_strFileExt.ReleaseBuffer();
    m_strBaseFileName += m_strFileExt;

LPCTSTR szBeginRootDir = _tcsstr(m_strSubdir, m_strRootDir);
    ASSERT(szBeginRootDir != NULL);
    m_strSubdir = szBeginRootDir + m_strRootDir.GetLength();

m_bBinary = ShouldCopyVerbatim(m_strBaseFileName, m_strFileExt);

// Remember name of file for potential future error messages
    m_strFile = lpszResource;

return m_lpszFile;
}

// Called after a file has been zapped to deallocate resources used for zapping.
void CZap::UnloadFile()
{
    ASSERT(m_hFile != NULL);
    ASSERT(m_hMapping != NULL);
    ASSERT(m_lpszFile != NULL);
    ASSERT(!m_strFile.IsEmpty());

VERIFY(UnmapViewOfFile((LPVOID) m_lpszFile));
    VERIFY(CloseHandle(m_hMapping));
```

**UNITED STATES PATENT AND TRADEMARK OFFICE
CERTIFICATE OF CORRECTION**

PATENT NO. : 5,754,858

DATED : May 19, 1998

INVENTOR(S) : Broman et al.

It is certified that error appears in the above-identified patent and that said Letters Patent is hereby corrected as shown below:

```
    VERIFY(CloseHandle(m_hFile));
    m_hFile = NULL;
    m_hMapping = NULL;
    m_strFile.Empty();
}

// This helper (used in CZap::AddToNewProjInf) determines whether the custom
// AppWizard we're generating should always add this file to the project
// makefile.
inline BOOL ShouldAddFileToProject(LPCTSTR szFullName, LPCTSTR szExt)
{
    return (szExt != NULL &&
        (!_tcsicmp(szExt, _T(".cpp")) || !_tcsicmp(szExt, _T(".rc"))
        || !_tcsicmp(szExt, _T(".odl")) || !_tcsicmp(szExt, _T(".r"))
        || !_tcsicmp(szExt, _T(".c")) || !_tcsicmp(szFullName, _T("readme.txt"))));
}

// This is defined in zapdlg.cpp. We've stored the non-colliding names of the templates
// we're generating in here. This information is used in CZap::AddToNewProjInf() below.
extern CStringList g_TemplateNames;

// This is called after a file is zapped. At that point, it has been determined
// whether the resulting template should be considered a "binary" template, and
// so we're prepared to add the entry to the generated custom AppWizard's
// newproj.inf (which is what this does).
void CZap::AddToNewProjInf()
{
    ASSERT(m_posTplName != NULL);
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
// Determine whether we should set the '+' flag
CString strPlus;
if (ShouldAddFileToProject(m_strBaseFileName, m_strFileExt))
    strPlus = _T("+");

// Determine whether we should set the '=' flag
CString strEquals;
strEquals = m_bBinary ? _T("=") : _T("");

CString strMacroizedFile;
ZapFileName(m_strBaseFileName, strMacroizedFile);
CString strTemplateName = g_TemplateNames.GetNext(m_posTplName);

// Finally, the string used in this custom AppWizard's newwrproj.inf
// (i.e., the generated custom AppWizard's newproj.inf).
m_strGeneratedNewProjInfo += = strEquals + strPlus + strTemplateName // Template we just zapped
    + _T("\t")
    + m_strSubdir + strMacroizedFile + _T("\n");    // What that template generates
}

// This is the meat of our override of ProcessTemplate. It zaps a file line
// by line using ZapLine.
void CZap::ZapFile(LPCTSTR lpszInput, DWORD dwSize, OutputStream* pOutput)
{
    ASSERT(m_hFile != NULL);
    ASSERT(m_hMapping != NULL);
    if (m_posTplName == NULL)
        m_posTplName = g_TemplateNames.GetHeadPosition();
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
if (m_bBinary)
{
    samplesw.CopyTemplate(lpszInput, dwSize, pOutput);
    AddToNewProjInf();
    return;
} if (dwSize == 0)
{
    pOutput->WriteLine(_T(" "));
    AddToNewProjInf();
    return;
}

LPCTSTR lpszBeginLine = lpszInput;
LPCTSTR lpszEndLine;

// Loop line by line, until we go past the end
while ((DWORD)(lpszBeginLine-lpszInput) < dwSize)
{
    // Start from the beginning of a line, and find a carriage return
    lpszEndLine = _tcschr(lpszBeginLine, _T('\r'));

// If there was no carriage return...
    if (lpszEndLine == NULL
        // ...or no newline after the carriage return
        || *(lpszEndLine = _tcsinc(lpszEndLine)) != _T('\n'))
    {
        // Then this must be a binary file (or there was no trailing
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
    // "\r\n" at the end of the file). In either case, bail and
    // write the rest of the file verbatim to the output; mark the
    // file as binary.
    m_bBinary = TRUE;
    pOutput->WriteBlock(lpszBeginLine, dwSize - (DWORD)(lpszBeginLine-lpszInput));
    break;
  }

// Here, we successfully found a "\r\n", and lpszEndLine is
    // sitting at the "\n". So zap the line.
    CString strLine(lpszBeginLine, lpszEndLine-lpszBeginLine-1);
    ZapLine(strLine);
    pOutput->WriteLine(strLine);
    lpszBeginLine = _tcsinc(lpszEndLine);
  }
  AddToNewProjInf();
}

// Here are the brains of the operation.  zdGeneral contains the strings we
// search for, and what we replace them with.  ZapRowData is defined in
// zap.h.
// The reason we have such a structure is that we can not simply "macroize"
// every occurrence of the project name in its files.  For example, if the
// project were named "View" or "while", and we blindly replaced all
// occurrences of the project name with macros, the generated custom AppWizard
// would be incapable of creating compilable projects.  Thus, we have to
// search for the project name occurring in special contexts.
// In general, the format is:
// { Pre, RootType, Post, {Replacement #0, Replacement #1}}.
```

UNITED STATES PATENT AND TRADEMARK OFFICE
CERTIFICATE OF CORRECTION

Page 93 of 113

PATENT NO. : 5,754,858

DATED : May 19, 1998

INVENTOR(S) : Broman et al.

It is certified that error appears in the above-identified patent and that said Letters Patent is hereby corrected as shown below:

```
// where Pre + RootType + Post is the string we search for, and Replacement #0
// is what we usually replace it with- the exception is when we're naming
// one of the generated custom AppWizard's template files, in which case we use
// Replacement #1. (Replacement #1 can be NULL if we know that the particular
// search string will never be replaced by the name of a template file in
// the generated custom AppWizard.)
// See CZap::ZapLine and its references in CZap::ZapFile & CZap::ZapFileName,
// to see how zrdGeneral is used.
static ZapRowData zrdGeneral[] =
{
    {_T(""), ZRD_ROOT, _T(".h"), {_T("$$root$$.h"), _T("root.h")}},
    {_T(""), ZRD_ROOT, _T(".cpp"), {_T("$$root$$.cpp"), _T("root.cpp")}},
    {_T(""), ZRD_ROOT, _T(".rc"), {_T("$$root$$.rc"), _T("root.rc")}},
    {_T(""), ZRD_ROOT_UPR, _T(".RC"), {_T("$$ROOT$$.RC"), NULL}},
    {_T(""), ZRD_ROOT, _T(".rc2"), {_T("$$root$$.rc2"), _T("root.rc2")}},
    {_T(""), ZRD_ROOT_UPR, _T(".RC2"), {_T("$$ROOT$$.RC2"), NULL}},
    {_T(""), ZRD_ROOT, _T(".ico"), {_T("$$root$$.ico"), _T("root.ico")}},
    {_T(""), ZRD_ROOT, _T(".dll"), {_T("$$root$$.dll"), NULL}},
    {_T(""), ZRD_ROOT_UPR, _T(".DLL"), {_T("$$ROOT$$.DLL"), NULL}},
    {_T(""), ZRD_ROOT, _T(".exe"), {_T("$$root$$.exe"), NULL}},
    {_T(""), ZRD_ROOT_UPR, _T(".EXE"), {_T("$$ROOT$$.EXE"), NULL}},
    {_T(""), ZRD_ROOT, _T(".mak"), {_T("$$root$$.mak"), _T("root.mak")}},
    {_T(""), ZRD_ROOT, _T(".hm"), {_T("$$root$$.hm"), _T("root.hm")}},
    {_T(""), ZRD_ROOT_UPR, _T(".HM"), {_T("$$ROOT$$.HM"), NULL}},
    {_T(""), ZRD_ROOT, _T(".hpj"), {_T("$$root$$.hpj"), _T("root.hpj")}},
    {_T(""), ZRD_ROOT_UPR, _T(".HPJ"), {_T("$$ROOT$$.HPJ"), NULL}},
    {_T(""), ZRD_ROOT, _T(".cnt"), {_T("$$root$$.cnt"), _T("root.cnt")}},
    {_T(""), ZRD_ROOT, _T(".clw"), {_T("$$root$$.clw"), _T("root.clw")}},
    {_T(""), ZRD_ROOT, _T(".reg"), {_T("$$root$$.reg"), _T("root.reg")}},
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
{_T("")., ZRD_ROOT, _T(".def"), {_T("##root##.def"), _T("root.def")}},
{_T("")., ZRD_ROOT, _T(".odl"), {_T("##root##.odl"), _T("root.odl")}},
{_T("")., ZRD_ROOT, _T(".tlb"), {_T("##root##.tlb"), _T("root.tlb")}},
{_T("")., ZRD_R_FILE, _T(".reg"), {_T("##root##Mac.reg"), _T("MacRoot.reg")}},
{_T("")., ZRD_R_FILE, _T(".r"), {_T("##root##Mac.r"), _T("root.r")}},
{_T("")., ZRD_ROOT, _T(".pch"), {_T("##root##.pch"), NULL}},
{_T("")., ZRD_ROOT, _T("DLL"), {_T("##safe_root##DLL"), NULL}},
{_T("library "), ZRD_CLASS, _T(""), {_T("library ##root##"), NULL}},// (root.odl)
{_T("IID_I"), ZRD_DOC, _T(""), {_T("IID_##Doc##"), NULL}},
{_T("IDD_"), ZRD_SAFE_ROOT, _T("_"), {_T("IDD_##SAFE_ROOT##_"), NULL}},
{_T("C"), ZRD_CLASS, _T("App"), {_T("C##Safe_root##App"), NULL}},
{_T("C"), ZRD_CLASS, _T("Doc"), {_T("C##Safe_root##Doc"), NULL}},
{_T("C"), ZRD_CLASS, _T("View"), {_T("C##Safe_root##View"), NULL}},
{_T("C"), ZRD_CLASS, _T("Set"), {_T("C##Safe_root##Set"), NULL}},
{_T("C"), ZRD_CLASS, _T("Cnvritem"), {_T("C##Safe_root##Cnvritem"), NULL}},
{_T("C"), ZRD_CLASS, _T("Srvritem"), {_T("C##Safe_root##Srvritem"), NULL}},
{_T("C"), ZRD_CLASS, _T("Dlg"), {_T("C##Safe_root##Dlg"), NULL}},
{_T(""), ZRD_FILEBASE, _T("Doc."), {_T("##root##Doc."), _T("Doc.")}},
{_T(""), ZRD_FILEBASE, _T("View."), {_T("##root##View."), _T("View.")}},
{_T(""), ZRD_FILEBASE, _T("Set."), {_T("##root##Set."), _T("RecSet.")}},
{_T(""), ZRD_FILEBASE, _T("Dlg."), {_T("##root##Dlg."), _T("Dialog.")}},
{_T("m_"), ZRD_ROOT, _T("Set"), {_T("m_##safe_root##Set"), NULL}},
{_T("IDR_"), ZRD_DOC_UPR, _T("TYPE"), {_T("IDR_##DOC##TYPE"), NULL}},
{_T("dispinterface "), ZRD_DOC, _T(""), {_T("dispinterface ##Doc##"), NULL}},
{_T("\n"), ZRD_DOC, _T("\n"), {_T("\n##Doc##\n"), NULL}},
{_T("\""), ZRD_ROOT, _T("\""), {_T("\"##root##\""), NULL}},
{_T("\""), ZRD_CLASS, _T("\""), {_T("\"##Root##\""), NULL}},
{_T(" = "), ZRD_ROOT, _T(""), {_T(" = ##Root##"), NULL}},
{_T(" = "), ZRD_DOC, _T(""), {_T(" = ##Doc##"), NULL}},
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
CString strTemplateSubdirs;              // Will be ##PROJECT_DIRS## in newproj.inf
CString strGeneratedNewProjInfoDirs;     // Will be ##GENERATED_NEWPROJ_INF_DIRS##
CString strTemplateRsc;                  // Will be ##TEMPLATE_RSC## in root.rc // Set their values g_TemplateNameCollisions.RemoveAll();    // Initialize g_TemplateNameCollisions g_TemplateNameCollisions[_T("NEWPROJ.INF")] = 2;   // w/ the two canned template
names
g_TemplateNameCollisions[_T("CONFIRM.INF")] = 2;

g_TemplateNames.RemoveAll();

TraverseDirectory(strDir, _T("*"), strProjFiles, strTemplateSubdirs, strTemplateRsc,
strGeneratedNewProjInfoDirs);

// Set the template macros to their values

DefineStringMacro(_T("PROJECT_FILES"), strProjFiles);

DefineStringMacro(_T("TEMPLATE_SUBDIRS"), strTemplateSubdirs);

DefineStringMacro(_T("GENERATED_NEWPROJ_INF_DIRS"), strGeneratedNewProjInfoDirs);

DefineStringMacro(_T("TEMPLATE_RSC"), strTemplateRsc);

}

//////////////////////////////////////////////////
// CZapDlg dialog

CZapDlg::CZapDlg()
    : CAppWizStepDlg(CZapDlg::IDD)
{
    //{{AFX_DATA_INIT(CZapDlg)
    m_strProjName = _T("");
    //}}AFX_DATA_INIT
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
        DefineBoolMacro(_T("GENERATED_NEWPROJ_INF_FILES"), FALSE);
        DefineBoolMacro(_T("GENERATED_NEWPROJ_INF_DIRS"), FALSE);
        DefineBoolMacro(_T("TEMPLATE_RSC"), FALSE);
        return;
    }

//  Here, we have a valid, non-NULL project name to zap. First, get its
    //  full path name
    CString strFullPath;
    _tfullpath(strFullPath.GetBuffer(_MAX_PATH), lpszSrcProjName, _MAX_PATH);
    strFullPath.ReleaseBuffer();
    DefineStringMacro(_T("ZAP_FULL_PATH"), strFullPath);

//  Divide the path name into the various components.
    CString strDrive, strDir, strName, strExt;
    _tsplitpath(strFullPath, strDrive.GetBuffer(_MAX_DRIVE), strDir.GetBuffer(_MAX_DIR),
        strName.GetBuffer(_MAX_FNAME), strExt.GetBuffer(_MAX_EXT));
    strDrive.ReleaseBuffer();
    strDir.ReleaseBuffer();
    strName.ReleaseBuffer();
    strExt.ReleaseBuffer();
    sampleew.m_Zap.SetRootis(strDir, strName);
    DefineStringMacro(_T("ZAP_SRC_PROJ"), strName + strExt);
    strDir = strDrive + strDir;

//  Now, declare the strings that will be passed to TraverseDirectory, and
    //  filled with lists of the files we'll zap. These strings will later
    //  be used as template macros.
    CString strProjFiles;                   // Will be %%PROJECT_FILES%% in newproj.inf
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
            DoubleSlashes(strSubdirObjSlashes, strSubdir);
            CString strTemplateName;
            MakeTemplateName(strTemplateName, strRootFile);
            strTemplateRec += strTemplateName +
                _T("\tTEMPLATE DISCARDABLE\t\"template\\\\") + strSubdirObjSlashes + strRootFile +
                _T("\"\n");
            // Remember the template name for later, when we're generating lines in
            // CUSTMW2.DLL's newnwpr).inf (i.e., the generated custom AppWizard's
            // newproj.inf).
            g_TemplateNames.AddTail(strTemplateName);
        }
        while (::FindNextFile(hSearch, &fd));
        ::FindClose(hSearch);
    }
}

// This function drives it all. It's called just before the zap dialog is
// dismissed, and coordinates setting the template macros that correspond
// with the set of files to be zapped.
void SetProjectFilesMacros(LPCTSTR lpszSrcProjName)
{
    //  In order to allow the user to click "Finish" from the first step,
    //  we should gracefully handle the case that no project was named to zap.
    if (lpszSrcProjName == NULL || *lpszSrcProjName == _T('\0'))
    {
        //  If project name not specified, empty out the zapper macros
        DefineBoolMacro(_T("ZAP_FULL_PATH"), FALSE);
        DefineBoolMacro(_T("PROJECT_FILES"), FALSE);
```

UNITED STATES PATENT AND TRADEMARK OFFICE
CERTIFICATE OF CORRECTION

PATENT NO.   : 5,754,858

DATED        : May 19, 1998

INVENTOR(S)  : Broman et al.

It is certified that error appears in the above-identified patent and that said Letters Patent is hereby corrected as shown below:

```
            strTemplateRec, strGeneratedNewProjInfoDirs);
        continue;
    }

//  Skip if it's a file we know we shouldn't copy (e.g., the makefile, .vcp file,
    //  .aps file, etc.).
    LPCTSTR lpch = _tcsrchr(ffd.cFileName, _T('.'));
    if (ShouldSkipFile(lpch))
        continue;

//  Skip if it has no length.
    if (ffd.nFileSizeLow == 0 && ffd.nFileSizeHigh == 0)
        continue;

//  Zap the file's name
    CString strRootFile;
    sampleaw.m_Zap.ZapFileName(ffd.cFileName, strRootFile, 1);

//  Now that we have the info we need, update the strings we were passed

//  First, the string used in CUSTMWZ.DLL's newproj.inf:
        //  The original project file...
    strProjFiles += lstrProjDir + strSubdir + ffd.cFileName)
        //  File to emit as custom AppWizard's template...
                                                    + (_T("\\template\\") + strSubdir
    + strRootFile + _T("\n"));

//  Next, the string used in CUSTMWZ.DLL's root.rc (i.e., the
    //  generated custom AppWizard's resource file).
    CString strSubdirObfSlashes;
```

UNITED STATES PATENT AND TRADEMARK OFFICE
CERTIFICATE OF CORRECTION

PATENT NO.   : 5,754,858

DATED        : May 19, 1998

INVENTOR(S)  : Broman et al.

It is certified that error appears in the above-identified patent and that said Letters Patent is hereby corrected as shown below:

```
HANDLE hSearch = ::FindFirstFile(strProjDir + strSubdir + _T("*.*"), &ffd);
if (hSearch == INVALID_HANDLE_VALUE)        // Bad search handle
{
    if (strSubdir.IsEmpty())
        // We've hit a bad search handle immediately after being called--
        // the project directory is invalid. Throw exception.
        ReportAndThrow(IDP_BAD_PROJDIR, strProjDir + strSubdir);
    else
        // We've hit a bad search handle in a recursive call--
        // empty project subdirectory. Just ignore it.
        return;
} do
{
    if (ffd.dwFileAttributes == FILE_ATTRIBUTE_DIRECTORY)
    {
        // If it's a directory, recursively call self with the directory,
        // and note the directory structure in the custom AppWizard's newproj.inf
        if (ShouldSkipDirectory(ffd.cFileName))
            continue;

CString strNewSubdir = (strSubdir + ffd.cFileName + _T("\n"));
        strGeneratedNewProjInfoDirs += _T("/") + strNewSubdir;
        strTemplateSubdirs += _T("/") + (_T("templates\\") + strNewSubdir);
        CString strNewDir = strSubdir;
        strNewDir += ffd.cFileName;
        strNewDir += _T("\\");
        TraverseDirectory(strProjDir, strNewDir, strProjFiles, strTemplateSubdirs,
```

UNITED STATES PATENT AND TRADEMARK OFFICE
CERTIFICATE OF CORRECTION

PATENT NO. : 5,754,858

Page 100 of 113

DATED : May 19, 1998

INVENTOR(S) : Broman et al.

It is certified that error appears in the above-identified patent and that said Letters Patent is hereby corrected as shown below:

```
            return (!_tcscmp(szDir, _T(".")) || !_tcscmp(szDir, _T(".."))
                || !_tcsicmp(szDir, _T("debug")) || !_tcsicmp(szDir, _T("release"))
                || !_tcsicmp(szDir, _T("windebug")) || !_tcsicmp(szDir, _T("winrel"))
                || !_tcsicmp(szDir, _T("pmcdebug")) || !_tcsicmp(szDir, _T("pmcrel"))
                || !_tcsicmp(szDir, _T("macdebug")) || !_tcsicmp(szDir, _T("macrel")));
        }

// This helper (used in TraverseDirectory) determines whether we should skip
        // zapping a file based on its extension.
        inline BOOL ShouldSkipFile(LPCTSTR szExt)
        {
            return (szExt != NULL &&
                (!_tcsicmp(szExt, _T(".mak")) || !_tcsicmp(szExt, _T(".vcp")) || !_tcsicmp(szExt, _T(".eps"))
                _T(".obj"))   || !_tcsicmp(szExt, _T(".sbr")) || !_tcsicmp(szExt, _T(".pig")) || !_tcsicmp(szExt,
                _T(".lk"))    || !_tcsicmp(szExt, _T(".pch")) || !_tcsicmp(szExt, _T(".res")) || !_tcsicmp(szExt,
                _T(".exe"))   || !_tcsicmp(szExt, _T(".rsc")) || !_tcsicmp(szExt, _T(".bsc")) || !_tcsicmp(szExt,
                _T(".ncb"))   || !_tcsicmp(szExt, _T(".dll")) || !_tcsicmp(szExt, _T(".pdb")) || !_tcsicmp(szExt,
                _T(".mdp"))));
        }

// This recursive function is called from SetProjectFilesMacros with references
        // to CStrings that correspond to template macros we're setting. It
        // traverses the given directory and updates these strings with names of
        // files it will zap into templates for the generated custom AppWizard.
        void TraverseDirectory(const CString& strProjDir, const CString& strSubdir, CString& strProjFiles,
            CString& strTemplateSubdirs, CString& strTemplateRsc, CString& strGeneratedNewProjInfoDirs)
        {
            WIN32_FIND_DATA ffd;
```

UNITED STATES PATENT AND TRADEMARK OFFICE
CERTIFICATE OF CORRECTION

Page 101 of 113

PATENT NO.    : 5,754,858

DATED         : May 19, 1998

INVENTOR(S)   : Broman et al.

It is certified that error appears in the above-identified patent and that said Letters Patent is hereby corrected as shown below:

```
    }

// Check the TARGTYPE value to see if it indicates a DLL project
    if ((dwTargType & 0x00FF) == -2)
         return TRUE;
    else
         return FALSE;
}

// This helper (used in TraverseDirectory) doubles occurrences of the backslash
// character in szPath, so the path can be enclosed in double-quotes in the
// resource file.
void DoubleSlashes(CString& strPathDblSlashes, LPCTSTR szPath)
{
    strPathDblSlashes.Empty();
    while (*szPath != '\0')
    {
         if (*szPath == '\\')
             strPathDblSlashes += "\\\\";
         else
             strPathDblSlashes += *szPath;
         szPath = _tcsinc(szPath);
    }
}

// This helper (used in TraverseDirectory) determines whether we should skip
// zapping files in the given directory based on its name.
inline BOOL ShouldSkipDirectory(LPCTSTR szDir)
{
```

UNITED STATES PATENT AND TRADEMARK OFFICE
CERTIFICATE OF CORRECTION

Page 102 of 113

PATENT NO. : 5,754,858

DATED : May 19, 1998

INVENTOR(S) : Broman et al.

It is certified that error appears in the above-identified patent and that said Letters Patent is hereby corrected as shown below:

```
    g_TemplateNameCollisions[strOldTemplateName] = ++nNextDigit;

// Call self recursively to make sure the new name doesn't collide
    MakeTemplateName(strTemplateName, strTemplateName);
    }
    else
    {
        // No collision, so update collision map for the future.
        g_TemplateNameCollisions[strTemplateName] = 2;
    }
}

// This determines whether a project we're zapping builds a DLL. The heuristic it
// uses is whether, in the project makefile, there is a TARGTYPE line with 2 as
// the low byte of the value.
BOOL IsDLLProject(LPCTSTR lpszProjName)
{
    #define SIZEBUF 256
    char szBuf[SIZEBUF];

DWORD dwTargType = 0;
    CStdioFile file(lpszProjName, CFile::modeRead | CFile::typeText);

// Read through makefile line by line
    while (file.ReadString(szBuf, SIZEBUF-1) != NULL)
    {
        // Is this line a "# TARGTYPE" line? If so, grab the TARGTYPE value
        if (_tscanf(szBuf, _T("# TARGTYPE \"%*[^\"]\" 0x%x"), &dwTargType) == 1)
            break;
```

UNITED STATES PATENT AND TRADEMARK OFFICE
CERTIFICATE OF CORRECTION

Page 103 of 113

PATENT NO. : 5,754,858

DATED : May 19, 1998

INVENTOR(S) : Broman et al.

It is certified that error appears in the above-identified patent and that said Letters Patent is hereby corrected as shown below:

```
#include "stdafx.h"
include "customwz.h"
#include "zapdlg.h"
#include "samplesw.h"
#include "zap.h"
#include "psint.h"

#ifdef _PSEUDO_DEBUG
#undef THIS_FILE
static char THIS_FILE[] = __FILE__;
endif static CTypedPtrMap<CMapStringToPtr, CString, int> g_TemplateNameCollisions;
CStringList g_TemplateNames;

void MakeTemplateName(CString& strTemplateName, LPCTSTR szFileName)
{
    // Make template name upper-case
    strTemplateName = szFileName;
    strTemplateName.MakeUpper();

// See if this template name collides with others we're using
    int nNextDigit;
    if (g_TemplateNameCollisions.Lookup(strTemplateName, nNextDigit))
    {
        // There is a collision, so append a digit to the name & update
        // collisions map
        CString strOldTemplateName = strTemplateName;
        strTemplateName.Format("%s%d", (LPCTSTR) strOldTemplateName, nNextDigit);
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
//{{AFX_DATA(CZapDlg)
enum { IDD = IDD_ZAP };
CString    m_strProjName;
//}}AFX_DATA // Overrides
// ClassWizard generated virtual function overrides
//{{AFX_VIRTUAL(CZapDlg)
protected:
virtual void DoDataExchange(CDataExchange* pDX);   // DDX/DDV support
//}}AFX_VIRTUAL // Implementation
protected:

// Generated message map functions
    //{{AFX_MSG(CZapDlg)
    afx_msg void OnBrowse();
    afx_msg void OnPaint();
    //}}AFX_MSG
    DECLARE_MESSAGE_MAP()
};
                    ZAPDLG.CPP // zapdlg.cpp : implementation file
//
// Copyright (c) 1985-1995, Microsoft Corporation. All rights reserved.
//
```

UNITED STATES PATENT AND TRADEMARK OFFICE
CERTIFICATE OF CORRECTION

Page 105 of 113

PATENT NO. : 5,754,858

DATED : May 19, 1998

INVENTOR(S) : Broman et al.

It is certified that error appears in the above-identified patent and that said Letters Patent is hereby corrected as shown below:

```
                    +;                              // in case there are more
        occurrences of this match
                        )
                    )
            )

void CZap::ZapFileName(LPCTSTR lpszFileName, CString& rStrZappedFile, int iReplace /* = 0 */)
    {
        rStrZappedFile = lpszFileName;
        ZapLine(rStrZappedFile, iReplace);
    }
                                        ZAPDLG.H //  zapdlg.h : header file.  This dialog allows you to enter which project
    //  off of which to base the custom AppWizard.
    //
    //  Copyright (c) 1985-1995, Microsoft Corporation. All rights reserved.
    //

/////////////////////////////////////////////////////////////////////////////
    //  CZapDlg dialog class CZapDlg : public CAppWizStepDlg
    {
    //  Construction
    public:
        CZapDlg();              // standard constructor
        virtual BOOL OnDismiss();

//  Dialog Data
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
void CZap::FreeMatches()
{
    if (m_pStrMatches != NULL)
        delete [sizeof(zrdGeneral)/sizeof(ZapRawData)] m_pStrMatches;
    m_pStrMatches = NULL;
}

CZap::~CZap()
{
    ASSERT(m_posTpIName == NULL);
    FreeMatches();
} void CZap::ZapLine(CString& strLine, int iReplace /* = 0 */)
{
    ASSERT(m_pStrMatches != NULL);
    ASSERT(0 <= iReplace && iReplace <= 1);

for (int i = 0; i < sizeof(zrdGeneral)/sizeof(ZapRawData); i++)
    {
        int nStart = strLine.Find(m_pStrMatches[i]);
        if (nStart != -1)
        {
            ASSERT(zrdGeneral[i].lpszReplace[iReplace] != NULL);
            strLine = strLine.Left(nStart)                          // Region to left of match
                + zrdGeneral[i].lpszReplace[iReplace]               // String to replace match with
                + ((LPCTSTR) strLine + nStart + m_pStrMatches[i].GetLength());
                                                                    // String to right of match
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
if (nLen < 4)
{
    CString strPad(_T(' '), 4 - nLen);
    strRootTypes[ZRD_MAC_TYPE] += strPad;
}
strRootTypes[ZRD_MAC_TYPE].MakeUpper();

strRootTypes[ZRD_R_FILE] = m_strRoot + _T("Mac");

strRootTypes[ZRD_R_FILE_UPR] = strRootTypes[ZRD_R_FILE];
strRootTypes[ZRD_R_FILE_UPR].MakeUpper();

// Now, using these values, traverse zrdGeneral and concatenate the three
// components of each search string. Store the value in the
// corresponding entry of the array m_pStrMatches.

FreeMatches();
int nSize = sizeof(zrdGeneral)/sizeof(ZapRawData);
m_pStrMatches = new CString[nSize];

for (int i=0; i < nSize; i++)
{
    m_pStrMatches[i] =
        zrdGeneral[i].lpszPre +
        strRootTypes[zrdGeneral[i].nRootType] +
        zrdGeneral[i].lpszPost;
}
}
```

UNITED STATES PATENT AND TRADEMARK OFFICE
CERTIFICATE OF CORRECTION

PATENT NO.   : 5,754,858

DATED        : May 19, 1998

INVENTOR(S)  : Broman et al.

It is certified that error appears in the above-identified patent and that said Letters Patent is hereby corrected as shown below:

```
// etc.
void CZap::InitMatches()
{
    // First, translate ZRD_ROOT, ZRD_ROOT_UPR, etc. into strings based
    // on the name of the "zappee" (i.e., project off of which we're
    // basing the custom AppWizard).

CString strRootTypes[NUM_ROOT_TYPES];
    strRootTypes[ZRD_ROOT] = m_strRoot;

strRootTypes[ZRD_ROOT_UPR] = strRootTypes[ZRD_ROOT];
    strRootTypes[ZRD_ROOT_UPR].MakeUpper();

strRootTypes[ZRD_SAFE_ROOT] = m_strRoot;
    strRootTypes[ZRD_SAFE_ROOT].MakeUpper();

strRootTypes[ZRD_CLASS] = m_strRoot;
    strRootTypes[ZRD_CLASS].SetAt(0, _toupper(strRootTypes[ZRD_CLASS][0]));

strRootTypes[ZRD_FILEBASE] = m_strRoot;

strRootTypes[ZRD_DOC] = m_strRoot.Left(6);
    strRootTypes[ZRD_DOC].SetAt(0, _toupper(strRootTypes[ZRD_DOC][0]));

strRootTypes[ZRD_DOC_UPR] = strRootTypes[ZRD_DOC];
    strRootTypes[ZRD_DOC_UPR].MakeUpper();

strRootTypes[ZRD_MAC_TYPE] = m_strRoot.Left(4);
    int nLen = strRootTypes[ZRD_MAC_TYPE].GetLength();
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
{
    m_strRoot = lpszRoot;

m_strRootDir = lpszDir;
    m_strRootDir.MakeLower();

m_strGeneratedNewPrejInfo.Empty();
    m_posTplName = NULL;

InitMatches();
}

// Changes each space in str to an underscore
void SpaceToUnderscore(CString& str)
{
    LPCTSTR pch = str;
    for (int i=0; *pch != _T('\0'); i += _tclen(pch), pch = _tcsinc(pch))
    {
        if (str[i] == _T(' '))
            str.SetAt(i, _T('_'));
    }
}

// This fills the array m_pStrMatches with an entry for each search string
// from zrdGeneral. Each entry is the concatenation of the three components
// of the search string (i.e., Pre, RootType, and Post).
// Example (loosely expressed):
//   m_pStrMatches[0] = "" + ZRD_ROOT + ".h"
//   m_pStrMatches[1] = "" + ZRD_ROOT_UPR + ".H"
```

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
    {_T("\""), ZRD_ROOT_UPR, _T(" MFC Extension DLL"), {_T("\"##ROOT## MFC Extension DLL"),
NULL}},
    {_T("\""), ZRD_ROOT_UPR, _T(" MFC Application"), {_T("\"##ROOT## MFC Application"), NULL}},
    {_T("\""), ZRD_ROOT_UPR, _T("\\0\""), {_T("\"##ROOT##\\0\""), NULL}},
    {_T("\""), ZRD_ROOT_UPR, _T(" Dynamic Link Library"), {_T("\"##ROOT## Dynamic Link Library"),
NULL}},
    {_T(""), ZRD_ROOT, _T(" application"), {_T(" ##root## application"), NULL}},
    {_T(""), ZRD_ROOT, _T(" Application"), {_T(" ##root## Application"), NULL}},
    {_T(""), ZRD_ROOT_UPR, _T(" application"), {_T("##ROOT## application"), NULL}},
    {_T(""), ZRD_ROOT_UPR, _T(" Application"), {_T("##ROOT## Application"), NULL}},
    {_T(""), ZRD_ROOT_UPR, _T(" DLL"), {_T("##ROOT## DLL"), NULL}},
    {_T("\""), ZRD_ROOT, _T(" Version 1.0"), {_T("\"##Root## Version 1.0"), NULL}},
    {_T("\"&About "), ZRD_ROOT, _T("..."), {_T("\"&About ##Root##..."), NULL}},
    {_T("\"About "), ZRD_ROOT, _T("\""), {_T("\"About ##Root##\""), NULL}},
    {_T("Make help for Project "), ZRD_ROOT_UPR, _T(""), {_T("Make help for Project ##ROOT##"),
NULL}},
    {_T("// "), ZRD_ROOT, _T(" bundle resource ID"), {_T("// #root## bundle resource ID"), NULL}},
    {_T("// "), ZRD_ROOT, _T(" document"), {_T("// #root## document"), NULL}},
    {_T("// "), ZRD_ROOT, _T(" signature"), {_T("// #root## signature"), NULL}},
    {_T(""), ZRD_DOC, _T(" Document"), {_T("##Doc## Document"), NULL}},
    {_T("MICROSOFT FOUNDATION CLASS LIBRARY : "), ZRD_ROOT, _T(""),
        {_T("MICROSOFT FOUNDATION CLASS LIBRARY : #root##"), NULL}},
    {_T(""), ZRD_CLASS, _T(".Document"), {_T("##Doc##.Document"), NULL}},
    {_T("\n"), ZRD_MAC_TYPE, _T(" Files\""), {_T("\n ##MAC_TYPE## Files\""), NULL}},
    {_T(""), ZRD_MAC_TYPE, _T(""), {_T("##MAC_TYPE##"), NULL}},
    {_T("\n"), ZRD_MAC_TYPE, _T("\n"), {_T("\n##MAC_TYPE##\n"), NULL}},
};

// Called when the zap dialog is dismissed. It initializes the matches
// array (m_pStrMatches) for the particular project's root name.
void CZap::SetRoot(LPCTSTR lpszDir, LPCTSTR lpszRoot)
```

UNITED STATES PATENT AND TRADEMARK OFFICE
CERTIFICATE OF CORRECTION

Page 111 of 113

PATENT NO. : 5,754,858

DATED : May 19, 1998

INVENTOR(S) : Broman et al.

It is certified that error appears in the above-identified patent and that said Letters Patent is hereby corrected as shown below:

```
        } void CZapDlg::DoDataExchange(CDataExchange* pDX)
{
    CAppWizStepDlg::DoDataExchange(pDX);
    //{{AFX_DATA_MAP(CZapDlg)
    DDX_Text(pDX, IDC_PROJ_NAME, m_strProjName);
    //}}AFX_DATA_MAP
}

BEGIN_MESSAGE_MAP(CZapDlg, CAppWizStepDlg)
    //{{AFX_MSG_MAP(CZapDlg)
    ON_BN_CLICKED(IDC_BROWSE, OnBrowse)
    ON_WM_PAINT()
    //}}AFX_MSG_MAP
END_MESSAGE_MAP()

/////////////////////////////////////////////////
// CZapDlg message handlers

//   Validate the name of the project to zap, and set zap-related template
//   macros before dismissing
BOOL CZapDlg::OnDismiss()
{
    UpdateData(TRUE);
```

UNITED STATES PATENT AND TRADEMARK OFFICE
CERTIFICATE OF CORRECTION

Page 112 of 113

PATENT NO. : 5,754,858

DATED : May 19, 1998

INVENTOR(S) : Broman et al.

It is certified that error appears in the above-identified patent and that said Letters Patent is hereby corrected as shown below:

```
// If the user specifies a nonempty, nonexistent path, balk
if (!m_strProjName.IsEmpty()
    && GetFileAttributes(m_strProjName) == 0xFFFFFFFF)
{
    ReportError(IDP_ZAP_CANT_OPEN_FILE, m_strProjName);
    return FALSE;
}

// Now set the macros corresponding to the files we zap into templates.
// This may throw an exception if it runs into an error. In that
// case, we'll return FALSE.
TRY
{
    DefineBoolMacro(_T("CREATE_DLL_PROJECT"),
        !m_strProjName.IsEmpty() && IsDLLProject(m_strProjName));
    SetProjectFilesMacros(m_strProjName);
}
CATCH(CFileException, e)
{
    ReportError(IDP_ZAP_CANT_OPEN_FILE, m_strProjName);
    return FALSE;
}
AND_CATCH(CException, e)
{
    return FALSE;
}
END_CATCH
```

MAILING ADDRESS OF SENDER:

Klarquist Sparkman Campbell Leigh  LLP

PATENT NO. 5,754,858

UNITED STATES PATENT AND TRADEMARK OFFICE
CERTIFICATE OF CORRECTION

PATENT NO. : 5,754,858

DATED : May 19, 1998

INVENTOR(S) : Broman et al.

It is certified that error appears in the above-identified patent and that said Letters Patent is hereby corrected as shown below:

```
    // If we got this far, we've successfully built our list of files
    // to zap. We're ready to continue.
    return TRUE;
} define BROWSE_DLG_HELP_ID 17304

// Handle the "Browse..." button by popping up a file navigator.
void CZapDlg::OnBrowse()
{
    CString strBrowseTitle;
    strBrowseTitle.LoadString(IDS_BROWSE_TITLE);

CFileDialog dlg(
        TRUE,                                       // Open File Dialog
        _T("mak"),                                  // Default extension
        NULL,                                       // No default filename
        OFN_HIDEREADONLY | OFN_OVERWRITEPROMPT,     // OPENFILENAME flags
        _T("Project Files|*.mak|All Files|*.*||*)); // Filter strings
    dlg.m_ofn.lpstrTitle = strBrowseTitle;
    dlg.SetHelpID(BROWSE_DLG_HELP_ID);
    if (dlg.DoModal() == IDOK)
        m_strProjName = dlg.GetPathName();

UpdateData(FALSE);
} define STEP2_LEFT      8
define STEP2_TOP       40
```